(12) United States Patent
O'Donnell et al.

(10) Patent No.: US 8,452,702 B1
(45) Date of Patent: *May 28, 2013

(54) SYSTEM, METHOD AND PROGRAM PRODUCT FOR MINIMIZING FUND MOVEMENTS

(75) Inventors: Thomas J. O'Donnell, Bay Shore, NY (US); David Edgar Gareis, Maplewood, NJ (US)

(73) Assignee: Island Intellectual Property LLC, Manhasset, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/228,031

(22) Filed: Sep. 8, 2011

(51) Int. Cl.
*G06Q 40/00* (2006.01)

(52) U.S. Cl.
USPC .............. 705/39; 705/35; 705/40; 705/41; 705/42; 705/45; 235/379; 235/380; 235/385; 235/437; 235/470

(58) Field of Classification Search
USPC .............. 705/35, 39–42, 45; 235/379, 380, 235/385, 437, 470
See application file for complete search history.

(56) References Cited

U.S. PATENT DOCUMENTS

| | | | |
|---|---|---|---|
| 4,232,367 A | 11/1980 | Youden et al. | |
| 4,346,442 A | 8/1982 | Musmanno | |
| 4,376,978 A | 3/1983 | Musmanno | |
| 4,597,046 A | 6/1986 | Musmanno et al. | |
| 4,674,044 A | 6/1987 | Kalmus et al. | |
| 4,694,397 A | 9/1987 | Grant et al. | |
| 4,700,297 A | 10/1987 | Hagel et al. | |
| 4,751,640 A | 6/1988 | Lucas et al. | |
| 4,774,663 A | 9/1988 | Musmanno et al. | |
| 4,953,085 A | 8/1990 | Atkins | |
| 4,985,833 A | 1/1991 | Oncken | |
| 5,126,936 A | 6/1992 | Champion et al. | |
| 5,206,803 A | 4/1993 | Vitagliano et al. | |
| 5,220,501 A | 6/1993 | Lawlor et al. | |

(Continued)

FOREIGN PATENT DOCUMENTS

| EP | 0 608 322 | 7/1998 |
|---|---|---|
| JP | 10-049590 A | 2/1998 |

(Continued)

OTHER PUBLICATIONS

U.S. Appl. No. 11/641,046, filed Dec. 19, 2006, Bruce Bent et al.

(Continued)

*Primary Examiner* — Narayanswamy Subramanian
(74) *Attorney, Agent, or Firm* — Foley & Lardner LLP

(57) ABSTRACT

A method, system and program product, the method comprising: accessing databases, comprising (i) aggregated account information for a plurality of government-backed insured interest-bearing aggregated deposit accounts held in a plurality of recipient depository institutions, and (ii) client account information; obtaining client account transaction information of client accounts of a first financial institution; obtaining a first amount of funds for the first financial institution; allocating the first amount of funds to other of the recipient depository institutions; allocating a second amount of funds sourced from other of the financial institutions to the first financial institution, based on criteria; netting the first amount and the second amount to obtain a net amount; if the net amount is different from zero, allocating a positive or a negative third amount, to make the second amount equal to the first amount, so no transfer is necessary.

8 Claims, 6 Drawing Sheets

U.S. PATENT DOCUMENTS

| | | |
|---|---|---|
| 5,235,507 A | 8/1993 | Sackler et al. |
| 5,262,942 A | 11/1993 | Earle |
| 5,270,922 A | 12/1993 | Higgins |
| 5,291,398 A | 3/1994 | Hagan |
| 5,297,032 A | 3/1994 | Trojan et al. |
| 5,424,938 A | 6/1995 | Wagner et al. |
| 5,631,828 A | 5/1997 | Hagan |
| 5,644,727 A | 7/1997 | Atkins |
| 5,649,116 A | 7/1997 | McCoy et al. |
| 5,671,363 A | 9/1997 | Cristofich et al. |
| 5,689,650 A | 11/1997 | McClelland et al. |
| 5,710,889 A | 1/1998 | Clark et al. |
| 5,765,144 A | 6/1998 | Larche et al. |
| 5,774,880 A | 6/1998 | Ginsberg |
| 5,781,654 A | 7/1998 | Carney |
| 5,802,499 A | 9/1998 | Sampson et al. |
| 5,806,048 A | 9/1998 | Kiron et al. |
| 5,806,049 A | 9/1998 | Petruzzi |
| 5,812,987 A | 9/1998 | Luskin et al. |
| 5,826,243 A | 10/1998 | Musmanno et al. |
| 5,848,400 A | 12/1998 | Chang |
| 5,852,811 A | 12/1998 | Atkins |
| 5,864,685 A | 1/1999 | Hagan |
| 5,875,437 A | 2/1999 | Atkins |
| 5,878,258 A | 3/1999 | Pizi et al. |
| 5,878,405 A | 3/1999 | Grant et al. |
| 5,884,285 A | 3/1999 | Atkins |
| 5,890,141 A | 3/1999 | Carney et al. |
| 5,893,078 A | 4/1999 | Paulson |
| 5,903,881 A | 5/1999 | Schrader et al. |
| 5,905,974 A | 5/1999 | Fraser et al. |
| 5,940,809 A | 8/1999 | Musmanno et al. |
| 5,941,996 A | 8/1999 | Smith et al. |
| 5,946,667 A | 8/1999 | Tull et al. |
| 5,950,175 A | 9/1999 | Austin |
| 5,974,390 A | 10/1999 | Ross |
| 5,978,779 A | 11/1999 | Stein et al. |
| 6,014,642 A | 1/2000 | El-Kadi et al. |
| 6,016,482 A | 1/2000 | Molinari et al. |
| 6,026,438 A | 2/2000 | Piazza et al. |
| 6,032,133 A | 2/2000 | Hilt et al. |
| 6,041,314 A | 3/2000 | Davis |
| 6,044,371 A | 3/2000 | Person et al. |
| 6,047,324 A | 4/2000 | Ford et al. |
| 6,049,782 A | 4/2000 | Gottesman et al. |
| 6,052,673 A | 4/2000 | Leon et al. |
| 6,088,685 A | 7/2000 | Kiron et al. |
| 6,092,056 A | 7/2000 | Tull et al. |
| 6,105,005 A | 8/2000 | Fuhrer |
| 6,108,641 A | 8/2000 | Kenna et al. |
| 6,112,191 A | 8/2000 | Burke |
| 6,119,093 A | 9/2000 | Walker et al. |
| 6,131,810 A | 10/2000 | Weiss et al. |
| 6,154,770 A | 11/2000 | Kostakos |
| 6,189,785 B1 | 2/2001 | Lowery |
| 6,192,347 B1 | 2/2001 | Graff |
| 6,226,623 B1 | 5/2001 | Schein et al. |
| 6,317,783 B1 | 11/2001 | Freishtat et al. |
| 6,324,523 B1 | 11/2001 | Killeen et al. |
| 6,363,360 B1 | 3/2002 | Madden |
| 6,374,231 B1 | 4/2002 | Bent et al. |
| 6,408,336 B1 | 6/2002 | Schneider et al. |
| 6,513,020 B1 | 1/2003 | Weiss et al. |
| 6,970,843 B1 | 11/2005 | Forte |
| 7,089,202 B1 | 8/2006 | McNamar et al. |
| 7,103,556 B2 | 9/2006 | Del Rey et al. |
| 7,124,101 B1 | 10/2006 | Mikurak |
| 7,133,840 B1 | 11/2006 | Kenna et al. |
| 7,203,845 B2 | 4/2007 | Sokolic et al. |
| 7,206,761 B2 | 4/2007 | Colvin |
| 7,216,100 B2 | 5/2007 | Elliott |
| 7,321,874 B2 | 1/2008 | Dilip et al. |
| 7,321,875 B2 | 1/2008 | Dilip et al. |
| 7,328,179 B2 | 2/2008 | Sheehan et al. |
| 7,376,606 B2 | 5/2008 | Jacobsen |
| 7,383,223 B1 | 6/2008 | Dilip et al. |
| 7,383,227 B2 | 6/2008 | Weinflash et al. |
| 7,392,222 B1 | 6/2008 | Hamilton et al. |
| 7,401,037 B2 | 7/2008 | Arena et al. |
| 7,440,914 B2 | 10/2008 | Jacobsen |
| 7,505,937 B2 | 3/2009 | Dilip et al. |
| 7,509,286 B1 | 3/2009 | Bent et al. |
| 7,519,551 B2 | 4/2009 | Bent et al. |
| 7,529,709 B2 | 5/2009 | Volchek et al. |
| 7,536,340 B2 | 5/2009 | Dheer et al. |
| 7,536,350 B1 | 5/2009 | Bent et al. |
| 7,596,522 B1 | 9/2009 | Jacobsen |
| 7,603,307 B2 | 10/2009 | Jacobsen |
| 7,640,199 B1 | 12/2009 | Hyland |
| 7,657,761 B2 | 2/2010 | Sokolic et al. |
| 7,668,771 B1 * | 2/2010 | Bent et al. ............... 705/35 |
| 7,668,772 B1 | 2/2010 | Bent et al. |
| 7,672,886 B2 | 3/2010 | Bent et al. |
| 7,672,901 B1 | 3/2010 | Bent et al. |
| 7,672,902 B1 | 3/2010 | Bent et al. |
| 7,680,716 B1 | 3/2010 | Bent et al. |
| 7,680,734 B1 | 3/2010 | Bent et al. |
| 7,716,131 B2 | 5/2010 | Bent et al. |
| 7,720,755 B1 | 5/2010 | Coyle |
| 7,729,987 B1 | 6/2010 | Wakim et al. |
| 7,752,107 B1 | 7/2010 | Bent et al. |
| 7,752,129 B2 | 7/2010 | Bent et al. |
| 7,756,767 B2 | 7/2010 | Cluse et al. |
| 7,769,688 B1 | 8/2010 | Bent et al. |
| 7,788,235 B1 | 8/2010 | Yeo |
| 7,797,207 B1 | 9/2010 | Dilip et al. |
| 7,809,640 B1 | 10/2010 | Bent et al. |
| 7,814,017 B2 | 10/2010 | Vancini et al. |
| 7,837,100 B2 | 11/2010 | Bonalle et al. |
| 7,860,771 B2 | 12/2010 | Colvin |
| 7,873,571 B1 | 1/2011 | Wehmer |
| 7,873,573 B2 | 1/2011 | Realini |
| 7,873,677 B2 | 1/2011 | Messing et al. |
| 7,886,969 B2 | 2/2011 | Antoo et al. |
| 7,895,098 B2 | 2/2011 | Beard |
| 7,895,099 B2 | 2/2011 | Whiting et al. |
| 7,899,743 B2 | 3/2011 | Jacobsen |
| 7,899,745 B1 | 3/2011 | Jacobsen |
| 7,899,746 B1 | 3/2011 | Jacobsen |
| 7,899,747 B1 | 3/2011 | Jacobsen |
| 7,904,372 B2 | 3/2011 | Whiting et al. |
| 7,917,433 B2 | 3/2011 | Jacobsen |
| 7,921,057 B1 | 4/2011 | Jacobsen |
| 7,933,821 B1 | 4/2011 | Bent et al. |
| 7,945,511 B2 | 5/2011 | O'Brien et al. |
| 7,996,308 B1 | 8/2011 | Bent et al. |
| 8,015,085 B2 | 9/2011 | Blagg et al. |
| 8,019,667 B1 | 9/2011 | Bent et al. |
| 8,019,668 B1 * | 9/2011 | Bent et al. ............... 705/35 |
| 8,032,456 B1 | 10/2011 | Bent et al. |
| 8,036,986 B2 | 10/2011 | Jacobsen |
| 8,051,004 B2 | 11/2011 | Jacobsen |
| 8,051,005 B2 | 11/2011 | Jacobsen |
| 8,086,508 B2 | 12/2011 | Dheer et al. |
| 8,090,651 B2 | 1/2012 | Winslow et al. |
| 8,103,582 B1 | 1/2012 | Zettner |
| RE43,246 E | 3/2012 | Bent et al. |
| 8,150,766 B1 | 4/2012 | Bent et al. |
| 8,191,156 B2 | 5/2012 | Kubo |
| 8,239,321 B1 * | 8/2012 | Bent et al. ............... 705/39 |
| 2001/0023414 A1 | 9/2001 | Kumar et al. |
| 2001/0032182 A1 | 10/2001 | Kumar et al. |
| 2002/0007330 A1 | 1/2002 | Kumar et al. |
| 2002/0046144 A1 | 4/2002 | Graff |
| 2002/0069147 A1 | 6/2002 | Sheehan et al. |
| 2002/0082981 A1 | 6/2002 | Madden |
| 2002/0087454 A1 | 7/2002 | Calo et al. |
| 2002/0091637 A1 | 7/2002 | Bent |
| 2002/0095592 A1 | 7/2002 | Daniell et al. |
| 2002/0128951 A1 | 9/2002 | Kiron et al. |
| 2002/0161707 A1 | 10/2002 | Cole et al. |
| 2002/0165757 A1 | 11/2002 | Lisser |
| 2002/0174048 A1 | 11/2002 | Dheer et al. |
| 2002/0178098 A1 | 11/2002 | Beard |
| 2002/0194099 A1 | 12/2002 | Weiss |
| 2003/0023529 A1 | 1/2003 | Jacobsen |
| 2003/0041003 A1 | 2/2003 | Kayser, III |

| | | | |
|---|---|---|---|
| 2003/0080185 | A1 | 5/2003 | Werther |
| 2003/0135437 | A1 | 7/2003 | Jacobsen |
| 2003/0149646 | A1 | 8/2003 | Chen et al. |
| 2003/0163403 | A1 | 8/2003 | Chen et al. |
| 2003/0177092 | A1 | 9/2003 | Paglin |
| 2003/0191702 | A1 | 10/2003 | Hurley |
| 2003/0200174 | A1 | 10/2003 | Star |
| 2003/0208438 | A1 | 11/2003 | Rothman |
| 2003/0236728 | A1 | 12/2003 | Sunderji et al. |
| 2004/0039674 | A1 | 2/2004 | Coloma |
| 2004/0107157 | A1 | 6/2004 | Bleunven et al. |
| 2004/0111361 | A1 | 6/2004 | Griffiths et al. |
| 2004/0128229 | A1 | 7/2004 | Raines et al. |
| 2004/0128235 | A1 | 7/2004 | Kemper et al. |
| 2004/0138974 | A1 | 7/2004 | Shimamura et al. |
| 2004/0153398 | A1 | 8/2004 | Baumgartner et al. |
| 2004/0162773 | A1 | 8/2004 | Del Rey et al. |
| 2004/0177036 | A1 | 9/2004 | Nutahara et al. |
| 2004/0249741 | A1 | 12/2004 | Understein |
| 2005/0044038 | A1 | 2/2005 | Whiting et al. |
| 2005/0091137 | A1 | 4/2005 | Woeber |
| 2005/0102225 | A1 | 5/2005 | Oppenheimer et al. |
| 2005/0102226 | A1 | 5/2005 | Oppenheimer et al. |
| 2005/0108120 | A1 | 5/2005 | Malka et al. |
| 2005/0108149 | A1* | 5/2005 | Bent et al. .................. 705/38 |
| 2005/0114246 | A1 | 5/2005 | Coloma |
| 2005/0154662 | A1 | 7/2005 | Langenwalter |
| 2005/0228733 | A1* | 10/2005 | Bent et al. .................. 705/35 |
| 2006/0004655 | A1 | 1/2006 | Alexander et al. |
| 2006/0047593 | A1 | 3/2006 | Naratil et al. |
| 2006/0106703 | A1 | 5/2006 | Del Rey et al. |
| 2006/0155644 | A1 | 7/2006 | Reid et al. |
| 2006/0167773 | A1 | 7/2006 | Yang et al. |
| 2006/0212385 | A2* | 9/2006 | Bent et al. .................. 705/38 |
| 2006/0212389 | A2 | 9/2006 | Bent et al. |
| 2006/0213980 | A1 | 9/2006 | Geller et al. |
| 2006/0273152 | A1 | 12/2006 | Fields |
| 2007/0043666 | A1 | 2/2007 | Burdette |
| 2007/0083938 | A1 | 4/2007 | Aoki et al. |
| 2007/0118449 | A1 | 5/2007 | De La Motte et al. |
| 2007/0130065 | A1 | 6/2007 | Staab et al. |
| 2007/0143196 | A1 | 6/2007 | Colvin |
| 2007/0255655 | A1 | 11/2007 | Kemper et al. |
| 2007/0271174 | A2* | 11/2007 | Bent et al. .................. 705/38 |
| 2007/0276752 | A1 | 11/2007 | Whiting et al. |
| 2007/0288400 | A1 | 12/2007 | Menon |
| 2008/0015985 | A1 | 1/2008 | Abhari et al. |
| 2008/0046358 | A1 | 2/2008 | Holm-Blagg et al. |
| 2008/0065532 | A1 | 3/2008 | De La Motte |
| 2008/0077996 | A1 | 3/2008 | Kubo |
| 2008/0097899 | A1 | 4/2008 | Jackson et al. |
| 2008/0120228 | A1 | 5/2008 | Bent et al. |
| 2008/0133280 | A1 | 6/2008 | Ziegler |
| 2008/0133396 | A1 | 6/2008 | De La Motte |
| 2008/0195534 | A1 | 8/2008 | Landis et al. |
| 2008/0222053 | A1 | 9/2008 | Jacobsen |
| 2008/0288398 | A1 | 11/2008 | Maricondi |
| 2009/0006985 | A1 | 1/2009 | Fong et al. |
| 2009/0012899 | A1 | 1/2009 | Friesen |
| 2009/0024496 | A1 | 1/2009 | Balachandran et al. |
| 2009/0138412 | A1 | 5/2009 | Jacobsen |
| 2009/0241197 | A1 | 9/2009 | Troyansky |
| 2009/0327154 | A1 | 12/2009 | Van Vooren et al. |
| 2010/0268668 | A1* | 10/2010 | Burdette .................. 705/36 R |
| 2010/0274687 | A1* | 10/2010 | Ghosh et al. .................. 705/30 |
| 2010/0274718 | A1* | 10/2010 | Ghosh et al. .................. 705/44 |
| 2011/0106703 | A1 | 5/2011 | Jay et al. |
| 2011/0208640 | A1 | 8/2011 | Geoghegan et al. |
| 2011/0246359 | A1 | 10/2011 | O'Brien et al. |
| 2011/0270720 | A1* | 11/2011 | Manohar .................. 705/30 |
| 2011/0276473 | A1* | 11/2011 | Blok .................. 705/39 |

FOREIGN PATENT DOCUMENTS

| | | |
|---|---|---|
| WO | WO-95/23379 A1 | 8/1995 |
| WO | WO-99/18529 A1 | 4/1999 |
| WO | WO-02/42952 A1 | 5/2002 |
| WO | WO-03/012580 A2 | 2/2003 |
| WO | WO-2005/006111 A2 | 1/2005 |

OTHER PUBLICATIONS

U.S. Appl. No. 11/840,052, filed Aug. 16, 2007, Bruce Bent et al.
U.S. Appl. No. 11/840,060, filed Aug. 16, 2007, Bruce Bent et al.
U.S. Appl. No. 12/385,522, filed Apr. 10, 2009, Bruce Bent et al.
U.S. Appl. No. 12/408,507, filed Mar. 30, 2009, Bruce Bent et al.
U.S. Appl. No. 12/408,511, filed Mar. 20, 2009, Bruce Bent et al.
U.S. Appl. No. 12/408,523, filed Mar. 20, 2009, Bruce Bent et al.
U.S. Appl. No. 12/453,387, filed May 8, 2009, Bruce Bent et al.
U.S. Appl. No. 12/453,388, filed May 8, 2009, Bruce Bent et al.
U.S. Appl. No. 12/453,389, filed May 8, 2009, Bruce Bent et al.
U.S. Appl. No. 12/453,390, filed May 8, 2009, Bruce Bent et al.
U.S. Appl. No. 12/453,390, filed May 8, 2009, Bruce Bent.
U.S. Appl. No. 12/622,979, filed Nov. 20, 2009, Bruce Bent et al.
FDIC Federal Register Citations: Email from Bert Ely to Comments, Mar. 8, 2006, Subject: Large-Bank Deposit Insurance Determination Proposal- RIN 3064-AC98—Regs@fdic.gov. Attached, also from FDIC Federal Register Citations: Email From American Banker, by Bert Ely, Feb. 24, 2006, Viewpoint: FDIC's Account-Link Plan a Pointless, Costly Threat.
Garton, Thomas W.; Are LLC Banks in the Cards? Stay Tuned; Fredrikson & Byron, P.A.; Jun. 2003; http://www.fredlaw.com/articles/banking/bank_0306_twig.html; 2 pages.
*Island Intellectual Property LLC et al. v. Deutsche Bank AG, et al.*; Memorandum and Order; Case 1:09-cv-02675-KBF; Doc. 289; Feb. 14, 2012; pp. 1-28.
*Island Intellectual Property LLC et al. v. Deutsche Bank AG, et al.*; Order; Case 1:09-cv-02675-KBF; Doc. 221; Feb. 14, 2012; pp. 1-34.
*Island Intellectual Property LLC et al. v. Deutsche Bank Trust Company Americas, et al.*; Declaration of Charles R. Macedo 2 in support of Plaintiffs' motions in limine Nos. 4-6; Case 1:09-cv-02675-KBF; Doc. 260; Feb. 3, 2012; pp. 1-3 and Exhibits.
*Island Intellectual Property LLC et al. v. Deutsche Bank Trust Company Americas, et al.*; Defendants' opposition to Plaintiffs' motion in limine #3 to preclude defendants' expert Richard T. Powers from testifying that the Merrill Lynch CMA/ISA product includes omnibus accounts. Case 1:09-cv-02675-KBF; Doc. 269; Feb. 6, 2012; pp. 1-18.
*Island Intellectual Property LLC et al. v. Deutsche Bank Trust Company Americas, et al.*; Defendants' opposition to Plaintiffs' motion in limine #4 to preclude evidence and argument regarding Plaintiffs' confidential Oct. 18, 2000 presentation to American Enterprises Investment Services at trial; Case 1:09-cv-02675-KBF; Doc. 284; Feb. 10, 2012; pp. 1-12.
*Island Intellectual Property LLC et al. v. Deutsche Bank Trust Company Americas, et al.*; Memorandum and Order; Case 1:09-cv-02675-KBF; Doc. 265; Feb. 6, 2012; pp. 1-22.
*Island Intellectual Property LLC et al. v. Deutsche Bank Trust Company Americas, et al.*; Plaintiffs' brief in support of their motion in limine #3 to preclude defendants' expert Richard T. Powers from testifying that the Merrill Lynch CMA/ISA product includes omnibus accounts based on 17-year old double hearsay that is uncorroborated and in contravention of documentary and oral evidence of record; Case 1:09-cv-02675-KBF; Doc. 247; Jan. 30, 2012; pp. 1-20.
*Island Intellectual Property LLC et al. v. Deutsche Bank Trust Company Americas, et al.*; Plaintiffs' memorandum of law in support of motion in limine #4 to preclude evidence and argument regarding Plaintiffs' confidential Oct. 18, 2000 presentation to American Enterprises Investment Services at trial; Case 1 :09-cv-02675-KBF; Doc. 262; Feb. 6, 2012; pp. 1-10.
*Island Intellectual Property LLC et al. v. Deutsche Bank Trust Company Americas, et al.*; Plaintiffs' motion in limine #4 to preclude evidence and argument regarding Plaintiffs' confidential Oct. 18, 2000 presentation to American Enterprises Investment Services at trial; Case 1:09-cv-02675-KBF; Doc. 257; Feb. 3, 2012; pp. 1-10.
*Island Intellectual Property LLC et al. v. Deutsche Bank Trust Company Americas, et al.*; Plaintiffs' Notice of Motion and Motion in Limine #3 to preclude Defendants' expert Richard T. Powers from testifying that the Merrill Lynch CMA/ISA product includes omnibus accounts based on 17-year old double hearsay that is uncorroborated and in contravention of documentary and oral evidence of record; Case 1:09-cv-02675-KBF, Doc. 246; Jan. 30, 2012; pp. 1-2.

*Island Intellectual Property LLC et al. v. Deutsche Bank Trust Company Americas, et al.*; Plaintiffs' notice of motion and motion in limine #3 to preclude testimony of Gilbert Schwartz; Case 1:09-cv-02675-KBF; Doc. 259; Feb. 3, 2012; pp. 1-2.
*Island Intellectual Property LLC et al. v. Deutsche Bank Trust Company Americas, et al.*; Plaintiffs' notice of motion and motion in limine #4 to preclude evidence and argument regarding Plaintiffs' confidential Oct. 18, 2000 presentation to American Enterprises Investment Services at trial; Case 1:09-cv-02675-KBF; Doc. 256; Feb. 3, 2012; pp. 1-2.
Knight-Ridder; Money Matters, Tips you can use—Limits Apply as FDIC Insurance Covers Depositor, Not Account; Chicago Tribune; Feb. 4, 1998; 2 pages.
Lawsuit by Island Intellectual Property LLC against Clearview Correspondent Services, LLC, et al.; Complaint for Patent Infringement; Civil Action No. 1:11-cv-448 (LO/TRJ); Apr. 26, 2011: 55 pages.
Lawsuit by Island Intellectual Property LLC against First Southwest Company; Complaint for Patent Infringement; Civil Action No. 1:11-cv-00371-UNA; Apr. 26, 2011; 42 pages.
*Lawsuit by Island Intellectual Property LLC et al. v. Deutsche Bank Trust Company Americas et al.*; Joint Statement of Claims and Defenses to be Presented at Trial Set for Feb. 27, 2012; Jan. 16, 2012; Case 1:09-cv-02675-KBF (Document 227).
*Lawsuit by Island Intellectual Property LLC v. Clearview Correspondent Services, LLC, et al.*; Branch Banking & Trust Company's Answer to Complaint and Counterclaims; Civil Action No. 1:11-cv-448-LO-IDD; Jun. 20, 2011; 13 pages.
*Lawsuit by Island Intellectual Property LLC v. Clearview Correspondent Services, LLC, et al.*; Clearview Correspondent Services, LLC's Answer to Complaint and Counterclaims; Civil Action No. 1:11-cv-448-LO-IDD; Jun. 20, 2011; 12 pages.
*Lawsuit by Island Intellectual Property LLC v. Clearview Correspondent Services, LLC, et al.*; Scott & Stringfellow, LLC's Answer to Complaint and Counterclaims; Civil Action No. 1:11-cv-448-LO-IDD; Jun. 20, 2011; 12 pages.
*Lawsuit by Island Intellectual Property LLC v. First Southwest Company*; First Southwest Company's Answer to Complaint and Counterclaims; Civil Action 1:11-cv-371-SD; Jun. 20, 2011; 11 pages.
*Lawsuit by Island Intellectual Property LLC, et al. v. Deutsche Bank Trust Company Americas et al.*; Declaration of Olivia M. Kim in Support of Defendants' Motion for Summary Judgement of Invalidity Under 35 U.S.C. §101; Oct. 6, 2011; Case 1:09-cv-02675-VM, Document 197.
*Lawsuit by Island Intellectual Property LLC, et al. v. Deutsche Bank Trust Company Americas, et al.* Plaintiffs' Memorandum of Law in Opposition to Defendants' Motion for Summary Judgment of Invalidity Under 35 U.S.C. § 101; Nov. 2, 2011; Case 1:09-cv-02675-VM, Document 201.
*Lawsuit by Island Intellectual Property LLC, et al. v. Deutsche Bank Trust Company Americas, et al.*; Defendants Reply in Support of Their Motion for Summary Judgment of Invalidity Under 35 U.S.C. § 101; Nov. 15, 2011; Case 1:09-cv-02675-VM, Document 208.
*Lawsuit by Island Intellectual Property LLC, et al. v. Deutsche Bank Trust Company Americas, et al.*; Defendants' Response to Plaintiffs' Statement of Additional Material Facts in Support of Plaintiffs' Opposition to Defendants' Motion for Summary Judgment of Invalidity Under 35 U.S.C. § 101; Nov. 15, 2011; Case 1:09-cv-02675-VM, Document 209.
*Lawsuit by Island Intellectual Property LLC, et al. v. Deutsche Bank Trust Company Americas, et al.*; Order; Dec. 7, 2011; Case 1:09-cv-02675-VM, Document 212.
*Lawsuit by Island Intellectual Property LLC, et al. v. Deutsche Bank Trust Company Americas, et al.*; Special Master's Report and Recommended Decision on Defendants' Summary Judgment Motion of Invalidity Under 35 U.S.C. § 101; Dec. 19, 2011.
*Lawsuit by Island Intellectual Property LLC, et al. v. Deutsche Bank Trust Company Americas, et al.*; Supplemental Declaration of Olivia M. Kim in Support of Defendants' Opening and Reply Claim Construction Briefs; Nov. 15, 2011; Case 1:09-cv-02675-VM, Document 207.
Martens, Don W.; letter to Hon. Victor Marrero re. supplement to letter of Nov. 28, 2011 on tentative rulings on claim construction in *Island Intellectual Property LLC et al. v. Deutsche Bank Trust Co., et al.*; Nov. 28. 2011; Case 1:09-cv-02675-VM; Document 211.
Martens, Don W.; letter to Hon. Victor Marrero re. tentative rulings on claim construction in *Island Intellectual Property LLC et al. v. Deutsche Bank Trust Co., et al.*; Nov. 28, 2011; Case 1:09;; cv-02675-VM, Document 210.
*Lawsuit by Island Intellectual Property LLC, et al. v. Deutsch Bank Trust Company Americas, et al.*; Defendant Deutsche Bank Trust Company Americas' Second Supplemental Responses to Double Rock's Interrogatories Nos. 2, 8 and 9, Jul. 2010, 65 pages.
Exhibit 2, Invalidity Chart: U.S. Pat. No. 4,985,833 (Oncken)—U.S. Pat. 7,668,771, Jul. 2010, 14 pages.
Exhibit 5, Invalidity Chart: Merrill Lynch Business Advantage Program—U.S. Pat. No. 7,668,772, Jul. 2010, 7 pages.
Exhibit 8, Invalidity Chart: Harken Financial Services Sweep Product—U.S. Pat. No. 7,668,771, Jul. 2010, 9 pages.
Exhibit 9, Invalidity Chart: Wayne Hummer—Insured Bank Deposit Program—U.S. Pat. No. 7,668,771, Jul. 2010, 12 pages.
Exhibit 10, Invalidity Chart: U.S. Patent Application Publication No. 2007/0043666 (Burdette) U.S. Pat. No, 7,668,771, Jul. 2010, 9 pages.
Letter to R.M. Zaitzeff, from W.W. Wiles, dated Jun. 22, 1983 (response to May 10, 1983 letter re: offering of MMDAs), 6 pages.
Letter to G.T. Schwartz, from O.I. Ireland, dated Jun. 22, 1988 (response to Dec. 18, 1987 letter re: proposed modifications to Merrill Lynch's CMA Program), 5 pages.
Information Statement, "Alliance Insured Account," Sep. 1999; 6 pages.
Investors MoneyAccount$^{SM}$ and Insurance Plus Service Agreement, attached Schedule A (List of Banks Participating in the Insurance Plus Service), IMAD Mar. 1994, 3 pages.
Investors Money Account$^{SM}$ (an FDIC-insured money market account), IMA-1 (Mar. 1994), 4 pages.
Investors MoneyAccount$^{SM}$, "The FDIC-insured Money Market Investment with an Important Plus," IMA Oct. 1995, 2 pages.
1985 SEC No-Act, LEXIS 2756, Investment Company Act of 1940—Section 3(a)(1), 2(a)(36); Securities Act of 1933—Section 2(1), Nov. 29, 1985, Kemper Finanical Services, Inc., 9 pages.
Insured Money Account Program Agreement and Disclosure Statement, (attached Schedule A—Deposit Account Terms), faxed Mar. 28, 2000; 10 pages.
First National Bank in Brookings, Certificates of Deposit [online] [retrieved on Jul. 17, 2009]. Retrieved from the Internet: Certificates of Deposit, <URL: http://web.archive.org/web/20000524121111/www.firstnb.com/cd/htm>; Multi-Bank CDs, <URL: http://web.archive.org/web/20000524132934/www.firstnb.com/mbcd.htm>, 5 pages.
Summary of Commentary on Current Economic Conditions by Federal Reserve Districts, Jan. 1985, 44 pages.
12 CFR Ch. II (Jan. 1, 2009 Edition), pp. 124-125.
Product Strategy, "Money Fund $$ Moving to Bank Deposits, Distributors Start to Install Bank Deposit Accounts to Replace Money Funds," 6 FRC Monitor, Dec. 2003, 2 pages.
Board of Governors of the Federal Reserve System, "The May 1998 Senior Financial Officer Survey," May 1998, (attached Appendix A: Survey Questions and Responses; Appendix B: Glossary; Appendix C: Examples of Key Reserve Concepts), 48 pages.
Interest Rate Review, A Publication of the Meyer Weekly Interest Rate Survey, "A Look at Tiers," Apr. 1987, 6 pages, vol. 11, No. 4.
LexisNexis, The American Banker, "Merrill Joins Money Market Account, CMA; Broker Begins Testing With 12 Institutions," Sep. 23, 1983, 4 pages.
Bent et al., Office Action, U.S. Appl. No. 10/071,053, with attached SB08, date considered Mar. 10, 2009, 2 pages.
Merrill Lynch & You, "Financial Services The Way You Want, When You Want Them," Jan. 2000, 16 pages.
Exhibit 1, "FA/FB Account 1997 First Transactions, TRX Types: PU, PP, TA, PT," Aug. 2003, p. 1-2.
Advertisement: Where Your Interest is?, Mutual Funds, Oct. 1997; 1 page.
Advertisement: It's 1997, Do You Know Where Your Interest Is?, Mutual Funds, Dec. 1993, p. 46.
USPTO Office Action, Interview Summary, U.S. Appl. No. 11/767,827, Date Mailed Sep. 23, 2009, 4 pages.

USPTO Office Action, Office Action Summary, U.S. Appl. No. 11/767,827, Date Mailed Jun. 5, 2009, 35 pages.
Service Mark Application, Applicant: Reserve Management Corporation, Mark: Reserve Insured Deposits, (attached Power of Attorney, Declaration, Drawing Page, Sep. 21, 2001, 6 pages.
Letter to C.R. Macedo, from R.L. Rainey, Re: Promontory Interfinancial Network, LLC, dated Jul. 22, 2008, (attached Attachments A-E), 35 pages.
Letter to C.R. Macedo, from R.L. Rainey, Re: Promontory Interfinancial Network, LLC, dated Oct. 16, 2008, (attached Attachments A-C), 22 pages.
Letter to C.R. Macedo, from R.L. Rainey, Re: Promontory Interfinancial Network, LLC, dated Feb. 23, 2009, (attached Exhibit A-B), 21 pages.
Merrill Lynch & Co., Inc., Form 10-K405 (Annual Report (Regulation S-K, item 405)), Filed Mar. 14, 2002 for the Period Ending Dec. 28, 2001, 248 pages.
Merrill Lynch, "Information Statement Regarding changes to Interest Rates on Deposits in the Merrill Lynch Banks," Nov. 12, 2007, 2 pages.
QUESTessentials, "Quest Insured Account," May 17, 1994, 3 pages.
OCC Insured Bank Deposit Account (attached are p. 2 of Quest for Value Funds Daily Data, Jun. 1993; OCC Insured Account Rate Table), 3 pages.
CIBC World Markets, "Insured Bank Deposit Account," Information Statement, Jul. 1, 2000, 2 pages.
Letter to Client, from M.J. Hensle, Re: Salomon Smith Barney Bank Deposit Program$^{SM}$, (attached Q&A: Important Information about the New Salomon Smith Barney Bank Deposit Program), Aug. 16, 2002, 14 pages.
FDIC, FDIC Law, Regulations, Related Acts—4000—Advisory Opinions, Oct. 22, 1987, J. W. Via, Jr., Counsel [online] [Retrieved on Jan. 22, 2010]. Retrieved from the Internet: URL: <http://www.fdic.gov/regulations/laws/rules/4000-2560.html>, 1 page.
FDIC, FDIC Law, Regulations, Related Acts—4000—Advisory Opinions, Jun. 28, 1993, J. A. DiNuzzo, [online] [Retrieved on Jan. 22, 2010]. Retrieved from the Internet: URL: <www.fdic.gov/regulations/laws/rules/4000-8240.html>, 2 pages.
FDIC, FDIC Law, Regulations, Related Acts—4000—Advisory Opinions, Jul. 23, 1986, D. H. Jones [online] [Retrieved on Jan. 22, 2010]. Retrieved from the Internet: URL: <www.fdic.gov/regulations/laws/rules/4000-2120.html#fdic400086-21>, 2 pages.
Merrill Lynch—Pierce, Fenner & Smith, Inc., "The Merrill Lynch Cash Management Account®," Financial Service, Jan. 1985, 18 pages.
CMA, "A Guide to Your CMA Account," Jan. 1995, 38 pages.
American Banker, Salomon's Sweep Plan Raises FDIC Fund Alarm [online], Dec. 6, 2000 [retrieved on Apr. 13, 2009]. Retrieved form the Internet: <URL: http//www.americanbanker.com/printthis.html?id=2000120603YJGEZD>, 2 pages.
The Insured Deposit Account: "Money in the Bank," p. 5; Three Little Letters. Three Big Ways to Save in 1998, p. 4.
LexisNexis, The American Banker, Sep. 23, 1983, Merrill Joins Money Market Account, CMA; Broker Begins Testing With 12 Institutions, Byline: A. Arvan, 4 pages.
Merrill Lynch & Co Inc—MER, 10k Wizard, Form 8-K, "Report of Unscheduled Material Events or Corporate Changes," Filed Mar. 7, 2002, 51 pages.
Federal Reserve System, LEXSEE 51 FR 9632, "Definition of Deposit and Technical Amendments," Action: Final Rule, Mar. 20, 1986, 13 pages.
Federal Reserve System, LEXSEE 56 FR 15494, "Regulation D—Reserve Requirements of Depository Institutions," Action: Final Rule, Apr. 17, 1991, 5 pages.
Federal Reserve System, Part 201—Reserve Requirements of Depository Institutions (Regulation D)12 CFR Ch. II (Jan. 1, 2010 Edition), pp. 94-128, Pt. 204-Pt. 205.
Letter to G.T. Schwartz, from O.I. Ireland, dated Jun. 22, 1988, Re: response to letter of Dec. 18, 1987 regarding proposed modifications to Merrill Lynch's CMA Program, 5 pages.
Federal Reserve System, LEXSEE 47 FR 55207, "Reserve Requirements of Depository Institutions; Money Market Deposit Account," Dec. 8, 1982, Action: Final Rule, 5 pages.

Insured Bank Deposits™ Program Information Statement, (attached List of Eligible Program Banks, Effective May 9, 2002; New Account Application, Joint Account Agreement), 11 pages.
Memorandum to M. Peterson, J. Whitt, R. Wroten, E. Naumes, E. Deal, B. McCain, from J.E. Oncken, Jun. 15, 1990, Re: Insured Savings Update (with attachments), 7 pages.
Insured Savings, "Project Team Meeting," Feb. 2, 1989, 21 pages.
Insured Savings, "Overview & Marketing Plan," Presented by: J.E. Oncken, Dec. 6, 1988, (including Exhibit A), 23 pages.
Letter to V.J. Best, from J.E. Oncken, dated Apr. 18, 1988, 2 pages.
Letter to M.L. Duke from K. Johnson, dated Dec. 27, 1989, (attached Insured Savings Correspondent Agreement, Exhibits A-D, letter to M.L. Duke from K. Johnson dated Nov. 21, 1989 and Account Information Sheet), 39 pages.
Memorandum to J. Oncken, J. Scurlock, B. Standefer, E. Piner, T. Cyr, from K. Johnson, dated Jul. 5, 1990, Re: Attached Insured Savings Letters (with attachments), 9 pages.
E.D.S.—First City Austin Electronic Mail, from J. Oncken, to T. Cyr, Re: Depository Levels at Insured Savings Depositories, Nov. 2, 1989, 1 page.
Cash Management Balance Monitoring Agreement and Memorandum from Ed Piner to Cash management Line of Business Representatives dated May 21, 1991(with attachments), 8 pages.
Merrill Lynch, Insured Savings Account Fact Sheet, The Merrill Lynch Cash Management Account® Financial Service, Jan. 1986, 4 pages.
Merrill Lynch Money Markets, Inc., Merrill Lynch Capital Markets, "The Insured Savings Account, Issuer Guide to Offering MMDAs through Merrill Lynch," Sep. 1986; 36 pages.
Merrill Lynch, The Merrill Lynch Capital Builder$^{SM}$ Account Financial Service, Insured Savings$^{SM}$ Account Participating Depository Institutions, 1996, 2 pages.
Insured Deposit Account, May 21, 1996, 14 pages.
Smith Barney Inc. Capital Markets, Debt Origination Group Memo, to J. Mandelbaum, from T. Hamilton, cc: R. Holloman, H. Bald, S. Becton, Re: Insured Deposit Account, Oct. 10, 1995; Smith Barney Inc. Capital Markets, Debt Origination Group Memo, to B. Holloman, from T. Hamilton, cc: W. Heinzerling, H. Morris, COPs, Re: New Product Proposal for Insured Deposit Account, Sep. 18, 1995, 2 pages.
Insured Deposit Account, Product Description for the Investor, Draft as of Sep. 20, 1995, 8 pages.
Campbell, Andrew, et al.; A new standard for deposit insurance and government guarantees after the crisis; Journal of Financial Regulation and Compliance, vol. 17 No. 3, 2009; pp. 210-239.
Cynamon et al.; Redefining the Monetary Aggregates: A Clean Sweep; Eastern Economic Journal, vol. 32, No. 4, Fall 2006; pp. 661-672.
Hencke, Christopher; New Rules for FDIC Deposit Insurance; ABA Bank Compliance, Jul./Aug. 1999, 20, 7; pp. 31-37.
Scottrade Bank Deposit Program—Terms, Conditions & Disclosures; Author unknown; Aug. 2011; pp. 1-3.
Information Statement, "Quest Insured Account," (attached Appendix A), 5 pages; Assume 2010 or earlier. Assume 2010 or earlier.
Merrill Lynch, "Insured Savings™ Account Fact Sheet," The Merrill Lynch Cash Management Account® Financial Service, 1987; 11 pages.
Insured Bank Deposits™ Program Summary Information Statement, Feb. 2005; 11 pages.
Wayne Hummer Investments, "Insured Bank Deposits™ Program, Frequently Asked Questions," 4 pages. Assume 2002.
Insured Savings, "Correspondent Agreement." including Exhibits A-D, 1989; 28 pages.
An Introduction to the Smith Barney Insured Deposit Account, Sep. 1995; 8 pages.
Salomon Smith Barney, "Bank Deposit Program Disclosure Statement," Assume 2010 or earlier; 3 pages.
"Bank of Oak Ridge to Offer FDIC Insurance on up to $1.5 Million," Dialog Web Command Mode, 2 Sheets, Sep. 25, 2003, http://www.dialogweb.com/cgi/dwclient.
"Man Bites Dog: Funds Move Into Banking," IBC's Money Fund Selector, 2 Sheets, Nov. 6, 1998.

"Reverse Ups Insurance Limit on Money Market Account," Thomson Financial Inc., Mutual Fund Market News, 1 Sheet, Aug. 26, 2002.
"The Bank of New York adds a $300,000 FDIC-Insured Money Market Account Option to its Dividend Income Checking Account," PR Newswire Associations, Inc., PR Newswire, 2 Sheets, Apr. 18, 2002.
U.S. Appl. No. 12/025,402, filed Feb. 4, 2008, Bent.
U.S. Appl. No. 12/794,448, filed Jun. 4, 2010, Bruce Bent et al.
U.S. Appl. No. 12/794,545, filed Jun. 4, 2010, Bruce Bent et al.
U.S. Appl. No. 12/816,092, filed Jun. 15, 2010, Bruce Bent, II et al.
U.S. Appl. No. 12/829,961, filed Jul. 2, 2010, Bruce Bent et al.
"The Reverse Funds to Offer up to $600,000 of FDIC Insurance on Reserve Insured Deposits; Addressing Investor Needs for Increased Safety, Flexibility and a Competitive Yield," Business Wire, Inc. Business Wire, 2 Sheets, Aug. 13, 2002.
12 CFR Part 329—Interest on Deposit, Source: 51 FR 10808, Mar. 31, 1986, 5 Sheets.
AB 2011 Assembly Bill—Bill Analysis, Senate Amendments, http://www.leginfo.ca.gov/pub/bill/asm/ab_2001-2050/ab_2011_cfa_20060811_161755_asm_floor.html, 2006, pp. 1-3.
AB 2011 Assembly Bill—Bill Analysis, Senate Rules Committee, Third Reading, http://www.leginfo.ca.gov/pub/bill/asm/ab_2001-2050/ab_2011_cfa_20060705_161454_sen_floor.html, 2006, pp. 1-7.
AB 2011 Assembly Bill—Chaptered, http://www.leginfo.ca.gov/pub/bill/asm/ab_2001-2050/ab_2011_bill_20060925_chaptered.html, 2006, pp. 1-3.
AB 2011 Assembly Bill—Enrolled, http://www.leginfo.ca.gov/pub/bill/asm/ab_2001-2050/ab_2011_bill_20060816_enrolled.html, 2006, pp. 1-3.
AB 2011 Assembly Bill—History, Complete Bill History, http://www.leginfo.ca.gov/pub/bill/asm/ab_2001-2050/ab_2011_bill_20060925_history.html, 2006, p. 1.
About iMoneyNet, Inc., About iMoneyNet's Money Funds Division, 4 Sheets, Aug. 21, 2003, http://www.ibcdata.com/about.htm.
Adler, Joe, "Promontory to Roll Out Deposit Service Insuring Liquid Funds", American Banker, Feb. 22, 2010, 1 sheet.
An iMoneyNet Special Report, Brokerage Cash Sweep Options: The Shift from Money Funds to FDIC-Insured Bank Deposit Accounts, by Peter G. Crane & Michael F. Krasner, iMoneyNet, Nov. 2004, 66 pages.
Anderson et al. "Retail Sweep Programs and Bank Reserves," Federal Reserve Bank of St. Louis Review, Bell & Howell Information and Learning Company, vol. 83, Issue 1, 24 Sheets, Jan. 1, 2001.
Announcing Changes in Automatic "Sweep" Investment Options, LPL Financial Services, Linsco/Private Ledger, Member NASD/SIPC, 26 Sheets.
Bank Deposit Program, Online http://web.archive.org/web/20030620100115/http:/www.smithbarney.com/products_servi, Jan. 19, 2001, 4 Sheets.
Bent, "Bruce Bent Makes Money Market Funds Act Like Bank Accounts," Equity BBDP, Oct. 5, 1998, 3 Sheets.
Blackwell, "ABA to Approve System for Sharing Deposit Coverage," American Banker, 2 sheets, Feb. 11, 2003.
Blackwell, "New Pitch: Deposit Insurance Sharing," American Banker Online, 4 Sheets, Jan. 21, 2003.
Board of Governors of the Federal Reserve System, 1984 Fed. Res. Interp. Ltr. Lexis 56, Nov. 16, 1984, 3 Sheets.
Board of Governors of the Federal Reserve System, 1988 Fed. Res. Intern. Ltr. Lexis 141, Jun. 22, 1988, 3 Sheets.
Board of Governors of the Federal Reserve System, 1989 Fed. Res. Intern. Ltr. Lexis 154, Jun. 21, 1989, 2 Sheets.
Board of Governors of the Federal Reserve System, 1989 Fed. Res. Interp. Ltr. Lexis 77, Mar. 14, 1989, 2 Sheets.
Board of Governors of the Federal Reserve System, 1990 Fed. Res. Interp. Ltr. Lexis 94, Feb. 1, 1990, 1 Sheet.
Board of Governors of the Federal Reserve System, 1991 Fed. Res. Interp. Ltr. Lexis 232, Jan. 30, 1991, 2 Sheets.
Board of Governors of the Federal Reserve System, 1994 Fed. Res. Intern. Ltr. Lexis 156, Jun. 24, 1994, 3 Sheets.
Board of Governors of the Federal Reserve System, 1994 Fed. Res. Interp. Ltr. Lexis 314, Oct. 17, 1994, 2 Sheets.
Board of Governors of the Federal Reserve System, 1994 Fed. Res. Interp. Ltr. Lexis 419, Oct. 14, 1994, 4 Sheets.
Britt, "Struggling with Sweep Accounts," America's Community Banker, vol. 6, No. 12, 11 Sheets, Dec. 1, 1997.
California Independent Bankers, ICBA Independent Community Bankers of America, Banker Bulletin, 2006, CIB 16th Annual Convention, vol. 4, issue 6, http://www.cib.org/banker_bulletin.htm.
Capital Briefs: Corporate Checking Account Relief Sought, American Banker, vol. 162, Jul. 28, 1997, 1 Sheet.
Certificate of Deposit Registry Service: Keeping Deposits in the Corn Patch, Banknews, 2 Sheets, Mar. 2003.
Chapelle et al. "Peering Into Tomorrow: At the Threshold of a New Century, Brokers and Others Discuss Where They were Going," Securities Data Publishing on Wall Street, 6 Sheets, Dec. 1, 1999.
Chapelle, "Merrill's Rivals Say They, Too, Offer Services Beyond Banking," Securities Data Publishing On Wall Street, 2 Sheets, Feb. 1, 2003.
CMA, Insured Savings Account Fact Sheet, Merrill Lynch, Pierce, Fenner & Smith Incorporated, 1997, pp. 49-57.
CMA, Insured Savings Account Fact Sheet, Merrill Lynch, Pierce, Fenner & Smith Incorporated, Jul. 1994, pp. 47-54.
CMA, The Investor Credit Line Service, Cost-Effective Financing for the '90s, Merrill Lynch, Pierce, Fenner & Smith Incorporated, 1997, pp. 36-46.
CMA, The Merrill Lynch Cash Management Account Financial Service, Insured Savings Account Participating Depository Institutions, Merrill Lynch, Pierce, Fenner & Smith Incorporated, Mar. 1995, 2 Sheets.
CMA, The Merrill Lynch Cash Management Account Financial Service, Insured Savings Account Participating Depository Institutions, Merrill Lynch, Pierce, Fenner & Smith Incorporated, Nov. 1992, 2 Sheets.
CMA, The Merrill Lynch Cash Management Account Financial Service, Merrill Lynch, Pierce, Fenner & Smith Incorporated, Jan. 1997, 35 Sheets.
Litigation Notice After Payment of Issue Fee filed in Parent U.S. Appl. No. 10/382,946, Apr. 3, 2009, 160 pages.
Coyle, "A Look at commercial Demand Deposit Options," America's Community Banker, vol. 9, Issue 2, Bell & Howell Information and Learning Company, 9 Sheets, Feb. 1, 2000.
Crockett, "Big Banks Found Stepping Up Marketing of 'Sweep' Accounts," American Banker, vol. 159, No. 198, American Banker Inc., 3 Sheets, Oct. 13, 1994.
Declaration of Mr. Bruce Bent II, Vice Chairman and Registrant of Applicant on the date of first commercial use of the service providing interest and FDIC insurance for checking accounts by means of a system using money market deposit accounts (MMDA's) of Oct. 23, 1997.
Declaration of Mr. Bruce Bent II, Vice Chairman and Registrant of Applicant. (3 Sheets) and Exhibits A, B, C and D, Mar. 1, 2007, (6 Sheets).
Deposit Growth Strategies for Financial Institutions, New Sweep Account Helps Retain $40 Million in Business Deposits, vol. 7, No. 12, The Reserve Funds, May 2001, 1 Sheet.
Deutsche Bank Insured Deposit Program, Marketing Literature 2007, 3 pages.
DI 48, Excerpts of Transcript of Hearing, U.S, Dist. Ct., District of Delaware, Civil Action No. 82-680, Apr. 8, 1983, 5 sheets.
DI 56, Interrog. Response, U.S. Dist. Ct. District of Delaware, Civil Action No. 82-680, May 20, 1983, 15 Sheets.
DI 99, Suppl. Interrogatory Response, U.S. Dist. Ct., District of Delaware, Civil Action No. 82-630. May 30, 1984, 6 Sheets.
Dreyfus Insured Deposit Program, Disclosure Statement and Terms and Conditions, Dreyfus A BNY Mellon Company, Jan. 2008, 8 Sheets.
Dreyfus Insured Deposit Program, Multiple List Program—Effective May 11, 2009, 1 Sheet.
Email from Olivia Kim to Charles Macedo on Jun. 9, 2010 with attachment of Lawsuit by Island Intellectual Property LLC, Lids Capital LLC, Double Rock Corporation, and Intrasweep LLC against Deutshe Bank Trust Company Americas and Total Bank Solutions, LLC, Defendant Deutsche Bank Trust Company America's responses to Intrasweep's common interrogatory Nos. 1-5, Confidential-Attorneys only, Civil Action No. 09 Civ. 2675 (VM) (AJP).
Email from Olivia Kim to Charles Macedo on May 13, 2010 with attachment of Lawsuit by Island Intellectual Property LLC, Lids Capital LLC, Double Rock Corporation, and Intrasweep LLC against Deutshe Bank Trust Company Americas and Total Bank Solutions, LLC, Defendant Deutsche Bank Trust Company America's responses to Double Rock's Common interrogatory Nos. 1-10 to defendants Reservation of Right, Civil Action No. 09 Civ. 2675 (VM) (AJP).
Email from Olivia Kim to Charles Macedo on May 13, 2010 with attachment of Lawsuit by Island Intellectual Property LLC, Lids Capital LLC, Double Rock Corporation, and Intrasweep LLC against Deutshe Bank Trust Company Americas and Total Bank Solutions, LLC, Defendant Total Bank Solutions, LLC's responses to Double Rock's Common interrogatory Nos. 1-10 to defendants, Reservation of Right, Civil Action No. 09 Civ. 2675 (VM) (AJP).
FDIC, Federal Deposit Insurance Corporation, Letter to Mr. Ronald Rexter, Feb. 28, 2003, From Michelle M. Borzillo, Counsel Supervision and Legislation Section, 2 Sheets.
Federal Register: Oct. 9, 1997 (vol. 62, No. 196), pp. 52809-52868. http://www.fdic.gov/news/news/inactivefinancial/1997/fil97111b.html.
Financial Services Industry, "Web Watch: Trading Company Bundles CDs for Better Rates," Community Banker, Jun. 2002, online, http://findarticles.com/p/articles/mi_qa5344/is_200206/ai_n21313883/.
Finistar Reg. No. 2,939,558, Registered Apr. 12, 2005.
Finistar, Providing FDIC Insured Funds as a Stable Source of Deposits to Commercial Banking Institutions, 16 Sheets, www.Finistar.com.
Fredrickson, "Rising Rates Rescue Money Fund Firm Reserve Profits by Picking Niches," Crain's New York Business, Crain Communications Inc., vol. 20, Issue 51, 2 Sheets, Dec. 20, 2004.
Frost Bank, Member FDIC, Checking Accounts, 1 Sheet, Sep. 19, 2003, https://www.frostbank.com/cgi-bin/ecomm/frost1/scripts/products/product_detail.jsp?BV_ . . .
Garmhausen, "Matching Small Banks with Large Muni Deposits," American Banker, Online The Financial Services Resource, Oct. 4, 2005, 4 pages, http://www.finstar.com/docs/AmericanBankerhtml.
Heavyweight Funding, Bankers News, Mar. 4, 2003, vol. II, Issue No. 5, 2 Sheets.
Hencke, "New Rules for FDIC deposit Insurance", ABA Bank Compliance, vol. 20, No. 7, Jul./Aug. 1999, pp. 31-37.
Hoffman, "Reserve's FDIC-Insured Account Draws Regionals; But some see little need for insurance," Crain Communications Inc., Investment News, 2 Sheets, Jun. 4, 2001.
IDC Deposits, online, http://idcdeposits.com/, 2009, 1 Sheet.
In the Know, Important Information About Your Account, Smith Barney Citigroup, 2005, 6 Sheets.
Insured Bank Deposit Program Summary Information Statement, Information Statement, and list of Eligible Program Banks Effective Feb. 10, 2005, 11 pages.
Insured Cash Account Program Disclosure Booklet, LPL Financial Services, Linsco/Private Ledger, Member NASD/SIPC, Apr. 2006, 14 pages.
Jong et al., "The Valuation and Hedging of Variable Rate Savings Accounts," University of Amsterdam, Nov. 15, 2001, 23 Sheets.
Keenan, "Tapping Brokerages for Alternative to CDs," American Banker, The Financial Services Daily, 3 Sheets, Feb. 18, 2004.
Lake Forest Bank & Trust Company, Introducing MaxSafe Deposit Accounts with up to $3.75 Million in FDIC Insurance, www.lakeforestbank.com/maxsafe, Nov. 21, 2008, 2 Sheets.
Lavine, "Check Out High-Yield Checking Accounts," Broward Daily Business Review, vol. 39, No. 102, 2 Sheets, Apr. 27, 1998.
Lawsuit by Island Intellectual Property LLC, Lids Capital, LLC, Double Rock Corporation and Intrasweep LLC, against Promontory Interfinancial Network, LLC, Deutsche Bank AG, Deutsche Bank Trust Company Americas and Total Bank Solutions, LLC, Complaint, Apr. 14, 2009, Case No. 09 CV 3750.
Lawsuit by Carlo DeBlasio et al. against Merrill Lynch & Co., Inc. et al., Declaration of Andrew W. Stern, including Exhibits A, B, C, D, E and F, Nov. 12, 2007, Case No. 07-cv-318 (RJS) (Document 59).

Lawsuit by Carlo DeBlasio et al. against Merrill Lynch & Co., Inc. et al., Declaration of Joel P. Laitman in Support of Plaintiffs' Memorandum of Law in Opposition to Defendants' Motion For Dismissal of the Second Amended Class Action Complaint, Including: "Client Commitment"; "Cash Management Account"; "Information Statement Regarding Changes to Interest Rates on Deposits in Merrill Lynch Banks", Feb. 5, 2008.
Lawsuit by Carlo DeBlasio et al. against Merrill Lynch & Co., Inc. et al., Declaration of Joel P. Laitman in Support of Plaintiffs' Memorandum of Law in Opposition to Defendants' Motion for Dismissal of the Second Amended Class Action Complaint, Including: . . . Feb. 5, 2008 (Document 72).
Lawsuit by Carlo DeBlasio et al. against Merrill Lynch & Co., Inc. et al., Declaration of Joel P. Laitman in Support of Plaintiffs' Memorandum of Law in Opposition to Defendants' Motion for Dismissal of the Second Amended Class Action Complaint, Including: . . . Feb. 5, 2008 (Document 73).
Lawsuit by Carlo DeBlasio et al. against Merrill Lynch & Co., Inc. et al., Declaration of Joel P. Laitman in Support of Plaintiffs' Memorandum of Law in Opposition to Defendants' Dismissal of the Second Amended Class Action Complaint, Including: . . . Feb. 5, 2008 (Document 74).
Lawsuit by Carlo DeBlasio et al. against Merrill Lynch & Co., Inc. et al., Declaration of Joel P. Laitman in Support of Plaintiffs' Memorandum of Law in Opposition to Defendants' Motion For Dismissal of the Second Amended Class Action Complaint, Including: . . . Feb. 5, 2008 (Document 75).
Lawsuit by Carlo DeBlasio et al. against Merrill Lynch & Co., Inc. et al., Declaration of Kenneth I. Schacter, including Exhibits A, B, C, D, F, G, H, I, J, K, L, M, N, O, P, Q and R, Nov. 14, 2007, Case No. 07-cv-318 (RJS) (Document 69).
Lawsuit by Carlo DeBlasio at al. against Merrill Lynch & Co., Declaration of Matthew J. Terry in Support of Motion to Dismiss by Defendants Wachovia Corporation, Wachovia Securities, LLC, Wachovia Bank, N.A., and Wachovia Bank of Delaware, N.A., including Exhibits A, B, C and D, Nov. 14, 2007, Case No. 07-318 (RJS) (Document 67).
Lawsuit by Carlo DeBlasio et al. against Merrill Lynch & Co., Inc. et al., Declaration of Scott D. Musoff in Support of The Merrill Lynch Defendants' Motion to Dismiss The Second Amended Class Action Complaint, ECF Case, Nov. 12, 2007, Case No. 07-cv-318 (RJS) (Document 64).
Lawsuit by Carlo DeBlasio et al. against Merrill Lynch & Co., Inc, et al., Reply Declaration of Kenneth Schacter including Exhibits S and T, Mar. 6, 2008, Case No. 07-cv-318 (RJS) (Document 81).
Lawsuit by Carlo DeBlasio et al. against Merrill Lynch & Co., Inc. et al., Second Amanded Class Action Complaint, Jury Trial Demanded, Introduction and Summary of Allegations, Jun. 11, 2007, Case No. 07-cv-318-VM.
Lawsuit by Carlo DeBlasio et al. against Merrill Lynch & Co., Inc. et al., Supplemental Declaration of Matthew J. Terry in Support of Motion to Dismiss by Defendants Wachovia Corp., Wachova Securities, LLC, Wachovia Bank N.A., and Wachovia Bank of Delaware, N.A., including Exhibits A and B, Mar. 6, 2008, Case No. 07-cv-318 (RJS) (Document 79).
Lawsuit by Carlo DeBlasio, et al. against Merrill Lynch & Co., Inc., et al., Opinion and Order Regarding motions, Jul. 27, 2009, Case No. 07 CIV 318(RJS).
Lawsuit by Island Intellectual Property LLC and Intrasweep LLC against Deutsche Bank Trust Company Americas and Total Bank Solutions, LLC, Deutsche Bank Trust Company Americas' answer to plaintiffs' Feb. 23, 2010 complaint and counterclaims, May 4, 2010, Civil Action No. 09 Civ. 2675 (VM) (AJP)(Document 111).
Lawsuit by Island Intellectual Property LLC and Intrasweep LLC against Deutsche Bank Trust Company Americas and Total Bank Solutions, LLC. Total Bank Solutions, LLC's answer to plaintiffs' Feb. 23, 2010 complaint and counterclaims, May 4, 2010, Civil Action No. 09 Civ. 2675 (VM) (AJP) (Document 112)
Lawsuit by Island Intellectual Property LLC and Intrasweep LLC against Institutional Deposits Corp. The Island Plaintiffs' Complaint against Defendant Institutional Deposits Corp., Nov. 4, 2009, Civil Action No. 1 09-CV-3079.

Lawsuit by Island Intellectual Property LLC and Intrasweep LLC against Institutional Deposits Corp., Complaint for Patent Infringement, Jury Trial Demanded, Nov. 4, 2009, Civil Action No. 09 CV 3079.

Lawsuit by Island Intellectual Property LLC and Intrasweep LLC against Institutional Deposits Corp., Consent Order, Apr. 21, 2010, Case No. 09-CV-3079 (Document 44).

Lawsuits by Island Intellectual Property LLC and Intrasweep LLC, Answer of Defendant Institutional Deposits Corp. to Complaint for Patent Infringement, Dec. 10, 2009, Case No. 09 CV 03079 (JEC), (Document 16).

Lawsuit by Island Intellectual Property LLC and Lids Capital LLC against Deutsche Bank Trust Company Americas and Total Bank Solutions, LLC, Deutsche Bank Trust Company answer to plaintiffs' Mar. 16, 2010 complaint and counterclaims, May 4, 2010, Civil Action No. 09 Civ. 2675 (VM) (AJP) (Document 113).

Lawsuit by Island Intellectual Property LLC and Lids Capital LLC against Deutsche Bank Trust Company Americas and Total Bank Solutions, LLC, Total Bank Solutions, LLC's answer to plaintiffs' Mar. 16, 2010 complaint and counterclaims, May 4, 2010, Civil Action No. 09 Civ. 2675 (VM)(Document 114).

Lawsuit by Island Intellectual Property LLC et al., against Deutsche Bank Trust Company Americas, et al.; Expert Report of Richard T. Powers Concerning Invalidity of U.S. Pat. Nos. 7,509,286; 7,519,551; 7,536,350; 7,668,771; 7,668,772, 7,672,886; and 7,680,734; and Exhibits A-R; Civil Action No. 09 Civ. 2675(VM)(AJP), Oct. 28, 2010; 1.119 pages.

Lawsuit by Island Intellectual Property LLC, et al. against Deutsche Bank Trust Company Americas, et al,. Defendant Deutsch Bank Trust Company Americas' Responses to Double Rock's Interrogatories Nos. 1-10; May 2010; Civil Action No. 09 Civ. 2675 (VM)(AJP).

Lawsuit by Island Intellectual Property LLC, et al. against Deutsche Bank Trust Company Americas, et al.; Expert Report of Ivan Zatkovich Regarding Validity and Enforceability of the Asserted Claims of the Patents-in-Suit; Civil Action No. 09 Civ. 2675 (VM)(AJP); Nov. 23, 2010; 192 pages. The Redacted items were designated as confidential in a Protective Order in this case.

Lawsuit by Island Intellectual Property LLC, et al. against Deutsche Bank Trust Company Americas, et al.; Expert Report of the Honorable Gerald J. Mossinghoff and Exhibits A-E; Civil Action No. 09 Civ. 2675 (VM)(AJP); Nov. 23, 2010; 107 pages.

Lawsuit by Island Intellectual Property LLC, et al. against Deutsche Bank Trust Company Americas; Defendant Total Bank Solutions, LLC's Responses to Double Rock's Common Interrogatory Nos. 1-10 to Defendants; May 2010; Civil Action No. 09 Civ. 2675 (VM)(AJP).

Lawsuit by Island Intellectual Property LLC, et al., against Deutsche Bank Trust Company Americas, et al.; Defendant Deutsche Bank Trust Company Americas' Fifth Supplemental Responses to Island IP's First Set of Common Interrogatories to All Defendants (No. 7); Case No. 09 Civ. 2675 (VM)(AJP); Sep. 16, 2010; 9 pages.

Lawsuit by Island Intellectual Property LLC, et al., against Deutsche Bank Trust Company Americas, et al.; Defendant Total Bank Solutions, LLC's Fifth Supplemental Responses to Island IP's First Set of Common Interrogatories to All Defendants (No. 7); Case No. 09 Civ. 2675 (VM)(AJP); Sep. 16, 2010; 9 pages.

Lawsuit by Island Intellectual Property LLC, Intrasweep LLC and Double Rock Corporation against Deutsche Bank AG, Deutsche Bank Trust Company Americas and Total Bank Solutions, LLC, Complaint for Patent Infringement, May 19, 2009, Case No. 09 CIV 4673.

Lawsuit by Island Intellectual Property LLC, Lids Capital LLC, and Double Rock Corporation against Deutsche Bank AG, Deutsche Bank Trust Company Americas and Total Bank Solutions, LLC, including Cover Sheet, Summons, Complaint and Rule 7.1 Statement, Mar. 24, 2009, Case No. 09 CV 2677.

Lawsuit by Island Intellectual Property LLC, Lids Capital LLC, and Double Rock Corporation against Promontory Interfinancial Network, LLC and MBSC Securities Corporation, including Cover Sheet, Summons, Complaint and Rule 7.1 Statement, Mar. 24, 2009, Case No. 09 CV 2675.

Lawsuit by Island Intellectual Property LLC, Lids Capital LLC, Double Rock Corporation and Intrasweep LLC against Deutsche Bank AG, Deutsche Bank Trust Company Americas and Total Bank Solutions, LLC, Stipulated Dismissal of Deutsche Bank AG Without Prejudice, Nov. 19, 2009, Civil Action No. 09 CIV 2675 (VM) (AJP) (Document 79).

Lawsuit by Island Intellectual Property LLC, Lids Capital LLC, Double Rock Corporation and Intrasweep LLC against Deutsche Bank Trust Company Americas and Total Bank Solutions, LLC, Deutsche Bank Trust Company Americas' First Amended Answer to Consolidated First Amended Complaint and Counterclaims, Dec. 4, 2009, Civil Action No. 09 CIV 2675 (VM) (AJP), (Document 86).

Lawsuit by Island Intellectual Property LLC, Lids Capital LLC, Double Rock Corporation Intrasweep LLC against Deutsche Bank Trust Company Americas and Total Bank Solutions, LLC, Total Bank Solutions, LLC's First Amended Answer to Consolidated First Amended Complaint and Counterclaims Dec. 4, 2009, Civil Action No. 09 CIV 2675 (VM) (AJP) (Document 87).

Lawsuit by Island Intellectual Property LLC, Lids Capital LLC, Double Rock Corporation and Intrasweep LLC Against Promontory Interfinancial Network LLC, MBSC Securities Corporation, Deutsche Bank AG, Deutsche Bank Trust Company Americas and Total Bank Solutions, LLC, Answer and Counter Claims, Answer of Defendant MBSC Securities Corporation, Jun. 25, 2009, Case No. 09 CV 2675.

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Answer and Counter Claims, Answer of Defendant Promontory Interfinancial Network, LLC, Jun. 25, 2009, Case No. 09 CV 2675.

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Consolidated First Amended Complaint, Jury Trial Demanded, Jun. 11, 2009, Civil Action No. 09 CIV 2675 (VM).

Lawsuit by Island Intellectual Property LLC, Lids Capital LLC, Double Rock Corporation and Intrasweep LLC against Promontory Interfinancial Network LLC, MBSC Securities Corporation Deutsche Bank AG, Deutsche Bank Trust Company Americas and Total Bank Solutions, LLC, Jury Trial Demanded, Deutsche Bank AG's Answer To Consolidated First Amended Complaint, Jun. 25, 2009, Civil Action No. 09 CIV 2675.

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Jury Trial Demanded, Deutsche Bank Trust Company Americas' Answer To Consolidated First Amended Complaint and Counter Claims, Jun. 25, 2009, Civil Action No. 09 CIV 2675.

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Jury Trial Demanded, Total Bank Solutions, LLC's Answer To Consolidated First Amended Complaint and Counterclaims, Jun. 25, 2009, Civil Action No. 09 CIV 2675.

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Stipulated Dismissal of Counts I-III of Defendant Promontory Interfinancial Networks, LLC's, Counterclaim with Prejudice, Oct. 19, 2009, (Document 68).

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Stipulation and Order, Oct. 29, 2009, Case No. 09 CV 2675 (VM) (AJP) (Document 73).

Lawsuit by Island Intellectual Property LLC, Lids Capital LLC, Double Rock Corporation and Intrasweep LLC Against Promontory Interfinancial Network LLC, MBSC Securities Corporation, Deutsche Bank AG, Deutsche Bank Trust Company Americas'Counterclaims, Jul. 9, 2009, Civil Action No. 09 CIV 2675 (VM).

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, The Island Plaintiffs' Reply to Defendant MBSC Securities Corporation's Counterclaims, Jul. 9, 2009, Civil Action No. 09 CIV 2675 (VM).

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, The Island Plaintiffs' Reply to Defendant Promontory Interfinancial Network LLC's Counterclaims, Jul. 9, 2009, Civil Action No. 09 CIV 2675 (VM).

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, The Island Plaintiffs' Reply to Defendant Total Bank Solutions, LLC's Counterclaims, Jul. 9, 2009, Civil Action No. 09 CIV 2675 (VM).

Lawsuit by Promontory Interfinancial Network, LLC against Double Rock Corporation p/k/a Reserve Management Corporation and Lids Capital LLC, Amended Complaint, Mar. 27, 2009, Civil Action No. 1:09 CV 316.

Lawsuit by Promontory Interfinancial Network, LLC against Double Rock Corporation p/k/a Reserve Management Corporation, Complaint, Mar. 24, 2009, Civil Action No. 1:09 CV 316.

Lawsuit by Promontory Interfinancial Network, LLC against Double Rock Corporation p/k/a Reserve Management Corporation, Island Intellectual Property LLC, Lids Capital LLC and Intrasweep LLC, Amended Complaint, Apr. 15, 2009, Civil Action No. 3:09 CV 217.

Lawsuit by Promontory Interfinancial Network, LLC against Double Rock Corporation p/k/a Reserve Management Corporation, Island Intellectual Property LLC, Lids Capital LLC and Intrasweep LLC, Complaint, May 19, 2009, Civil Action No. 3:09 CV 322.

Lawsuit by Promontory Interfinancial Network, LLC against Double Rock Corporation, p/k/a Reserve Management Corporation, Island Intellectual Property LLC and Lids Capital LLC, including Cover Sheet, Summons and Complaint, Apr. 14, 2009, Civil Action No. 3:09 CV 217.

Letter from Gilbert T. Schwartz, Skadden, Arts, Slate, Meagher & Flom to Oliver Ireland, Associate General Counsel, Board of Governors of the Federal Reserve System: Dec. 18, 1987; 19 sheets.

Letter From Jamey Basham, Attorney, LEXSEE 1990 FDIC Interp. Ltr., Lexis 1, Federal Deposit Insurance Corporation, FDIC-90-02, Jan. 3, 1990, 2 Sheets.

Letter From Joseph A. DiNuzzo, Counsel, Oct. 20, 1999, FDIC, Federal Deposit Insurance Corporation, 1 Sheet.

Letter From Merle Y. Waldman, LEXSEE 1985 Sec No. Act., Lexis 1593, Securities Exchange Act of 1934—Section 15(a), Jan. 8, 1985, 11 Sheets.

Letter from Michael Bradfield, General Counsel, Board of Governors of the Federal Reserve System, Nov. 16, 1984, 4 Sheets.

Letter From Oliver I. Ireland, Associate General Counsel, Board of Governors of the Federal Reserve System, Jun. 22, 1988, 5 Sheets.

Letter From Roger A. Hood, Assistant General Counsel, Jul. 16, 1986, FDIC, Federal Deposit Insurance Corporation, Legal Division, 1 Sheet.

Letter from Roger M. Zaitzeff, Seward & Kissel to Gilbert T. Schwartz, Associate General Counsel, Board of Governors of the Federal Reserve System; May 10, 1983, 5 sheets.

Letter from Stephanie Martin, Assoc. General Counsel, Board of Govenors of the Federal Reserve System, Apr. 22, 2004, 8 Sheets.

Letter From William W. Wiles, Secretary of the Board, Board of Govenors of the Federal Reserve System, Jun. 22, 1983, 6 Sheets.

Letter To Mr. James E. Creekman, Group Vice President, From Oliver Ireland, Associate General Counsel, Aug. 1, 1995, 4 Sheets.

Letter To Mr. Jonathan L. Levin, Esq., From Oliver Ireland, Associate General Counsel, Oct. 18, 1996, 2 Sheets.

Letter To Mr. L.P. Fleming, Jr., Esq., From Oliver Ireland, Associate General Counsel, Feb. 7, 1995, 3 Sheets.

Letter To Ms. Brenda L. Skidmore, Senior Vice President, From Oliver Ireland, Associate General Counsel, Aug. 30, 1995, 4 Sheets.

Letter to William R. Burdette, CEO, Apr. 6, 2009, FDIC, Federal Deposit Insurance Corporation, 2 pages.

Letter to William R. Burdette, CEO, Nov. 15, 2007, FDIC, Federal Deposit Insurance Corporation, 5 Sheets.

Liberman et al., Market Watch, "How Important are Banks?" FDIC Insurance on Deposits Just One Continuing Advantage, Oct. 17, 2006, 3 Sheets.

McReynolds et al. "Unusual Products for Unusual Times," Securities Data Publishing on Wall Street, 6 Sheets, May 1, 2001.

McReynolds, "The Power of Cash: Ho-Hum cash can be great product (and lead to more business) in troubled times," Securities Data Publishing on Wall Street, 3 Sheets, Jun. 1, 2002.

Merriam-Webster Online Dictionary, 10th Edition, Definition of "Associated", Jan. 30, 2009, 2 Sheets.

Merrill Lynch & You, "Financial Services The Way You Want, When You Want Them," Jan. 2000 4 Sheets.

Merrill Lynch Announces Beyond Banking, The Power of Advice For Smarter Cash Management, Jan. 8, 2 Sheets.

Merrill Lynch, Pierce, Fenner & Smith Incorporated, "Information Statement,"2000, 12 Sheets.

Merrill Moves CMA Cash to Bank, Street Talk, On Wall Street, Nov. 2000, p. 26.

Money Fund Report, Bank of New York Adds Insured Sweeps Option, Friday, May 3, 2002, The Reserve Funds, 1 Sheet.

Money Fund Report, IBC Financial Data, Inc., Nov. 6, 1998, 1 Sheet.

Money Fund Report, Insured Cash Sweep Options Proliferate, Friday, Jun. 1, 2001, The Reserve Funds, 1 Sheet.

Money Market Insight's, Goldman Sachs May Create Bank to Offer Insured Cash Sweeps, Aug. 2002 Issue, 3 Sheets.

Munk, Merrill Makes New Push Into Traditional Banking, Dow Jones Newswires, Jan. 3, 2003, 1 Sheet.

Mutual Fund Dealers Association, 1 page, (http://www.mfda.ca/.

Mutual Funds Magazine, Bargain Basement Funds, Oct. 1997, 1 Sheet.

Mutual Funds Magazine, Bargain Basement Funds, Oct. 1997, 2 Sheets.

News Article: "Regulators Support Demand Deposit Bill", Regulatory Compliance Watch—Mar. 9, 1998; 2 Sheets, vol. 9, No. 10.

Northbrook Bank & Trust Company, Introducing our MaxSafe CD with up to $700,000 of FDIC Insurance, 4 Sheets,.

Northbrook Bank & Trust Company, Seven Times the Security of a Normal CD, Introducing our MaxSafe CD, Nov. 12, 2002, 4 Sheets.

O'Brian, "Money-Market Funds Suit Many Investors, But Proud Creator Frets About Extra Risk," Re-Printed From The Wall Street Journal, Monday, Nov. 6, 2000, Dow Jones & Company. Inc., Nov. 25, 2002, 2 Sheets.

On Wall Street, Helping Brokers Build a More Successful Business, The Power of Cash, Jun. 2002, 2 Sheets.

On Wall Street, Helping Brokers Build a More Successful Business, Unusual Products for Unusual Times, May 2001, 2 Sheets.

Online, www.usabancshares.com, Brave New World, 1999, 2 Sheets.

Part: 2, Monetary Policy and Reserve Requirements, Subpart—Regulation D, Board Interpretations of Regulation D, Transaction Accounts—Linked to Time Deposits, vol. 1, Federal Reserve Regulatory Service, 2 Sheets.

Potter, "As Sweep Accounts Continue to Grow, So do Community Bank Options," America's Community Banker, vol. 9, Issue 8, Bell & Howell Information and Learning Company, 3 Sheets, Aug. 1, 2000.

Promontory Interfinancial Network, Promontory Interfinancial Network Announces New Deposit Placement Service, Jan. 21, 2003, 3 Sheets.

Promontory Interfinancial Network: http://www.promnetwork.com/index.html, 2003.

Promontory Interfinancial Network: Frequently Asked Questions (FAQs), Feb. 5, 2003, 5 pages.

Promontory to Roll Out Deposit Service Insuring Liquid Funds, American Banker, by Joe Adler, Feb. 22, 2010, 2 sheets.
Reserve Insured Deposits, United States Patent and Trademark Office, Reg. No. 2,694,910, Registered Mar. 11, 2003, 1 Sheet.
Reserve Management Corporation, Reserve Injured Deposits, Serial No. 76/315,600, Issued.
Ring, National/Global, "Amex Spans The Globe in Retail Bank Buildup," Nov. 27, 2000, 1 Sheet.
Share, "New Service Skirts FDIC's $100K Limit," Dialog Web Command Mode, 2 Sheets, Jun. 13, 2003, http://www.dialogweb.com/cgi/dwclient.
Smith, "IBAA Won't Push Interest-Bearing Checking For Business; Says Too Few Members Want It," The American Banker, 2 Sheets, Apr. 18, 1996.
Stafford, "New Bank Program Allows $1 Million in Insured Deposits," Dialog Web Command Mode, 3 Sheets, Aug. 24, 2003, http://www.dialogweb.com/cgi/dwclient.
Sweeping Your Firm Into FDIC Insured Deposits, Harken Financial Services, Aug. 4, 2006, 8 Sheets.
Testimony of Bruce R. Bent, CEO of The Reserve Funds, Before The Financial Institutions and Consumer Credit Subcommittee House Financial Services Committee U.S. House of Representative, Hearing On H.R. 758 and H.R. 859, Mar. 5, 2003, 4 Sheets.
The Depository Trust Company, B#: 3875, Oct. 1, 2002, Settlement\Underwriting, From: Denise Russo, Director, Underwriting, 6 Sheets.
The Insured Savings Account, Issuer Guide to Offering MMDAs Through Merrill Lynch, Merrill Lynch Money Markets, Inc., "Operational Guide To The Merril Lynch MMDA Program 1986", Sep. 1986 3 Sheets.
The Pershing Press, Dreyfus Insured Deposit Program, Issue 2, Aug. 2008, http://www.pershing.com/news/pershing_press/news_466244.html, 1 Sheets.
The Reserve Fund, Study of U.S. Patent No. 6,374,231, 1 Sheet.
The Reserve Funds Press Release, "The Reserve Funds and Frontier Bank Partner to Offer Revolutionary Banking Product," 5 Sheets, Aug. 1, 2000.
The Reserve Funds, Objectives, Observations & Strategies for American Enterprises Inv., Oct. 18, 2000, 11 Sheets.
The Reserve Funds, NJBA Endorses New Sweep Account Offers New Jersey Banks Deposit Growth, Retention, for Immediate Release, May 23, 2001, 1 Sheet.
The Reserve Funds, Reserve Management and Irwin Union Bank and Trust Company Partner to Offer The Reserve Return Sweep, For Immediate Release, Mar. 8, 2001, 2 Sheets.
The Reserve, "Company History," 3 Sheets, Oct. 4, 2006, http://www.ther.com/aboutus/history.shtml.
The Reserve, "Reserve Insured Deposits Program," 2 Sheets, Oct. 4, 2006, http://www.ther.com/bank/bank_insdep.shtml.
The Reserve, "Reserve Insured Deposits," 2 Sheets, Oct. 4, 2006, http://www.ther.com/ps/ps_fif.shtml.
The Reserve, "What Sets Us Apart," 2 Sheets, Oct. 4, 2006, http://www.ther.com/bank/bank_wsua.shtml.
The Unmatched Sweep Solution From The Cash Management Expert, 2 Sheets.
Total Bank Solutions, Bank Sweep FAQs http://www.totalbanksolutions.com/sweepbnkfaqs.htm, Sep. 23, 2005, 2 pages.
Total Bank Solutions, Bank Sweep FAQs, http://www.totalbanksolutions.com/sweepbnkfaqs.htm, Nov. 2, 2005, 3 pages.
Total Bank Solutions, Bank Sweep Products, Deutsche Bank, http://www.totalbanksolutions.com/banksweep.htm, Sep. 23, 2005, 1 page.
Total Bank Solutions, Bank Sweep Products, http://www.totalbanksolutions.com/banksweep.htm, Appendix 3, Oct. 18, 2005, 2 pages.
Total Bank Solutions, Bank Sweep Products, http://www.totalbanksolutions.com/banksweep.htm, Nov. 2, 2005, 2 pages.
Total Bank Solutions, Brokerage Sweep FAQs, http://www.totalbanksolutions.com/brokerfaqs.htm, Nov. 2, 2005, 3 pages.
Total Bank Solutions, Brokerage Sweep, http://www.totalbanksolutions.com/brokersweep.htm, Nov. 2, 2005, 1 page.
Total Bank Solutions, Deposit Bank FAQs, http://www.totalbanksolutions.com/depositbnkfaqs.htm, Nov. 2, 2005, 2 pages.
Total Bank Solutions, Deposits, Deutsche Bank, http://www.totalbanksolutions.com/deposits.htm, Sep. 23, 2005, 1 page.
Total Bank Solutions, Deposits, http://www.totalbanksolutions.com/deposits.htm, Nov. 2, 2005, 2 pages.
Total Bank Solutions, Deutsche Bank Insured Deposit Program, DB Insured Deposit Program Features, http://www.totalbanksolutions.com/features.htm, Sep. 23, 2005, 2 pages.
Total Bank Solutions, Deutsche Bank Insured Deposit Program, http://www.totalbanksolutions.com/, Sep. 23, 2005, 1 page.
Total Bank Solutions, http://www.totalbanksolutions.com/, Mar. 16, 2007, 8 pages.
Total Bank Solutions, http://www.totalbanksolutions.com/overview.htm, Nov. 2, 2005. 1 page.
Total Bank Solutions, Insured Deposit Program Features, http://www.totalbanksolutions.com/features.htm, Nov. 2, 2005, 2 pages.
Total Bank Solutions, Insured Deposit Program, http://www.totalbanksolutions.com/Insureddeposits.htm, Nov. 2, 2005, 2 pages.
Total Bank Solutions, Partners & Affiliates, http://www.totalbanksolutions.com/partners.htm, Nov. 2, 2005, 3 pages.
Total Bank Solutions, Partners & Affiliates, http://www.totalbanksolutions.com/partners.htm, Oct. 25, 2005, 3 pages.
Total Bank Solutions, Strategic Partners, Nov. 2, 2005, 1 page.
Total Bank Solutions, TBS Deposit Account, About Our Broker Products, http://www.totalbanksolutions.com/brokerproducts.htm, Sep. 7, 2005, 2 pages.
Total Bank Solutions, TBS Management Team, http://www.totalbanksolutions.com/management.htm, Appendix 1, Oct. 18, 2005, 1 page.
Total Bank Solutions, TBS Management Team, http://www.totalbanksolutions.com/management.htm, Nov. 2, 2005, 2 pages.
Total Bank Solutions, TBS Management Team, http://www.totalbanksolutions.com/management.htm, Oct. 25, 2005, 2 pages.
TotalBank Solutions, TBS Bank Deposit Account, Oct. 2004, 7 pgs.
TotalBank Solutions, web.archive.org/web/20050126044216/http://totalbanksolutions.com, Jan. 26, 2005, 2 pgs.
USA Mutual Partners Insured Cash Shelter Account Terms and Conditions, 11 pages, 2009 USA Mutuals Partners, Inc.
Wachovia Securities, Important Information for Clients Concerning Changes in Automatic "Sweep" Arrangements, Oct. 1, 2003, 6 sheets.
Waddell, "Sweeping Clean," Advisor, The Advisor to Advisors, 2 Sheets.
Wilson, "How Cash Management Services Can Help Your Bank Cultivate New Relationships with Commercial Customers," America's Community Banker, vol. 10, Issue 5, Bell & Howell Information and Learning Company, 8 Sheets, May 1, 2001.
Memorandum from Ken Johnson re: Insured Deposit Products, Aug. 18, 1992, 3 pgs.
Memorandum from John E. Oncken re: Insured Savings Update, Jun. 15, 1990, 7 pgs.
Memorandum from John E. Oncken re: Brokered Deposit Issue vs. Insured Savings, Mar. 22, 1990, 8 pgs.
Memorandum from Ed Piner re: Insured Savings Product Update, Feb. 1, 1990, 4 pgs.
Insured Savings Correspondent Agreement with Exhibits A-D, 28 pgs.
First City, Texas Insured Savings Agency Agreement with Exhibits A-B and Insured Savings Program, 10 pgs.
Product Bulletin from Bill McCain, Subject: Insured Savings Product Announcement, May 8, 1989, 7 pgs.
Insured Savings Project Team Meeting, Feb. 2, 1989, 16 pgs.
Insured Savings Product Description, Product Name: Insured Savings, Product Description: U.S. Patent #4,985,833, 3 pgs.
Letter to Tim C. Lear, Sep. 20, 1988, 1 pg., with Memorandum from Ed Piner, re: Insured Savings Product, Nov. 9, 1988, and Letter from Tara L. Cyr, Dec. 9, 1988, 1 pg.
Automatic Insured Deposit Method, Patent Application Information, Jul. 11, 1988, 17 pgs.
Insured Savings, Overview & Marketing Plan, Dec. 6, 1988, 23 pgs.
Memorandum from Dick Zinser, re: A First City—Austin deposit program to hold existing customers' deposits, Mar. 17, 1988, 7 pgs.
Insured Savings Remote Site Sweep Procedures, 3 pgs.

Letter to Malcolm L. Duke, Dec. 27, 1989 with Insured Savings Correspondent Agreement, Exhibits A-D, and Letter to Malcolm L. Drake, Nov. 21, 1989, 37 pgs.
Memorandum from Ken Johnson, re: Attached Insured Savings Letters, Jul. 5, 1990, 1 pg.
Letter to Jerry Crutsinger, Jul. 3, 1990, 1 pg.
Letter Bill Goertz, Jul. 3, 1990, 1 pg.
Letter to Susan Goodwin, Jul. 3, 1990, 1 pg.
Insured Savings Rate Change Notice, Jul. 17, 1990, 1 pg.
Addendum to Insured Savings Agency Agreement, Jul. 17, 1990, 1 pg.
Letter to Paula Martin, Jul. 3, 1990, 1 pg.
Letter to John Lovell, Jul. 3, 1990, 1 pg.
Insured Savings Balance Limits form, 1 sheet.
Email from John Oncken re: Depository Levels at Insured Savings Depositories, Nov. 2, 1989, 1 pg.
Cash Management Balance Monitoring Agreement Form 1 sheet.
Memorandum from Ed Piner, Subject: Discontinuation of Automatic Balance Monitoring in conjunction with Insured Savings Accounts, May 21, 1991, 1 pg.
Blank form Letter from Edward N. Piner, May 24, 1991, 1 pg.
Letter from First City National Bank of Austin, Sep. 20, 1982, 5 pgs.
First City, Texas—Austin, Special Products, Feb. 20, 1992, with Schedule A & Schedule B, 6 pgs.
Letter From William W. Wiles, Secretary of the Board, Board of Governors of the Federal Reserve System, Jun. 22, 1983, 6 Sheets.
Letter From Oliver I. Ireland, Associate General Counsel, Board of Govenors of the Federal Reserve System, Jun. 22, 1988, 5 Sheets.
Alliance Insured Account, Information Statement, Sep. 1999, 6 sheets.
Lawsuit by Carlo DeBlasio et al. and Merrill Lynch & Co., Inc. et al., Opinion and Order, Jul. 27, 2009, Civil Action No. 07 CIV. 318, 47 pgs.
Lawsuit by Carlo DeBlasio et al. and Merrill Lynch & Co., Inc. et al., Second Amended Class Action Complaint, Jury Trial Demanded, Jun. 11, 2007, Civil Action No. 07 cv 318, 137 pgs.
Investors MoneyAccount$^{SM}$ and Insurance Plus Service Agreement, Schedule A, 3 sheets.
Investors MoneyAccount$^{SM}$ (an FDIC-insured money market account), 4 sheets.
Investors MoneyAccount$^{SM}$ The FDIC-Insured Money Marker with an Important Plus., 2 sheets.
Investment Company Act of 1940—Section 3(a)(1), 2(a)(36); Securities Act of 1933—Section 2(1), Nov. 29, 1985, Kempter Financial Services, Inc., 9 pgs.
Insured Money Account Program Agreement and Disclosure Statement, 11 sheets.
First National Bank in Brookings, Certificates of Deposit, Fuly 17, 2009, 5 sheets.
Summary of Commentary on Current Economic Conditions by Federal Reserve Districts, Jan. 1985, 44 pgs.
Board of Governors of the Federal Reserve System, Blank Form Letter, Apr. 22, 2004, 8 pgs.
FDIC Law, Regulations, Related Acts, 4000—Advisory Opinions, FDIC-93-35, Jun. 28, 1993, 2 sheets.
§204.134, 12 CFR Ch. 11 (Jan. 1, 2009 Edition), 2 sheets.
Money Fund $$ Moving to Bank Deposits, 6 FRC Monitor, Dec. 2003, 2 sheets.
Crane, P. & Krasner, Mike, An iMoney Net Special Report™, "Brokerage Cash Sweep Options: The Shift from Money Funds to FDIC-Insured Bank Deposit Accounts", Nov. 2004, 64 pgs.
The May 1998 Senior Financial Officer Survey, Board of Govenors of the Federal Reserve System, with Appendix A, 48 pgs.
Interest Rate Review © A Publication of Meyer Weekly Interest Rate Survey, A Look At Tiers, vol. II, No. 4, Apr. 1987, 6 pgs.
Interest Rate Review © A Publication of Meyer Weekly Interest Rate Survey, A Study of Historical Rates and Yields, vol. II, No. 6, Jun. 1987, 8 pgs.
Blank Form Letter to Oliver Ireland, Oct. 7, 1994, 1 pg.
Letter to L.P. Fleming, Jr. Esq., Feb. 7, 1995, 3 pgs.
Letter to James E. Creekman, Aug. 1, 1995, 4 pgs.
Letter to Brenda L. Skidmore, Aug. 30, 1995, 4 pgs.

Merrill Lynch & Co., Inc. Form 10-K405 (Annual Report (Regulation S-K, item 405)), Filed Mar. 14, 2002 for the Period Ending Dec. 28, 2001, with Schedules, Exhibits, and 2001 Annual Report, 248 pgs.
Merrill Lynch, Pierce, Fenner & Smith Incorporated, "Information Statement," 2000, 12 Sheets.
Merrill Lynch, Information Statement Regarding Changes to Interest Rates on Deposits in the Merrill Lynch Banks, Document 64-14, Nov. 12, 2007, Case 1:07-cv-00318, 2 sheets.
Street Talk, "Merrill Moves CMA Cash to Bank", On Wall Street, Nov. 2000, 1 sheet.
Quest Insured Account, QUESTessentials, 3 sheets.
Quest Insured Account, Information Statement, 5 sheets.
OCC Insured Bank Deposit Account, 3 sheets.
Insured Bank Deposit Account, Information Statement, Jul. 1, 2000, 2 sheets.
Letter from Marilyn J. Hensle, announcing Salomon Smith Barney Bank Deposit Program.$^{SM}$, with Q&A, 14 sheets.
Bank Deposit program Disclosure Statement, Salomon Smith Barney, 3 sheets.
FDIC Law, Regulations, Related Acts, 4000—Advisory Opinions, FDIC-87-25, Oct. 22, 1987, 1 sheet.
FDIC Law, Regulations, Related Acts, 4000—Advisory Opinions, FDIC-86-21, Jul. 23, 1986, 2 sheets.
The Merrill Lynch Cash Management Account, Financial Service, 18 pgs.
The Insured Savings Account, Issuer Guide to Offering MMDAs through Merrill Lynch, 27 pgs.
Insured Savings Account Fact Sheet, The Merrill Lynch Cash Management Account Financial Service, 1987, 11 pgs.
CMA Insured Savings Account Fact Sheet, 1994, 9 pgs.
A Guide to Your CMA Account, 1995, 19 pgs.
Insured Savings Account Fact Sheet, The Merrill Lynch Cash Management Account Financial Service, 1985, 4 pgs.
CMA Insured Savings Account Fact Sheet, 1997, 13 pgs.
Blackwell, Rob, Salomon's Sweep Plan Raises FDIC Fund Alarm, American Banker, Dec. 6, 2000, 2 pgs.
Insured Deposit Account (IDA), May 21, 1996, 11 pgs.
An Introduction to the Smith Barney Insured Deposit Account, 1995, 8 pgs.
Memorandum from Ted Hamilton re: Insured Deposit Account, Oct. 10, 1995, 13 pgs.
The Insured Deposit Account: "Money in the Bank", 1997, 2 sheets.
Merrill Joins Money Market Account, CMA; Broker Begins Testing With 12 Institutions, Lexis Nexis, Sep. 23, 1983, 4 pgs.
Form 8-K Merill Lynch & Co Inc—MER, Filed: Mar. 7, 2002, Report of unscheduled material events or corporate changes, 41 pgs.
Lawsuit by Island Intellectual Property LLC and Intrasweep LLC against Deutsche Bank Trust Company Americas and Total Bank Solutions, Complaint for Patent Infringement, Jury Trial Demanded, Feb. 23, 2010, Case No. 10 CV 1518, (Document 1).
Lawsuit by Island Intellectual Property LLC and Lids Capital LLC against Deutsche Bank Trust Company Americas and Total Bank Solutions, Complaint for Patent Infringement, Jury Trial Demanded, Mar. 16, 2010, Case No. 10 CV 2268.
Quest Cash Management Services Memorandum to Tom Duggan, Re: Quest Insure Account, Nov. 16, 1993.
Bank Services, AMVest Financial ability for banker's and their clients, 6 pgs.
Federally "Insured Deposit Program", AmVest Capital, 1 sheet.
Federally Insured Deposit Program for Banks, AmVest capital, Jan. 15, 2010, 2 sheets.
Flow Chart, AmVest Capital, Dec. 9, 2009, 1 sheet.
Flow of Business for Federally Insured Deposit Program "FIDP", Deutsche Bank & Trust Company of the Americas, 1 sheet.
Participation Criteria for the FIDP, Federally Insured Deposit Program Participation Criteria, AmVest Capital, Jan. 15, 2010, 4 pgs.
Federally Insured Deposits/FAQ, Frequently Asked Questions on the Federally Insured Deposit Program, AmVest Capital, Jan. 15, 2010, 2 sheets.
Money Market Rates, Jan. 18, 2010, 2 sheets.
Money Market Rates, Jan. 6, 2010, 3 pgs.
Money Market Rates, Nov. 12, 2009, 3 pgs.

Scott & Stringfellow starts correspondent clearing business, News Release BB&T, Nov. 13, 2007, 2 sheets.
Curian Capital Introduces Custom Wealth Platform, Market Watch, Aug. 18, 2009, 3 pgs.
Ellie Behling, Currian Capital Introduces Custom Wealth Platform, Nov. 10, 2009, 3 sheets.
Curian Capital Introduces Custom Wealth Platform, Reuters, Aug. 18, 2009, 3 pgs.
Curian Capital Introduces Custom Wealth Platform, WSJ.com, Aug. 18, 2009, 3 pgs.
Curian Capital, LLC: Private Company Information, Business Week, Nov. 10, 2009, 3 pgs.
Curian Capital Introduces Custom Wealth Platform, Yahoo! Finance, Aug. 18, 2009, 3 pgs.
Bank Insured Deposit Program, D.A. Davidson & Co., Jan. 15, 2010, 2 sheets.
Bank Insured Deposit Program, D.A. Davidson & Co., Nov. 2, 2009, 2 sheets.
D.A. Davison & Co., Bank Insured Deposit Program, Disclosure Statement, Jan. 15, 2010, 4 sheets.
First Southwest Company, First Southwest Company Bank Insured Deposit Program, Sep. 28, 2009, 11 pgs.
Manage Cash in an Online Stock Portfolio: Folio Investing, Jan. 15, 2010, 2 sheets.
Folio Investing: Brokerage Features >> Cash Investments>> FDIC, Plus Program, Jan. 14, 2010, 3 pgs.
Folio Investing: Brokerage Features >> Cash Investments>> Cash Seep Rates, Jan. 14, 2010, 2 sheets.
Folio Investing: Brokerage Features >> Cash Investments>> Cash Seep Banks, Jan. 15, 2010, 3 pgs.
Folio Investing: Brokerage Features >> Cash Investments>> Cash Sweep FAQ, Jan. 14, 2010, 3 pgs.
Folio Investing: Brokerage Features >> Cash Investments>> Cash Sweep FAQ, Jan. 18, 2010, 2 sheets.
Folio Investing: Brokerage Features >> Cash Investments>> Cash Sweep FAQ, Jan. 15, 2010, 2 sheets.
Folio Investing: Brokerage Features >> Cash Investments>> Sweep Terms & Conditions, Jan. 14, 2010, 2 sheets.
H.C. Denision Company, Sheboygan, WI, 1 sheet.
The LYRA Program with H.C. Denison Company, Sheboygan Wisconsin, Jan. 15, 2010, 2 sheets.
Current LYRA Program Rates, H.C. Denison Co., Jan. 15, 2010, 1 sheet.
Current LYRA Program Rates, H.C. Denison Co., Nov. 2, 2009, 1 sheet.
Current LYRA Program Banks, H.C. Denison Co, LYRA Program, Nov. 2, 2009, 1 sheet.
Authorization Form, H.S. Denison Company's Liquidity Insured Reserve Access Program (LYRA Program), Oct. 2009, 1 sheet.
Frequently Asked Questions for the LYRA Program, H.C. Denison Co., Jan. 15, 2010, 3 pgs.
Terms & Conditions for H.C. Denison Company's Liquidity Insured reserve Access Program (LYRA Program), Jan. 15, 2010, 4 pgs.
Terms & Conditions for H.C. Denison Company's Liquidity Insured reserve Access Program (LYRA Program), Nov. 2, 2009, 4 pgs.
The Hilliard Lyons Insured Deposit Program Disclosure Document, Hilliard Lyons, 10 pgs.
Current Rates, http://currentrates.hillard.com/ Jan. 6, 2010, 1 sheet.
Current Rates, http://currentrates.hillard,com/ Nov. 2, 2009.
Current Rates, Market Info, Hilliard Lyons, Nov. 2, 2009, 4 pgs.
Legent Insured Deposit, www.legentclearing.co/mmf/phf, Nov. 2, 2009, 2 sheets.
Legent Insured Deposit Program—Summary of Terms and Conditions, Nov. 2008, 4 pgs.
Investment Account Application, Cleared Through Legent Clearing, 2 sheets.
Customer Agreement, Cleared Through Legent Clearing, 3 pgs.
Cash Management, Mesirow Financial—B/D and IA Services, www.mesirowfinancial.com/bdia/cas_mgmt.jsp, Jan. 15, 2010, 2 sheets.
Frequent Asked Questions: FDIC Sweep Program, optionsXpress, www.optionsxpress.com/welcom/faq/aq/fdc.aspx#rate.
Terms & Conditions for optionsXpress' Bank Insured Deposit Program, optionsXpress, 6 pgs.
Frequently Asked Questions: FDIC Sweep Program, optionsXpress, www.optionsxpress.com/welcom/faq/fdic.aspx, Jan. 6, 2010, 3 pgs.
Frequently Asked Questions: FDIC Sweep Program, www.optionsxpress.com/welcom/faq/fdic.aspx, Nov. 12, 2009, 2 sheets.
Money Fund and FDIC-Insured Bank Programs, Pershing, www.pershing.com/money_fund.htm, Jan. 15, 2010, 1 sheet.
Money Market Mutual Fund & FDIC-Insured Deposits Program Rates & Bank Lists, www.pershing.com/rates.html, Jan. 6, 2010m 6 pgs.
Money Market Mutual Fund and FDIC-Insured Deposit Program Rates & Bank List, www.pershing.com/rates.html, 1 sheet.
Clearing firms used by the top independent broker-dealers, Investment News, www.investmentnews/article/20081214/CHART/812119919, Jan. 15, 2010, 4 sheets.
Objective investment advice Building trust, Wayne Strout, www.waynestrout.com/more)info, Jan. 18, 2010, 5 pgs.
Eagle sweep disclosure, first republic Securities Company, Jun. 1, 2009, 12 pgs.
The financial organizer, ProCash Plus, 12 pgs.
Insured deposit account program disclosure booklet, 16 pgs.
Update New FDIC product at IPI: Deutsche Bank Insured Deposit Program, Investment Professionals Inc, Feb. 4, 2009, 11 pgs.
Insured cash account, http://lplfinancial.lpl.com/x68.xml, with LPL Financial insured cash account program disclosure booklet, LPL Financial Jan. 15, 2010, 23 pgs.
FAQs about Deutsche Bank insured deposit program, Securities America, 3 pgs.
Insured deposit program, www.aigadvisorgroup.com/fdic/03.04.09.htm, Jan. 15, 2010, 3 pgs.
FlexInsured Account$^{SM}$, PrimeVest, http://primevest.com/flexInsured_account.asp, Jan. 14, 2010, 1 sheet.
FlexInsured$^{SM}$ Account disclosure statement, PrimeVest, 2009, 5 pgs.
An independent broker-dealer, Royal Alliance, http://www.royalalliance.com, Jan. 15, 2010, 1 sheet.
Brokerage products and services, www.steernagee.com/sali/pcg/pages/products-services.aspx, Nov. 4, 2009, 2 sheets.
Terms and conditions for cash sweep, sterne agee, 2 sheets.
Client account agreement to Sterne Agee Clearing, Inc, Sterne, Agee & Leach, Inc and its authorized agents, Feb. 3, 2009, 5 pgs.
Valet a full service asset management account, http://valetaccount.com/visaTerms.php, Nov. 12, 2009, 6 pgs.
A sweet suite of business products brings our bank to you, AndroscogginBank, www.androscogginbank.com, 1 sheet.
We have your banking nees covered!, Greater Franklin, 2009, 2 sheets.
Insured MMA Seep Program, Circle Bank, www.circlebank.com/personalbanking)mma.aspx, Jan. 14, 2010, 2 sheets.
Insured MMA agency sweep agreement with rate sheet, Circle Bank, Dec. 3, 2009, 6 pgs.
Personal Banking—East West student plus program, East West Bank, www.eastwestbank.com/english/FDIC.asp, Nov. 10, 2009, 1 sheet.
Safe sound secure insured deposit programs, East West Bank, www.eastweatbank.com/English/SS_SIDPrograms.asp, Jan. 15, 2010, 2 sheets.
Money market insured deposit program, East West Bank, www.eastweatbank.com/English/MMarket_Insured.asp, Nov. 10, 2009, 1 sheet.
Insured deposit program bank list, www.eastweatbank.com/English/IDPB_list.htm, Nov. 10, 2009, 1 sheet.
FDIC information ofr United Commercial Ban, San Francisco, UCB, www.ibankunited.com/home.html, Nov. 12, 2009, 1 sheet.
Money market insured deposit program, Desert Community Bank, www.dck.org/MMarket_insured.html, Nov. 12, 2009, 1 sheet.
Insured deposit program bank list, www.dcbk,orq/IDPB_list.htm, Nov. 12, 2009, 1 sheet.
Evolve and others team up with Deutsche Bank to provide higher FDIC coverage limits, www.insureddeposit online.com/content/view/31/86/, Nov. 12, 2009, 1 sheet.
Protect your cash portfolio!, http://insureddepositsonline.com, Jan. 15, 2010, 1 sheet.
Protect your cash portfolio!, www.insureddppositsonline.com/component/option.com_frontpage/Itemid,1/, Nov. 2, 2009, 1 sheet.

Participating bank analysis, Insured Deposit Program, Evolve Bank & Trust, www.insureddepositsonline.com/content/view/45/113/, Nov. 15, 2010, 1 sheet.
Frequently asked questions, Evolve Bank & Trust, www.insureddepositsonline.com/content/view/38/120/, Jan. 15, 2010, 3 pgs.
Strategic Partners, Insured Deposit Program, Evolve Bank & Trust, www.insureddepositsonline.com/content/view/37/114/, Jan. 15, 2010, 1 sheet.
Who the program Benefits, Insured Deposit Program, Evolve Bank & Trust, www.insureddepositsonline.com/content/view/43/115/, Jan. 15, 2010, 1 sheet.
How the program works, Insured Deposit Program, Evolve Bank & Trust, www.insureddepositsonline.com/content/view/47/112/, Jan. 15, 2010, 1 sheet.
This new bank is over 80 years old, Insured Deposit Program, Evolve Bank & Trust, www.insureddepositsonline.com/content/view/44/116/, Nov. 2, 2009, 1 sheet.
Temporary liquidity guarantee program, Evolve Bank & Trust, www.getevolved.com/index.php?option=com_content&task=view&id=67&itemid=263, Nov. 2, 2009, 1 sheet.
Contact us, Insured Deposit Program, Evolve Bank & Trust, www.insureddepositsonline.com/content/view/40/119/, Nov. 2, 2009, 1 sheet.
Over $12.5 million of FDIC deposit insurance available, Insured Deposit Program, Deutsche Bank, www.insureddepositsonline.com, 1 sheet.
How the program works, Insured deposit program, Evolve Bank & Trust, www.insureddepositsonline.com/content/view/47/112/, Nov. 4, 2009, 11 pgs.
Over $11 million of FDIC deposit insurance available, Insured Deposit Program, Deutsche Bank, www.insureddepositsonline.com, 1 sheet.
Bank insured agency deposit account program custodial account agreement, Evolve Bank & Trust, 8 pgs.
Insured deposit online, Deutsche Bank Insured Deposit Program, list of program banks, 2 sheets.
Insured deposit online, The Insured Deposit Program, Evolve Bank & Trust, 2 sheets.
Insured deposit online, Frequently asked questions, Evolve Bank & Trust, www.insureddepositsonline.com/content/section/3/71, May 14, 2009, 3 pgs.
Insured deposit online, The Insured Deposit Program Evolve Bank & Trust, Apr. 3, 2009, 2 pgs.
Personal Banking, Insured Deposit Program, Pulaski Bank, www.pulaskibankstl.com/personal/checking-personalinsured.htm, Jan. 26, 2010, 1 sheet.
Personal Banking, Insured Deposit Program, Pulaski Bank, www.pulaskibankstl.com/personal/currentrates.htm, Jan. 26, 2010, 2 sheets.
Up to $10 million FDIC deposit insurance available, Insured Deposit Program, Pulaski Bank, 1 sheet.
Personal Banking, Insured Deposit Program, Pulaski Bank, www.pulaskibankstl.com/personal/checking-personalinsured.htm, Dec. 8, 2009, 1 sheet.
Personal Banking, Insured Deposit Program, Pulaski Ban, www.pulaskibankstl.com/personal/checking-personalinsured.htm, May 14, 2009, 1 sheet.
Up to $12.5 million of FDIC deposit insurance available, Insured Deposit Program, Pulaski Bank, 1 sheet.
Who can benefit from the insured deposit program?, Insured Deposit Program, Pulaski Bank, 2 sheets.
Insured agency deposit account terms and conditions, Pulaski Bank, 1 sheet.
Banks for DBTCA, 2 sheets.
Total Bank Solutions, Corporate overview, 1 sheet.
Total Bank Solutions, Corporate Institutions, www.totalbanksolutions.com/deposit.cfm, Jan. 15, 2010, 2 sheets.
Total Bank Solutions, Insured Deposit Program, www.totalbanksolutions.com/insured-deposit.cfm, Jan. 15, 2010, 3 pgs.
Total Bank Solutions, Source Institutions, www.totalbanksolutions.com/source.cfm, Jan. 15, 2010, 3 pgs.
Total Bank Solutions, FAQs, www.totalbanksolutions.com/faqs.cfm, Jan. 15, 2010, 2 sheets.

Total Bank Solutions, Insured Deposit Program, TBS overview, www.totalbanksolutions.com/overview.htm, Nov. 3, 2009, 1 sheet.
Total Bank Solutions, Insured Deposit Program, Total Bank Solutions, www.totalbanksolutions.com, Nov. 3, 2009, 1 sheet.
Total Bank Solutions, Insured Deposit Program, Bank Sweep Program, www.totalbanksolutions.com/insured-deposit.cfm, Jan. 15, 2010, 3 pgs.
Total Bank Solutions, Insured Deposit Program, Bank Sweep Program, www.totalbanksolutions.com/banksweep.htm, Nov. 3, 2009, 2 sheets.
Total Bank Solutions, Insured Deposit Program, Brokerage Sweeps, www.totalbanksolutions.com/brokersweep.htm, Nov. 3, 2009, 2 sheets.
Total Bank Solutions, Insured Deposit Program, Deposits, www.totalbanksolutions.com/Deposits.htm, Nov. 3, 2009, 1 sheet.
Total Bank Solutions, Insured Deposit Program, Bank Sweep Program, www.totalbanksolutions.com/banksweep.htm, Mar. 6, 2009, 2 sheets.
Total Bank Solutions, Insured Deposit Program, Broker Sweep Program, www.totalbanksolutions.com/brokerweep.htm, Mar. 6, 2009, 2 sheets.
Total Bank Solutions, Insured Deposit Program, Deposit, www.totalbanksolutions.com/deposit.htm, Mar. 6, 2009, 2 sheets.
Total Bank Solutions, Insured Deposit Program, www.totalbanksolutions.com, Mar. 6, 2009, 2 sheets.
Total Bank Solutions, Insured Deposit Program, Partners & Affiliates, www.totalbanksolutions.com/partners.htm, Sep. 11, 2009, 2 sheets.
Total Bank Solutions, Dennis C. Borecki, President, TBS Bank Deposit Account, 7 pgs.
Christopher McCrum, LinkedIn, http://74.125.93.132/search?=cache:5hs9cebUSjgJ:www.linkedin.com/pub/christopher-mccrum/ . . . , Nov. 2, 2009, 2 sheets.
Kentucky Bankers Association, Alternative for excess deposit coverage Free Webiners, http://209.235.145/cgi-bin/websuite/tcsassnwebsuite.pl? . . . , Nov. 2, 2009, 2 sheets.
Kentucky Bankers Association Detailed Listening, http://member.kybanks.com/source/members . . . , Nov. 2, 2009, 1 sheet.
Letter from Ballard W. Cassady, Jr. President and Chief Executive Officer, Kentucky Bankers Association, Mar. 31, 2009, 1 sheet.
Oklahoma bankers association seeks extra security for deposits, http://findarticles.com/p/articles/mi_qn4182/is_20081128/ai_n31055289/, Nov. 2, 2009, 2 sheets.
Fast fax-back reply, Kentucky Bankers Association, 1 sheet.
Deutsche Bank, Deutsche Bank insured deposit program, 3 pgs.
Deutsche Bank Insured Deposits, Bank list as of Dec. 18, 2009, 1 sheet.
DB Advisors, Deutsche Bank Group, Insured Deposit Program, 1 sheet.
Letter to Robert E. Feldman, Federal Deposit Insurance Corporation, re: Proposed rule on risk-based assessments (RIN#3064-AD35), Dec. 17, 2008, 4 pgs.
Deutsche Bank Alex. Brown insured deposit program (IDP), Dec. 1, 2009, 10 pgs.
CD's pass agencies as largest holding in MMFs: Repo plunges in sept., www.cranedata.us/archives/news/2009/10/, Nov. 3, 2009, 14 pgs.
Lawsuit by Island Intellectual Property LLC, Lids Capital LLC, Double Rock Corporation, and Intrasweep LLC against Deutsche Bank Trust Company Americas, and Total Bank Solutions, LLC, Defendants' Preliminary Invalidity Contentions, Mar. 12, 2010, Civil Action No. 09 Civ. 2675 (VM) (AJP).
Lawsuit by Island Intellectual Property LLC and Intrasweep LLC against Institutional Deposits Corp., Defendant Institutional Deposits Corp.'s Preliminary Invalidity Contentions, Case No. 09-CV-03079-JEC, received in Mar. 2010.
Exhibit 1, Invalidity Chart: IMA and Insurance Plus Service Agreement, U.S. Patent No. 7,509,286, received in Mar. 2010, 21 pgs.
Exhibit 2, Invalidity Chart: Investors Money AccountSM System, U.S. Patent No. 7,509,286, received in Mar. 2010, 26 pgs.
Exhibit 3, Invalidity Chart: Insured Money Account System, U.S Patent No. 7,509,286, received in Mar. 2010, 26 pgs.

Exhibit 4, Invalidity Chart: U.S. Patent No. 4,985,833 (Oncken), U.S. Patent 7,509,286, received in Mar. 2010, 21 pgs.
Exhibit 5, Invalidity Chart: First City Bank of Texas' Insured Savings Program, U.S. Patent No. 7,509,286, received in Mar. 2010, 39 pgs.
Exhibit 6, Invalidity Chart: Quest Insured Account, U.S. Patent No. 7,509,286, received in Mar. 2010, 19 pgs.
Exhibit 7, Invalidity Chart: CIBC World Markets—Insured Bank Deposit Account, U.S. Patent No. 7,509,286, received in Mar. 2010, 16 pgs.
Exhibit 8, Invalidity Chart: Merrill Lynch CMA/ISA Service, U.S. Patent No. 7,509,286, received in Mar. 2010, 72 pgs.
Exhibit 9, Invalidity Chart: 1983 Fed Letter, U.S. Patent No. 7,509,286, received in Mar. 2010, 16 pgs.
Exhibit 10, Invalidity Chart: Merrill Lynch Banking Advantage Program ("MLBA Program"), U.S. Patent No. 7,509,286, received in Mar. 2010, 22 pgs.
Exhibit 11, Invalidity Chart: Merrill Lynch & You + MLBA Information Statement, U.S. Patent No. 7,509,286, received in Mar. 2010, 18 pgs.
Exhibit 12, Invalidity Chart: Smith Barney Insured Deposit Account, U.S. Patent No. 7,509,286, received in Mar. 2010, 22 pgs.
Exhibit 13, Invalidity Chart: Smith Barney Bank Deposit Program, U.S. Patent No. 7,509,286, received in Mar. 2010, 18 pgs.
Exhibit 14, Invalidity Chart: Alliance Insured Account, U.S. Patent No. 7,509,286, received in Mar. 2010, 16 pgs.
Exhibit 15, Invalidity Chart: Reserve's American Express Presentation, U.S. Patent No. 7,509,286, received in Mar. 2010, 16 pgs.
Exhibit 16, Invalidity Chart: U.S. Patent No. 7,376,606 (Jacobsen), U.S. Patent No. 7,536,350, received in Mar. 2010, 6 pgs.
Exhibit 17, Obviousness Combinations Chart, U.S. Patent No, 7,509,286, received in Mar. 2010, 351 pgs.

* cited by examiner

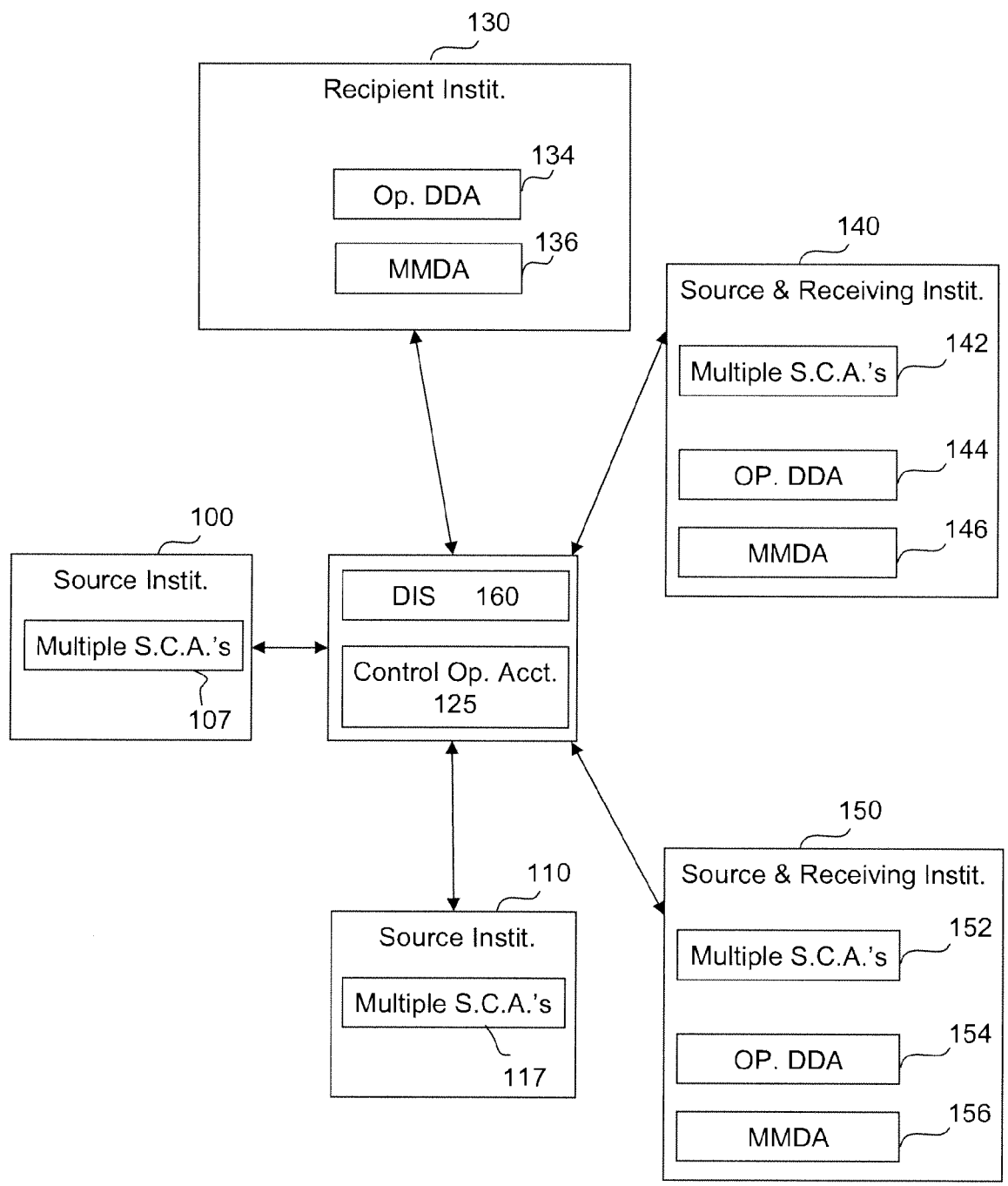

SYSTEM, METHOD AND PROGRAM PRODUCT FOR MINIMIZING FUND MOVEMENTS

FIELD OF INVENTION

The present invention generally relates to a system, method and program product for minimizing fund movements such as wire or other transfers in a sweep program.

SUMMARY

In embodiments, a method is disclosed, comprising: accessing, using one or more computers, one or more electronic databases, stored on one or more computer-readable media, for assisting in carrying out one or more of the following operations, the one or more databases comprising (i) aggregated account information for a plurality of government-backed insured and interest-bearing aggregated deposit accounts held in a plurality of recipient depository institutions, comprising a balance of funds held in each of the aggregated deposit accounts, wherein funds from a plurality of client accounts are aggregated with funds of other client accounts in the aggregated deposit accounts; and (ii) client account information for each of a plurality of the respective client accounts comprising at least a respective balance of funds from the respective client account held in each of one or more recipient depository institutions in the interest-bearing aggregated deposit accounts holding funds of the respective client account; obtaining, using the one or more computers, client account transaction information of client accounts of a first financial institution that is one of the recipient depository institutions and is also operating as a source institution, for one or more sub-periods of time; obtaining, using the one or more computers, a first amount of funds comprising a respective positive net transfer amount or negative net transfer amount for the one or more sub-periods of time for the first financial institution; allocating, using the one or more computers, the first amount of funds, to one or more other of the recipient depository institutions in one or more aggregated accounts held therein; allocating, using the one or more computers, a second amount of funds sourced from one or more other of the financial institutions to the first financial institution, based at least in part on the first amount of the funds and/or based at least in part on an amount held or to be held by the first financial institution sourced from the other financial institutions; netting, using the one or more computers, the first amount and the second amount to obtain a net amount; if the net amount is different from zero, allocating a positive or a negative third amount, using the one or more computers, to make the second amount equal to the first amount, so that no transfer of funds is necessary to or from the first financial institution, or taking no action for one or more sub-periods of time, or generating data for a single wire or other fund transfer to or from the first financial institution based at least in part on the net amount; allocating, using the one or more computers, amounts of funds from multiple of the client accounts among multiple of the recipient depository institutions, so that for multiple of the aggregated deposit accounts, a sum of the respective balances of funds from the multiple of the respective client accounts allocated to the respective aggregated deposit account will substantially match the respective balance of funds in the respective aggregated deposit account, after taking into consideration the fund transfer amounts for the one or more sub-periods of time; updating, using the one or more computers, one or more of the electronic databases to update the respective balances of client account funds held in one or more of the recipient depository institutions in one or more aggregated deposit accounts therein based on the allocations; and after one or more sub-periods of time, if the first financial institution is not at a desired reciprocity level, then obtaining an amount to be transferred to achieve the desired reciprocity level, and generating data, using the one or more computers, for a wire or other fund transfer to or from the first financial institution to achieve this desired reciprocity level.

In embodiments, the allocating the second amount to the first financial institution is based at least in part on obtaining a reciprocity of a predetermined percentage.

In embodiments, the allocating the second amount to the first financial institution is based at least in part on obtaining a desired reciprocity value that varies from sub-period to sub-period.

In embodiments, the allocating of a positive or negative third amount, using the one or more computers, to make the second amount equal to the first amount is performed.

In embodiments, the method further comprises performing the allocating of a positive or negative third amount, using the one or more computers, to make the second amount equal to the first amount, with this operation comprising: determining if an absolute value of the net amount is less than or equal to a threshold amount; if the absolute value of the net amount is less than or equal to the threshold amount, then allocating the third amount so that the net amount plus the third amount nets to zero for the first financial institution; and if the absolute value of the net amount is greater than the threshold amount, then generating and outputting transfer data, by the one or more computers, for a single wire or other fund transfer to or from the first financial institution for the net amount.

In embodiments, if the net amount is different from zero, then taking no action for one or more sub-periods of time, and after the one or more sub-periods of time, then performing the step of obtaining the amount to be transferred to achieve the desired reciprocity level, and generating the data for a wire or other fund transfer to or from the first financial institution to achieve the desired reciprocity level.

In embodiments, if the net amount is different from zero, generating data for a single wire or other fund transfer to or from the first financial institution based at least in part on the net amount.

In embodiments, a method is disclosed, comprising: accessing, using one or more computers, one or more electronic databases, stored on one or more computer-readable media, for assisting in carrying out one or more of the following operations, the one or more databases comprising (i) aggregated account information for a plurality of government-backed insured and interest-bearing aggregated deposit accounts held in a plurality of recipient depository institutions, comprising a balance of funds held in each of the aggregated deposit accounts, wherein funds from a plurality of client accounts are aggregated with funds of other client accounts in the aggregated deposit accounts; and (ii) client account information for each of a plurality of the respective client accounts comprising at least a respective balance of funds from the respective client account held in each of one or more recipient depository institutions in the interest-bearing aggregated deposit accounts holding funds of the respective client account; obtaining, using the one or more computers, client account transaction information of client accounts of a first financial institution that is one of the recipient depository institutions and is also operating as a source institution, for one or more sub-periods of time; obtaining, using the one or more computers, a first amount of funds comprising a respective positive net transfer amount or negative net transfer amount for the one or more sub-periods of time for the first financial institution; allocating, using the one or more computers, the first amount of funds, to one or more other of the recipient depository institutions in one or more aggregated accounts held therein; allocating, using the one or more computers, a second amount of funds sourced from one or more other of the financial institutions to the first financial institution, based on one or more criteria; netting, using the one or more computers, the first amount and the second amount to obtain a net amount; if the net amount is different from zero, allocating a positive or a negative third amount, using the one or more computers, to make the second amount equal to the first amount, so that no transfer of funds is necessary to or from the first financial institution, or taking no action for one or more sub-periods of time, or generating data for a single wire or other fund transfer to or from the first financial institution based at least in part on the net amount; allocating, using the one or more computers, amounts of funds from multiple of the client accounts among multiple of the recipient depository institutions, so that for multiple of the aggregated deposit accounts, a sum of the respective balances of funds from the multiple of the respective client accounts allocated to the respective aggregated deposit account will substantially match the respective balance of funds in the respective aggregated deposit account, after taking into consideration the fund transfer amounts for the one or more sub-periods of time; updating, using the one or more computers, one or more of the electronic databases to update the respective balances of client account funds held in one or more of the recipient depository institutions in one or more aggregated deposit accounts therein based on the allocations; and after one or more sub-periods of time, if the first financial institution is not at a desired reciprocity level, then obtaining an amount to be transferred to achieve the desired reciprocity level, and generating data, using the one or more computers, for a wire or other fund transfer to or from the first financial institution to achieve this desired reciprocity level.

In embodiments, a system is disclosed, comprising: one or more electronic databases, stored on one or more computer-readable media, the one or more databases comprising (i) aggregated account information for a plurality of government-backed insured and interest-bearing aggregated deposit accounts held in a plurality of recipient depository institutions, comprising a balance of funds held in each of the aggregated deposit accounts, wherein funds from a plurality of client accounts are aggregated with funds of other client accounts in the aggregated deposit accounts; and (ii) client account information for each of a plurality of the respective client accounts comprising at least a respective balance of funds from the respective client account held in each of one or more recipient depository institutions in the interest-bearing aggregated deposit accounts holding funds of the respective client account; one or more computers operably connected to the one or more databases and configured to perform the following steps: obtaining, using the one or more computers, client account transaction information of client accounts of a first financial institution that is one of the recipient depository institutions and is also operating as a source institution, for one or more sub-periods of time; obtaining, using the one or more computers, a first amount of funds comprising a respective positive net transfer amount or negative net transfer amount for the one or more sub-periods of time for the first financial institution; allocating, using the one or more computers, the first amount of funds, to one or more other of the recipient depository institutions in one or more aggregated accounts held therein; allocating, using the one or more computers, a second amount of funds sourced from one or more other of the financial institutions to the first financial institution, based on one or more criteria; netting, using the one or more computers, the first amount and the second amount to obtain a net amount; if the net amount is different from zero, allocating a positive or a negative third amount, using the one or more computers, to make the second amount equal to the first amount, so that no transfer of funds is necessary to or from the first financial institution, or taking no action for one or more sub-periods of time, or generating data for a single wire or other fund transfer to or from the first financial institution based at least in part on the net amount; allocating, using the one or more computers, amounts of funds from multiple of the client accounts among multiple of the recipient depository institutions, so that for multiple of the aggregated deposit accounts, a sum of the respective balances of funds from the multiple of the respective client accounts allocated to the respective aggregated deposit account will substantially match the respective balance of funds in the respective aggregated deposit account, after taking into consideration the fund transfer amounts for the one or more sub-periods of time; updating, using the one or more computers, one or more of the electronic databases to update the respective balances of client account funds held in one or more of the recipient depository institutions in one or more aggregated deposit accounts therein based on the allocations; and after one or more sub-periods of time, if the first financial institution is not at a desired reciprocity level, then obtaining an amount to be transferred to achieve the desired reciprocity level, and generating data, using the one or more computers, for a wire or other fund transfer to or from the first financial institution to achieve this desired reciprocity level.

BRIEF DESCRIPTION OF THE DRAWINGS

The above and related objects, features and advantages of the present invention, will be more fully understood by reference to the following detailed description of the exemplary embodiments of the present invention, when taken in conjunction with the following exemplary figures, wherein:

FIG. 1B is a schematic block diagram of an exemplary system in accordance with embodiments of the invention.

DETAILED DESCRIPTION OF EMBODIMENTS

The present invention generally relates to a system, method and program product for minimizing fund movements, such as sweep programs and other fund transfers. In embodiments, the present invention minimizes wire or other fund transfers.

In embodiments of the present invention, the deposit management system may obtain a source transaction for a period, e.g., one or more hours, one or more days, one or more weeks, etc., for a given financial institution that operates as both a source institution to send funds out to the deposit management system and a recipient depository institution that receives funds in from the deposit management system. The deposit management system may then obtain recipient transaction for this given financial institution based on one or more parameters. The deposit management system then nets the source transaction amount for the period ("a first amount") with a recipient amount for the period ("a second amount"), to obtain a net amount for the period. The financial institution and/or the deposit management system may perform or have performed or facilitate performance of an internal book transfer to match the first amount with the second amount to effectuate a process to minimize the number of fund transfers required. In embodiments, the system may also adjust the amount of funds to be received by the financial entity as a recipient depository institution (the net amount) to avoid wire transfers completely when one or more parameters are met, such as the net amount be less than some predetermined amount (e.g., $100, $1,000, etc.), thus avoiding even one wire transfer fee in a given period, e.g., one or more hours, one or more days, one or more weeks, etc.

Figure 1A:
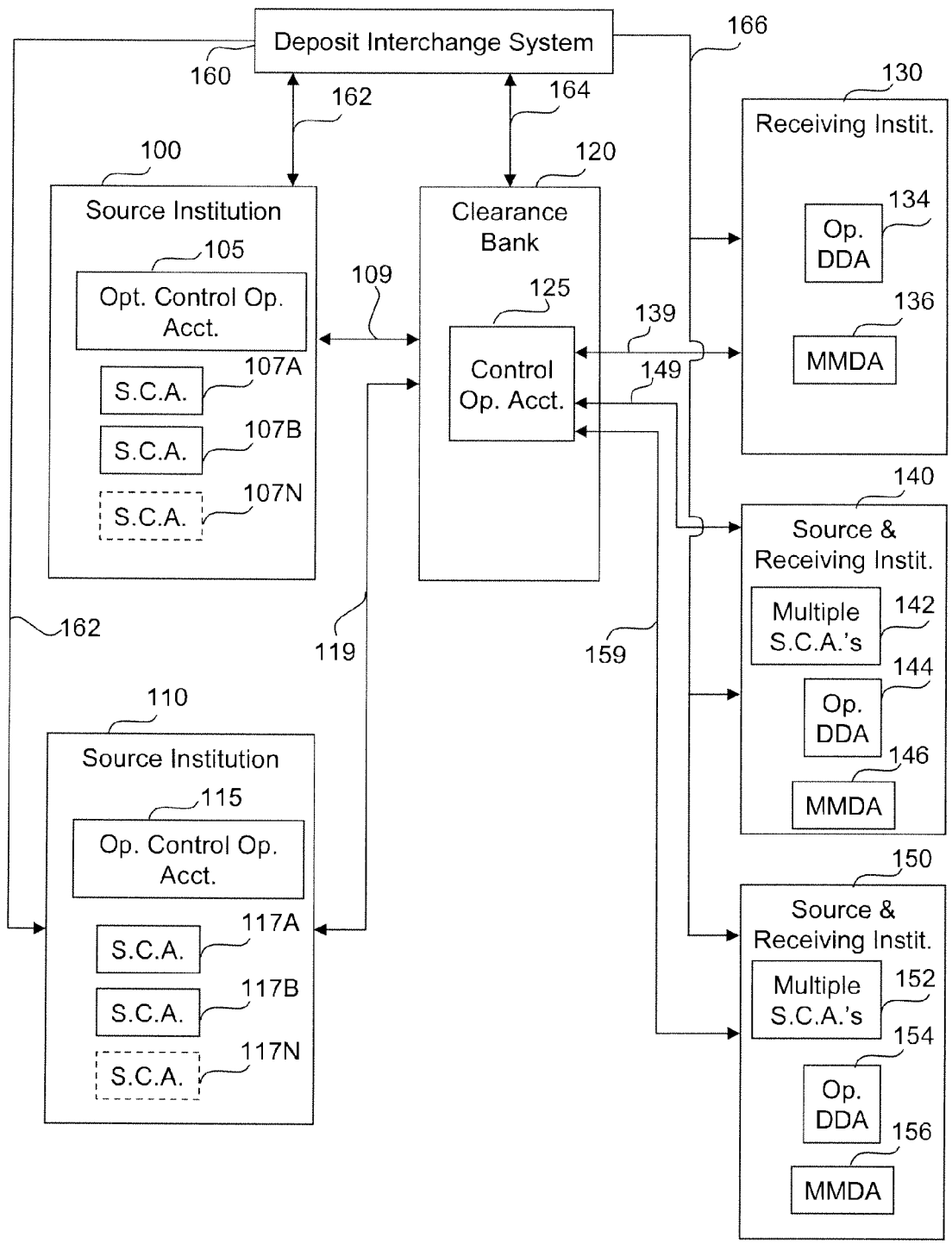
FIG. 1A is a schematic block diagram of an exemplary system in accordance with embodiments of the invention.
Figure 1C:
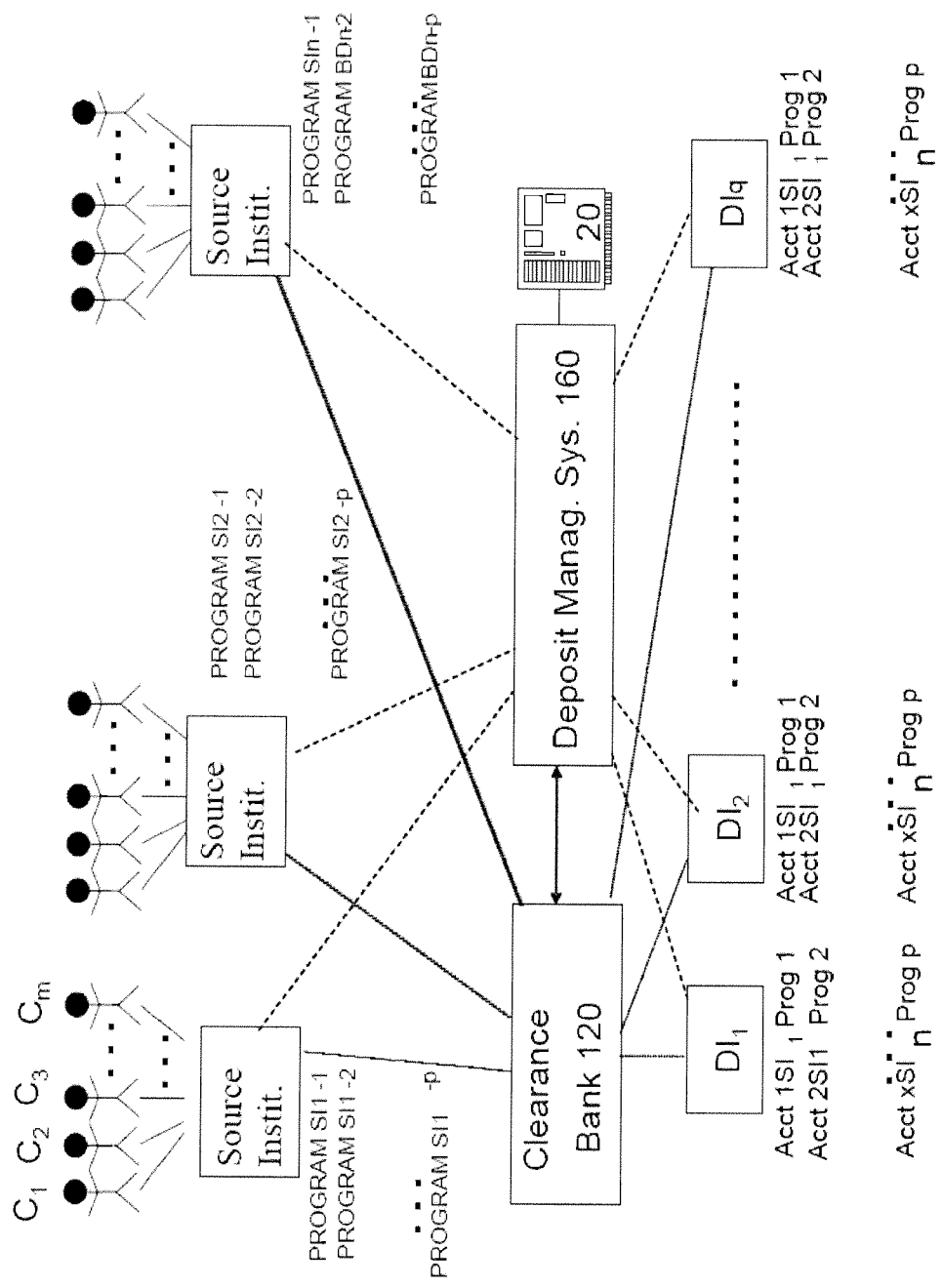
FIG. 1C is a schematic block diagram of an exemplary system in accordance with embodiments of the invention.

In a typical deposit sweep system, one or more financial entities FE may participate in a program, which comprises source institutions and recipient institutions. In embodiments, there may also be intermediate institutions. FIGS. 1A, 1B and 1C illustrate exemplary embodiments of various kinds of deposit sweep programs. As discussed below, some financial institutions may play one or more roles, or multiple financial institutions may be the same role.

Source institutions may, by way of example, be banks, credit unions, registered investment advisors, broker dealers, asset managers, and other types of financial institutions, to name a few. Typically, the source institutions are the institutions that interact with the clients that are placing or authorizing the respective clients' funds to go into and/or be managed by the deposit management system. Note that a source institution can include one or more clearing institutions for other source institutions, investment advisors, and/or intermediaries for other source institutions. These terms will be discussed below.

Recipient depository institutions are typically banks or other types of deposit institutions whose accounts are backed by some form of insurance, such as government-backed insurance, like Federal Deposit Insurance Corporation (FDIC) insurance in the case of banks, or the National Credit Union Share Insurance Fund (NCUSIF) in the case of credit unions, or by collateral. In embodiments, rather than using government backed insurance, some or all of the deposits may be backed by some form of collateral, such as a pledge of government securities 14 (e.g., U.S. Treasury or U.S. Agency obligations), state obligations or other collateral.

However, note that in embodiments some recipient depository institutions may hold financial instruments that are not insured.

One or more inteiniediary institutions may be used to facilitate the movement of funds between the source institution(s) and the recipient depository institution(s), and/or to perform various recordkeeping functions. Such intermediaries may perform record keeping and/or fund transfer functions, and may include a bank or clearance bank through which fund transfers may be facilitated, a clearing firm, an administrator that performs recordkeeping functions and/or provides data to facilitate fund transfers, and/or other entities that perform fund transfer or recordkeeping functions. Note that one or multiple entities may fulfill a single function or role and/or multiple functions or roles.

With respect to some types of source institutions, the source institution itself may clear its own client accounts or it may use another entity to clear its client accounts. If a source institution is a clearing entity, it may provide clearing services to other source institutions, such as broker-dealers, banks, financial advisors, financial intermediaries, to name a few. Such entities for which clearing services are performed by another entity are sometimes referred to as "correspondents." Under some guidelines, when a clearing entity is used to clear funds for one or more correspondents, the funds of the clearing entity and the one or more correspondents may be held together in an aggregated account such as an interest-bearing aggregated money market deposit account or an aggregated demand deposit account. In embodiments, the funds from each different correspondent may be segregated in a separate aggregated account.

In some deposit sweep systems, one entity may play the role of one or more of the above. For example, a source institution, such as a bank, may also be a recipient depository institution. Similarly, a source institution, like a broker-dealer, or a bank, may be affiliated with one or more of the recipient depository institutions. In embodiments, there may be no affiliation between the institutions, or an affiliation between only some of the institutions.

Further, the administrator may also be either a source institution, a recipient depository institution, a clearance bank, or another entity participating in deposit sweep functions. Further, in embodiments one entity may play part of one role and another part of another role. For example, when a bank is an intermediary it may be used to facilitate the transfer of funds, but also may be a source institution and/or a recipient depository institution. Such a bank, may or may not use a separate record keeper.

Likewise, a particular program may have one source institution or multiple source institutions. Similarly, a particular program may have one recipient depository institution or multiple recipient depository institutions.

A "program" comprises a deposit arrangement to make available government-backed insurance through one or more aggregated accounts, wherein such program can provide to account holders government-backed insurance in an amount greater than an insurance limit for funds held in a single depository institution, through the use of a plurality of government backed insured and interest-bearing aggregated deposit accounts, with the aggregated deposit accounts in different program depository institutions. Each program may include one or more insured deposit products, with one or more of the programs having different attributes, such as different insurance levels, different tier options and rates paid, and services, to name a few. In embodiments, the rates paid may be determined by such factors as the balance in the client's insured account, or may be determined by the total value of the client's brokerage account, or may be determined by the total value of a group of accounts for a particular household together, or may be determined by relationship pricing based on the number of products a client uses though a source institution (SI) or affiliated source institutions, to name a few. Each source institution may have a plurality of client accounts, S.C.A.'s, that invest in particular products that make up part of a particular program. The client accounts, S.C.A., may be for individuals or corporations or government entities, $C_1, C_2, C_3, C_m$, or any other form of entity. Thus, for example, as illustrated in FIG. 1C, a source institution may manage a number of programs PROGRAM SI1-1, PROGRAM SI1-2, . . . PROGRAM SI1-p, where each client account, S.C.A., of the source institution SI1 invests in at least one of the products under at least one of the programs PROGRAM SI1-1—PROGRAM SI1-p. Examples of different kinds of programs that may be offered, include a program with cash management services, a program for high net worth individuals with a higher minimum balance requirement, a program paying a lower rate and offering more services, a no frills program with a higher rate and no services where for a fee, the client may get other services, to name a few. Note that in embodiments, a program may also manage some client funds that are held in investment instruments that are not government-backed insured instruments.

Each source institution may have one or more programs of its own, and/or may participate in one or more programs of other institutions. Each client may participate in one or more programs from a single source institution, or may participate in several different programs. Also, multiple source institutions can participate in the same program. The same recipient depository institution may participate in different programs with the same or for different source institutions.

The present invention may be used in the context of these exemplary or other fund movement systems.

In the description to follow, the term "client account" refers to an account associated with client funds, such as, for example, consisting of funds of the client designated or determined for management by the deposit management system, to be described.

Referring to FIG. 1A, the present invention generally relates to a system, method and/or program product for processing one or more deposit sweep or other fund transfer programs wherein a deposit management system 160 receives/sweeps fund from some source institutions and deposits funds back to one or more other source institutions 140-150, e.g., financial institutions, such as banks, and allocates funds among recipient depository institutions. In embodiments. some of these financial entities (100, 102) may operate as only source institutions, some of these financial entities may operate as only recipient depository institutions (130), and some of these financial entities may operate as both source institutions and recipient depository institutions (140, 150). Embodiments of this invention may have application to financial institutions that operate as both source institutions and also operate as recipient depository institutions, and hold one or more government-insured interest-bearing aggregated deposit accounts. In embodiments, the funds may be deposited to or redeemed from one or more government-insured interest-bearing aggregated deposit accounts held in these financial institutions. In embodiments, a portion of the client account funds may also be deposited in other investment vehicles held in or directed by another respective recipient depository institution. Although embodiments of the present invention apply to operations with respect to financial institutions that operate as both a source institution and a recipient depository institution, and hold one or more of government backed insured and interest bearing aggregated accounts, other source-only institutions 100 and 110, such as broker-dealers, financial advisors, intermediaries and/or other financial institutions, may also be part of the system 160, and may supply funds to be used in the process.

The deposit management system 160, comprises one or more computers, which may be configured to perform one or more of the following tasks:

(a) obtaining information regarding transactions applied to client accounts at source institutions 100, 110, 140-150, in a particular time period, such as over a particular time range, such as a range of hours, a day, a week, a month or the like. Such information may be in the form of detailed individual transactions, summary transactions or combinations thereof. Transactions may include sweeps, checks, transfers to cover transactions, e.g., securities transactions or margin accounts, debit card transactions, credit card transactions, on-line bill paying transactions, touch tone bill paying data, ACH transactions, wire transactions, to name a few. In embodiments, such information may be obtained directly by processing one or more transactions, or indirectly by other means. In embodiments, such information may be received electronically in the form of a sweep file or other data transmission which may contain either detailed or summary information for each client account which has activity in a given time period. In embodiments, such information may be received in person, over the telephone, by fax or other distribution means, and entered by keying or scanning such information. One or more items of information may be obtained by one or more of these exemplary methods.

(b) obtaining net transfer information associated with the movement of funds from and/or to source institutions, clearance institutions and/or recipient depository institutions. Such net transfer information may be received electronically either in connection with a sweep file or data transmission, and/or separately, and/or received in person, and/or over the telephone, by fax or other distribution means and entered by keying or scanning such information, and/or by calculating or by verifying the net transfer information by the deposit management system 160. The net transfer information can reflect one net transfer per institution, and/or multiple net transfers reflecting each separate transfer to be conducted between institutions. For example, a net transfer could reflect a single net transfer between a source institution and a clearance institution to reflect transactions occurring during a particular time period, such as a range of hours, a day, a week, a month or the like. A net transfer could also or alternatively reflect a plurality of net transfers between a clearance institution and different recipient depository institutions associated with a particular transfer of funds relating to transactions occurring during one or more particular time periods.

(c) obtaining first allocation information associated with the allocation of funds among various recipient depository institutions. The allocation information may be received electronically either in connection with a sweep file or data transmission and/or separately, received in person, over the telephone, by fax or other distribution means and entered by keying or scanning such information, and/or may be calculated and/or may be verified by the deposit management system 160. The allocation information may be calculated based at least in part on one or more criteria. Examples of such criteria are set forth in U.S. Pat. No. 7,509,286, U.S. Pat. No. 7,752,107, and U.S. application Ser. No. 12/638,544, filed on Dec. 15, 2009, which are hereby incorporated by reference in their entirety. The allocation information may be used in generating the net transfer information to and/or from recipient depository institutions.

(d) generating recommended and/or actual withdrawal/transfer amount(s) and/or instructions and/or deposit/transfer amount(s) and/or instructions to and/or from source institutions and/or recipient institutions. In embodiments, the system may generate recommended and/or actual instructions to be carried out by source institutions, agents of source institutions, intermediaries and/or others. In embodiments, intermediaries may up-load or otherwise provide instructions to be approved, executed and/or performed by others.

(e) obtaining allocation information regarding funds held in particular aggregated deposit accounts at recipient depository institutions associated with particular client accounts. In embodiments, the allocation information may be calculated based at least in part on one or more criteria. Note that the order of the foregoing steps is not limiting on the invention.

As noted, each of a plurality of these source institutions that are also recipient depository institutions 140-150$n$ in the deposit sweep management system 160 holds one or more interest-bearing aggregated deposit accounts 134, 144 and 154 (for example, an aggregated money market deposit account, e.g., MMDA), for holding funds associated with a plurality of clients accounts participating in the program. In embodiments, these aggregated deposit accounts can be insured, for example with government-backed insurance, such as Federal Deposit Insurance Corporation (FDIC) insurance in the case of, e.g., a bank, or National Credit Union Share Insurance Fund (NCUSIF) insurance in the case of, e.g., a credit union, to name a few. In embodiments, rather than using government backed insurance or in addition to government backed insurance, some programs may back some or all of the deposits by some form of collateral, such as pledge of government securities 14 (e.g., U.S. Treasury or U.S. Agency obligations), state obligations or other collateral. Note that in embodiments, some of the funds managed by the program may be held in other investment vehicles, such one or more money funds, or one or more aggregated investment vehicles that are not insured.

In some embodiments, one or more, of the recipient depository institutions with the interest-bearing aggregated deposit accounts 136, 146, 156, may also hold an optional transaction account 134, 144, 154, such as a demand deposit account (DDA) or a NOW account, for facilitating withdrawals from the interest-bearing aggregated deposit account 134, 144, 154, in the respective recipient depository institution.

In an exemplary embodiment shown in FIG. 1A, information for a plurality of client accounts (107A, 107B, . . . 107N) associated with a source institution 100 is held in one or more databases, with each of a plurality of the respective client accounts held on behalf of different clients and comprising client funds managed by a program. In embodiments, the deposit management system 160 may maintain electronic records corresponding to client accounts (107A, 107B, . . . 107N) in the one or more databases. In embodiments, a respective source institution 100 may have one or more control operating accounts. In embodiments, the control operating account 105 may be at the respective source institution 100. Alternatively or in addition, in embodiments, the control operating account for the source institution 100 may be at another financial institution, such as a clearance account 125 held in a clearance bank 120. In embodiments, funds may flow in and out of the client accounts (107A, 107B, . . . 107N), directly and/or via the control operating account 105 and/or via control operating account 125. Alternatively, in embodiments, the funds in one or more of the client accounts may flow directly between institutions without an internal and/or an external control operating account. In embodiments, fund flows may be via a combination of one or more control operating accounts and also directly between institutions without using an external control operating account. Note that this description may apply to all of the source institutions, including the source institutions 140-150n that are also recipient depository institutions.

As noted, fund movement data may be received by the deposit management system 160, via a sweep file comprising fund transfer data swept from or to one or more of client accounts of a source institution 130-150n that is also operating as a recipient depository institution, or via fund transfer data from another entity (e.g., a payment or credit vendor such as a debit card or credit card processor), or from a client, or from a fund reallocation determined by or for the deposit management system 160, or from any other source. The fund movement data may be received electronically by wire, or via Facsimile or telephone, for example, so that the data may need to be manually keyed, optically scanned, or otherwise entered into the deposit management system 160, and/or it may be verified and/or in some cases, calculated. The fund transfers may comprise data for individual check deposit data, wire deposit data, electronic ACH deposit data, electronic debit card transaction files, electronic credit card transaction files, check presentment data, ACH debit data, touch tone bill paying data, Internet bill paying data, a sweep file, and/or a net of a plurality of deposit/transfers for one client account or multiple client accounts, and/or a net of one or more of withdrawals/transfers for one client account or multiple client accounts, and/or a net of one or more deposits/transfers and one or more debits/transfers from one client account or multiple client accounts, to name a few.

FIG. 1B illustrates another exemplary embodiment of the overall system in a hub and spoke context, for ease of explanation. At the center or hub is the deposit management system 160, and a control operating account 125. The deposit management system 160 and control operating account 125 may be at the same or different institutions, consistent with the present invention. The source institutions 100 and 110 are illustrated as spokes, with each source institution comprising client accounts, as reflected in FIG. 1A. One or more of the source institutions may optionally also include a control operating account associated therewith in embodiments. The control operating account associated with the respective source institution may be at the respective source institution, or at another institution affiliated with the source institution, or at a different institution entirely. A source institution may also be the same as or affiliated with one or more institutions associated with the deposit management system 160, the control operating account 125, or the recordkeeper for the system.

Institutions 130 140 and 150 are illustrated as yet other spokes in the figure. Financial institution 130 operates as a recipient depository institution comprising an MMDA 136 and an optional aggregated transaction account 134. Financial institutions 140-150 operate as source institutions in some fund transfers, and recipient depository institutions in other fund transfers. Institution 140 comprises multiple client accounts 142, as well as an optional aggregated transaction account 144 and an MMDA 146. Likewise, institution 150 comprises multiple client accounts 152, as well as an optional aggregated transaction account 154 and an MMDA 156. In embodiments, the deposit management system 160 may keep electronic records associated with the multiple client accounts 142, 152, and the like, or may access such records.

Other forms of deposit sweep systems may also be used with the present invention.

As an illustrative operation, a source institution may generate or receive fund transfer data. Note that how and where this data is generated is not limiting on the invention. For example, the fund transfer data may be generated by respective source institutions, and/or by the deposit management system 160 as part of a reallocation of funds among recipient depository institutions. See the discussion of examples of the fund transfer data obtained by the deposit management system 160, above.

Fund transfer data may comprise or may be based at least in part on data, such as one or more sweep reports, or one or more payment entity reports, or fund reallocation data, or client communications, and may be received electronically either in connection with a sweep file or data transmission and/or separately, and/or received in person, and/or over the telephone, by fax or other distribution means and entered by keying or scanning such information, and/or may be calculated or verified by the deposit management system 160. For example, the fund transfer data may represent information about respective client funds to be transferred out of the deposit management system or to be transferred to recipient depository institutions in the deposit management system. In embodiments, this information may comprise a net for each client account, of client transactions crediting/transferring funds to, and/or debiting/transferring funds from, the respective client account, determined over a period of time. In embodiments, the transfer amount may be verified, such as using the one or more computers of the deposit management system 160. Note that the amount of funds swept from a client account may or may not match the transaction amounts. For example, the sweep amount may comprise some amount above a threshold amount.

In embodiments, the one or more computers of the deposit management system 160 may be configured with programming code to select one or more of the recipient depository institutions, e.g., banks 130-150n, in the deposit management system 160, for deposits/transfers and/or withdrawal/transfers, based at least in part on the fund transfer data and on one or more parameters. In embodiments, the allocation may be based, at least in part, on the fact that a given recipient depository institution has contributed source funds to the deposit management system (when operating as a source institution), or based, at least in part, on an amount of source funds contributed by the given prospective recipient depository institution (when operating as a source institution from its client accounts and/or other of its source institution funds), to interest-bearing aggregated deposit accounts or other accounts associated with the program. Note that such reciprocity may be one-to-one, or may be based at least in part on something other than one-to-one, and may be determined using an algorithm, or other means of determining the amount. In embodiments, the algorithm may be implemented electronically. In embodiments, it may be manually applied. Also, the reciprocity may only be applied for funds of a given set of client accounts, or for a given type of client accounts, such as accounts with municipal or other governmental funds. Also, the reciprocity may be applied only for selected source and/or recipient depository institutions. Examples of such arrangements are taught, for example, in U.S. Pat. No. 7,536,350, and application Ser. No. 11/641,046, filed Dec., 19, 2006, which are hereby incorporated by reference in their entirety for all purposes.

Another parameter that may be used to select one or more recipient depository institutions and to determine and allocate deposit/transfer amounts and/or withdrawal/transfer amounts, may be an amount of funds of a given client account already held in the particular recipient depository institution in the management system relative to a deposit limit associated with available insurance protection, such as a government-backed insurance like FDIC insurance or NCUSIF insurance, to name a few, or some other deposit limit set either by the program, the program participant, or otherwise, or relative to one or more client or source institution or intermediary institution selected parameters relating to an amount or a percentage of funds from that client account that may be held by a given recipient depository institution in the management system. Examples of such parameters are discussed for example in U.S. Pat. No. 7,672,886; U.S. Pat. No. 7,680,734; U.S. Pat. No. 7,752,107; U.S. Pat. No. 7,668,771; U.S. Pat. No. 7,752,129; U.S. Pat. No. 7,519,551; U.S. Pat. No. 7,680,734; U.S. Pat. No. 7,769,688; U.S. Pat. No. 7,809,640; U.S. Pat. No. 7,668,771; U.S. Pat. No. 7,672,901; and U.S. application Ser. No. 12/638,544, filed on Dec. 15, 2009, each of which are incorporated by reference in their entirety for all purposes.

In embodiments, the deposit management system 160 can generate and/or send an electronic message or other communication to be received by the one or more recipient depository institutions with information about a prospective deposit/transfer or withdrawal/transfer, allocated to the respective recipient depository institution. This information may comprise the amount of the prospective deposit/transfer or withdrawal/transfer allocated to the respective recipient depository institution. In embodiments, this message may be generated and transmitted in person, by messenger, over the telephone, or by electronic communication either directly or indirectly.

In embodiments, the deposit management system 160 may generate and/or transmit transfer data directly and/or in conjunction with other agents to provide instructions to transfer funds to or from an insured and interest-bearing aggregated deposit account in one or more of the recipient depository institutions. Note that the transfer data may be sent directly by wire or other means to the recipient depository institution or may be sent by messenger or other method (to be discussed below) permitted by the banking regulations that does not count against the 6 withdrawal limit per month currently set forth in the banking regulations, or may be sent to the relevant source institution for subsequent communication to the respective recipient depository institution.

In embodiments, transfer data generated by the deposit management system 160 for the insured interest-bearing aggregated deposit account or other account holding funds may be communicated either directly or indirectly to the recipient institutions. In embodiments, the transfer data may be for presentation in a manner that does not count against the six transfer limit per month imposed by Federal regulations on interest bearing accounts, e.g., either in person, or by mail, or by messenger, or by telephone and distributed by mail, or by automated teller machine, or a combination thereof, so that the insured and interest-bearing status of the aggregated deposit accounts may be preserved. This manner of making embodiment can be implemented by ensuring that no more than some predetermined number of withdrawals are made using a method that implicates the 6 withdrawal limit and that all other withdrawals from that account during the month are made in a manner that does not count against the six transfer limit per month. In embodiments, the instructions may be generated electronically, and communicated in some convenient way to a messenger service, followed by a subsequent messenger delivery to the recipient depository institution. Note that in embodiments, the fund transfer data may be communicated by the deposit management system 160 to the respective source institution for provision to the messenger service.

In embodiments, in the event that the messenger does not timely deliver the MMDA withdrawal instructions, the respective recipient depository institution may use one of the 6 electronic withdrawals during the month (or other prescribed period), as permitted in the Banking Regulations. In embodiments, during a statement period, if there are 6 or less days in the statement cycle, a messenger may be unnecessary for any remaining withdrawals during that cycle, as taught by application Ser. No. 12/974,973, filed on Dec. 21, 2010, which is hereby incorporated by reference in its entirety for all purposes.

In embodiments, client account amounts are reallocated/reshuffled among the recipient depository institutions in the one or more databases to substantially match the one or more fund transfers and reflect the transfers to and/or from the one or more of the recipient depository institutions.

In embodiments, one or more programs may establish or have established or require establishment of an interest-bearing government-backed (e.g., FDIC, NCUSIF, etc.) insured aggregated deposit account, such as an aggregated money market deposit account (MMDA) at one or more depository institutions. In embodiments, one or more programs may optionally also establish or have established or require establishment of a like-titled (titled to the same entity as the interest-bearing aggregated deposit account) aggregated transaction account, such as a DDA, or NOW account, at each of one or more of the recipient depository institutions. The deposit management system may keep track of data related to such aggregated deposit accounts. As noted, in embodiments, rather than using government backed insurance or in addition to government backed insurance, some programs may back some or all of the deposits by some form of collateral, such as pledge of government securities 14 (e.g., U.S. Treasury or U.S. Agency obligations), state obligations or other collateral.

Figure 2:
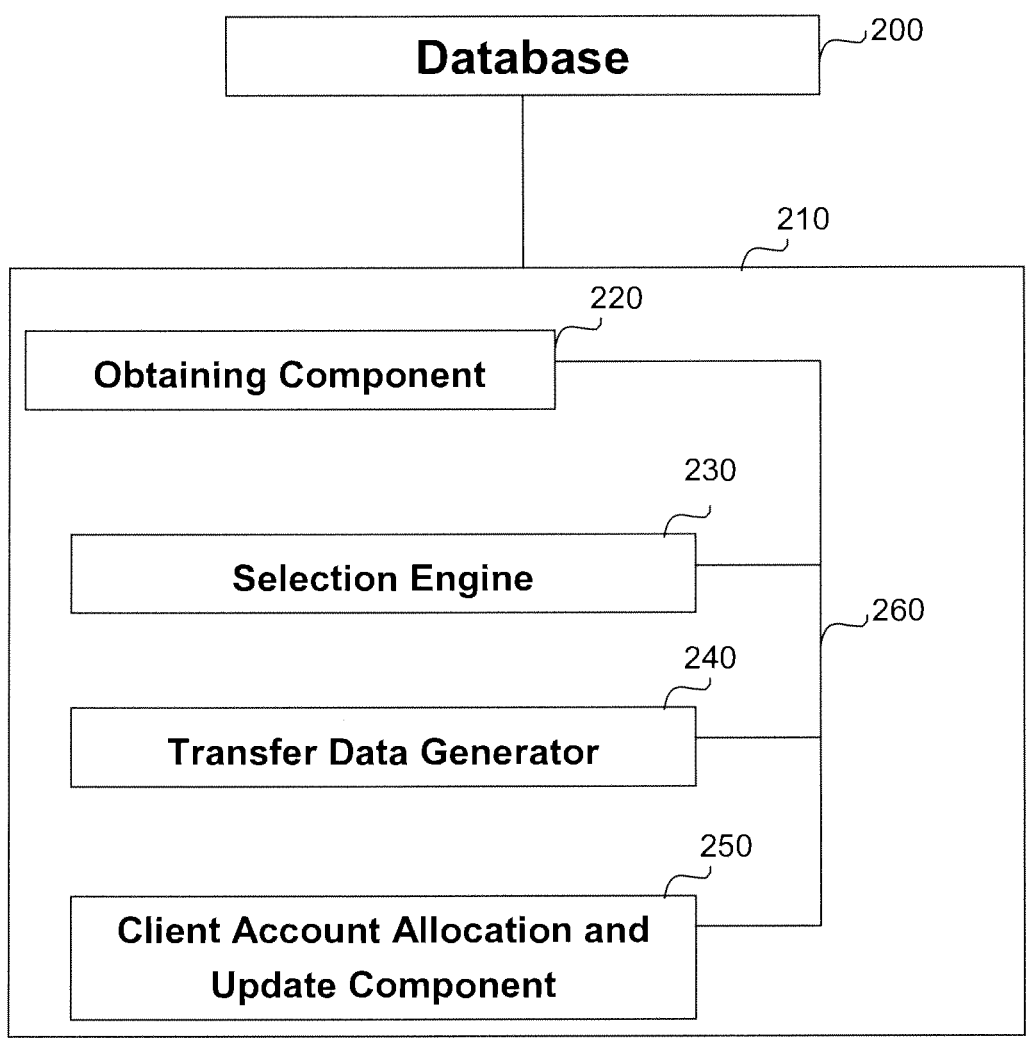
FIG. 2 is a schematic block diagram of an exemplary system in accordance with embodiments of the invention.

FIG. 2 illustrates exemplary embodiments, which comprise one or more electronic databases 200 and one or more computers 210.

In embodiments, the one or more electronic databases 200, stored on one or more computer-readable media, comprises: aggregated account information for a plurality of government-backed insured and interest-bearing aggregated deposit accounts held in a plurality of recipient depository institutions participating in a program, and also client account information.

The aggregated account information may comprise, in embodiments, information on a balance of funds in the respective aggregated deposit account, and/or identification information for the respective depository institution holding the aggregated deposit account, and/or source institution information (as described below) for the funds held by the aggregated deposit account, to name a few. In embodiments, each of multiple of the depository institutions in the deposit management system holds at least one of the government-backed insured interest-bearing aggregated deposit accounts, wherein funds from a plurality of client accounts are aggregated with funds of other client accounts in the aggregated deposit accounts.

As noted, in embodiments, the aggregated account information for each of a plurality of the recipient depository institutions that are source institutions, may further comprise a balance of source funds from the respective recipient depository institution, where the source funds comprise funds where the respective recipient depository institution is a source of the funds into the deposit management program. In embodiments, the source funds comprise funds of the respective institution held in one or more of the aggregated deposit accounts in the other recipient depository institutions in the program, and/or may be held in other investment vehicle accounts managed by the deposit management system 160 for a program.

In embodiments, the client account information in the one or more databases may comprise, for each of a plurality of the respective client accounts, one or more or all of: (a) a respective balance in the respective client account; (b) deposit/transfer and/or withdrawal/transfer data for the respective client account, which may include individual credit and debit data and/or nets of such credit and debit data for the client account, as previously described; and (c) a respective balance of funds from the respective client account held in each of one or more banks or other recipient depository institutions in the interest-bearing aggregated deposit accounts holding funds of the respective client account. In embodiments, the client account represents funds of a client held in one or more of the interest-bearing aggregated deposit accounts held by the depository institutions in the program and any other investment vehicle accounts managed by the program.

In embodiments, the one or more computers 210 for the deposit management system may be operatively connected/accessible to computer-readable program code stored in memory, and may be capable of executing program code uploaded therefrom to configure the one or more computers into one or more special-purpose machines. The code, in embodiments, may be comprised of programming modules or other software forms that implement functional components in the one or more computers. These modules or other software forms may be stored separately or in combination.

The one or more computers 210 may be configured, in embodiments, with program code to form an obtaining component 220. The obtaining component 220 obtains a respective net transfer amount for the one or more sub-periods of time for each of one or more of the respective source institutions. The obtaining component, in embodiments, may optionally obtain client account transaction information for each of multiple of the client accounts, where the client account transaction information comprises credit information and/or debit information applied to or against a respective client account for one or more sub-periods of time and/or other transfer information.

As noted, the client account transaction information for each of multiple of the client accounts may comprise information regarding transactions applied to client accounts at source institutions 100, 110, 140-150, such as over a particular time period, such as a range of one or more hours, one or more days, one or more weeks, month or the like. Such information may be in the form of detailed individual transactions, summary transactions (e.g., nets) or combinations thereof. Transactions may include sweeps, checks, transfers to cover, e.g., securities transactions or margin accounts, debit card transactions, credit card transactions, on-line bill paying transactions, touch tone bill paying data, ACH transactions, wire transactions, to name a few. In embodiments, such information may be obtained directly by processing one or more transactions, or indirectly by other means. In embodiments, such information may be received electronically in the form of a sweep file or other data file, which may comprise either detailed or summary information for each client account which has activity in the given time period. In embodiments, such information may be received in person, over the telephone, by fax or other distribution means, and entered by keying or scanning or other means of entry of such information. One or more items of information may be obtained by one or more of these exemplary methods. Other transfer information may comprise information generated by the deposit management system 160 or another entity as part of a fund reallocation, or may be generated by another entity, and may comprise depository institution opt-in or opt-outs, depository institution minimum caps and/or maximum caps, depository institution target balances, the addition or deletion of depository institutions based on various parameters, to name a few.

In embodiments, the obtaining component 220, may be configured to perform a netting operation to calculate the respective net transfer amount for one or more sub-periods of time for one or more of the respective source institutions. Alternatively or in addition, the net transfer amount may be received for other of the source institutions.

In embodiments, the obtaining component 220 may comprise a communication component, configured on one or more computers, for receiving electronically, via one or more electronic networks, the information on the respective one or more net fund withdrawal/transfer amounts and/or one or more net fund deposit/transfer amounts, to be transferred to or from one or more recipient depository institutions, to or from one or more source institutions, and/or directly to credit card or other payment entities.

The one or more computers 210 for the deposit management system may be further configured with program code to comprise a selection engine 230 for selecting at least one aggregated deposit account in one or more of the depository institutions to which to deposit/transfer or to withdraw/transfer funds to or from their respective one or more aggregated deposit accounts based on one or more criteria.

In embodiments, the selection engine 230 may perform the selection based at least in part on the fact of, and/or an amount of funds that the prospective recipient depository institution, when operating as a source institution, has provided to the program to be held in aggregated deposit accounts of other recipient depository institutions in the program. In embodiments, the selection engine 230 may perform the selection based at least in part on this source amount of the respective financial institution relative to amounts sourced to the program from other prospective recipient depository institutions, and/or relative to one or more threshold amounts. In embodiments, an operation is performed of comparing an updated amount of source funds of the prospective recipient depository institution (when operating as a source institution) to the updated source fund amounts of other prospective recipient depository institutions (when operating as source institutions). One or more other parameters may also be used in selecting the one or more recipient depository institutions, such as an amount of funds already held in the prospective recipient depository institution by one or more of the client accounts, based at least in part on such considerations as insurance limits, and/or client designated amounts, and/or percentages to be held in a given recipient depository institution. Another parameter may comprise complying with a respective minimum cap and/or a respective maximum cap associated in the one or more databases with a respective depository institution. Another parameter may comprise complying with respective target balances associated in the one or more databases with a respective depository institution.

The one or more computers 210 for the deposit management system may be further configured, in embodiments, with program code for a transfer data generator 240 for generating recommended and/or actual withdrawal/transfer amount(s) and/or instructions for deposit/transfer amount(s) to and/or from source institutions and/or recipient depository institutions. In embodiments, the system may generate recommended and/or actual instructions to be carried out by source institutions, agents of source institutions, intermediaries and/or others. In embodiments, intermediaries may upload or provide instructions to be approved, executed and/or performed by others.

The one or more computers 210 for the deposit management system may be further configured, in embodiments, with program code to comprise an allocation and update component 250, for allocating, using the one or more computers, amounts of funds from multiple of the client accounts among multiple of the recipient depository institutions, so that the respective balance of funds in each of the aggregated deposit accounts of the depository institutions, after taking into consideration the fund transfer amounts for the one or more sub-periods of time, will substantially match a sum of the respective balances of funds from the multiple of the respective client accounts allocated to this respective aggregated deposit account. In embodiments, the client account allocation information may be calculated based at least in part on one or more criteria. The component 250 may also perform book transfers of ownership interests, and update the one or more of the electronic databases with allocation information regarding funds of particular client accounts held in particular aggregated accounts at recipient institutions. In embodiments, a record keeper performs such allocations and/or allocation calculations in accordance with one or more parameters.

A system bus 260 may further be provided to facilitate electronic data communication among the components.

In embodiments, the present invention may be related to an improvement in a deposit management system to minimize wire or other fund transfers to and/or from a financial entity which operates both as a source institution and a recipient depository institutions. In the prior art, the total deposits and withdrawals of customers of a financial entity (when acting as a source institution) were netted to determine a net amount of fund to be deposited into the system or to be withdrawn from the system ("the source institution net transaction"). Separately, a net amount of funds to be sent to the financial entity as a recipient depository institution was determined based on transactions of customers of other source institutions ("the recipient depository institution net transaction"). In some prior art systems, a reciprocity was previously determined by matching total assets on deposit of a given financial institution sent/sourced to the system as a "Source Institution" for deposit in other financial institutions in the deposit management system which are acting in that instance as recipient depository institutions, with the total assets on deposit of that given financial institution received from the deposit management system as a "recipient depository Institution." For examples of a deposit systems that use reciprocity, see U.S. Pat. No. 7,536,350, which is hereby incorporated by reference in its entirety.

In the present invention, in embodiments, the deposit management system seeks to match "the source institution net transaction" for a period, e.g., one or more hours, one or more days, one or more weeks, etc., for a given financial institution, with the "recipient depository institution net transaction" for the period to be received by the given financial institution. When a financial institution participates in more than one program, there may be more than one source institution net transaction and/or recipient depository institution net transaction for that financial institution. The source institution net transaction and the recipient depository institution net transaction may then be netted to determine a financial entity net transaction. A financial entity net transaction may be determined either on a program by program basis or across one or more programs consistent with embodiments of the present invention. An external fund transfer to and/or from the financial entity to another institution (e.g., a clearance account at a settlement bank) may then be implemented in the amount of the financial entity net transaction. The books of the financial entity and/or the source institution and/or the system can then be adjusted to account for the transfer of ownership interests to effectuate the transfer of the matching amounts. By netting the source institution net transaction and the recipient depository institution net transaction the number of external fund transfers to the financial entity may be reduced, e.g., from two to one, thereby reducing the wire and/or fund transfer costs associated with the program. In embodiments where a net of in-coming funds is not equal to outgoing funds, data for only a single wire or other fund transfer may be generated.

In embodiments, the system may also adjust the amount of funds to be sent or to be received by the financial entity as a recipient depository institution to avoid wire transfers, such as when the financial entity net transaction is less than some predetermined amount (e.g., $100, $1,000, etc.) or within a given range. In such embodiments, even one external transfer fee for that fund transfer/wire in a given period, e.g., several hours, one or more days, one or more weeks, for one or more of the financial institutions may be avoided.

In embodiments, where reciprocity of assets is a parameter used to determine amounts of recipient depository institution net amount, that amount may be further adjusted to avoid wire transfers, thereby resulting in a reciprocal match that may be above or below 100% or some other fixed or variable percentage. In embodiments, the percentage may be calculated using an algorithm specified or otherwise designated. In embodiments, the percentage may be specified by the recipient institution, and/or intermediate institution, and/or by the program. At the end of some period of time, e.g., one or more days, or one or more week, or other predetermined time, or an ad hoc period of time, the deposit management system may re-sequence these financial institutions to their desired reciprocal balance using book entry and/or fund transfers.

These various embodiments may be particularly useful in reciprocity operations, where a financial institution is selected or designated for 100% reciprocity or some other fixed or variable percentage, for the funds that it sources to the deposit management system.

In embodiments of the present inventions, if the source institution redemption is de minimis, funds may not be moved out of the recipient depository institution for the redemption. This then results in the recipient depository institution effectively having a reciprocal match that is above 100% or some other fixed or variable percentage. As noted, at the end of some period of time, e.g., a day, or a week, or other predetermined time, or an ad hoc period of time, the deposit management system re-sequences these financial institutions to their desired reciprocal balance using book entry and/or fund transfers.

Likewise, this operation may be applied when servicing a de minimis net deposit sourced from the given financial institution. Thus, the de minimis deposit would not be transferred out of the source institution. However, with book transfers of ownership interests, the result would be the recipient depository institution effectively having a reciprocal match that is below 100% or some other fixed or variable percentage. At the end of some period of time, e.g., one or more hours, one or more days, one or more weeks, or other predetermined time, or an ad hoc period of time, the deposit management system re-sequences these financial institutions to their desired reciprocal balance using book and/or fund transfers.

Figure 3:
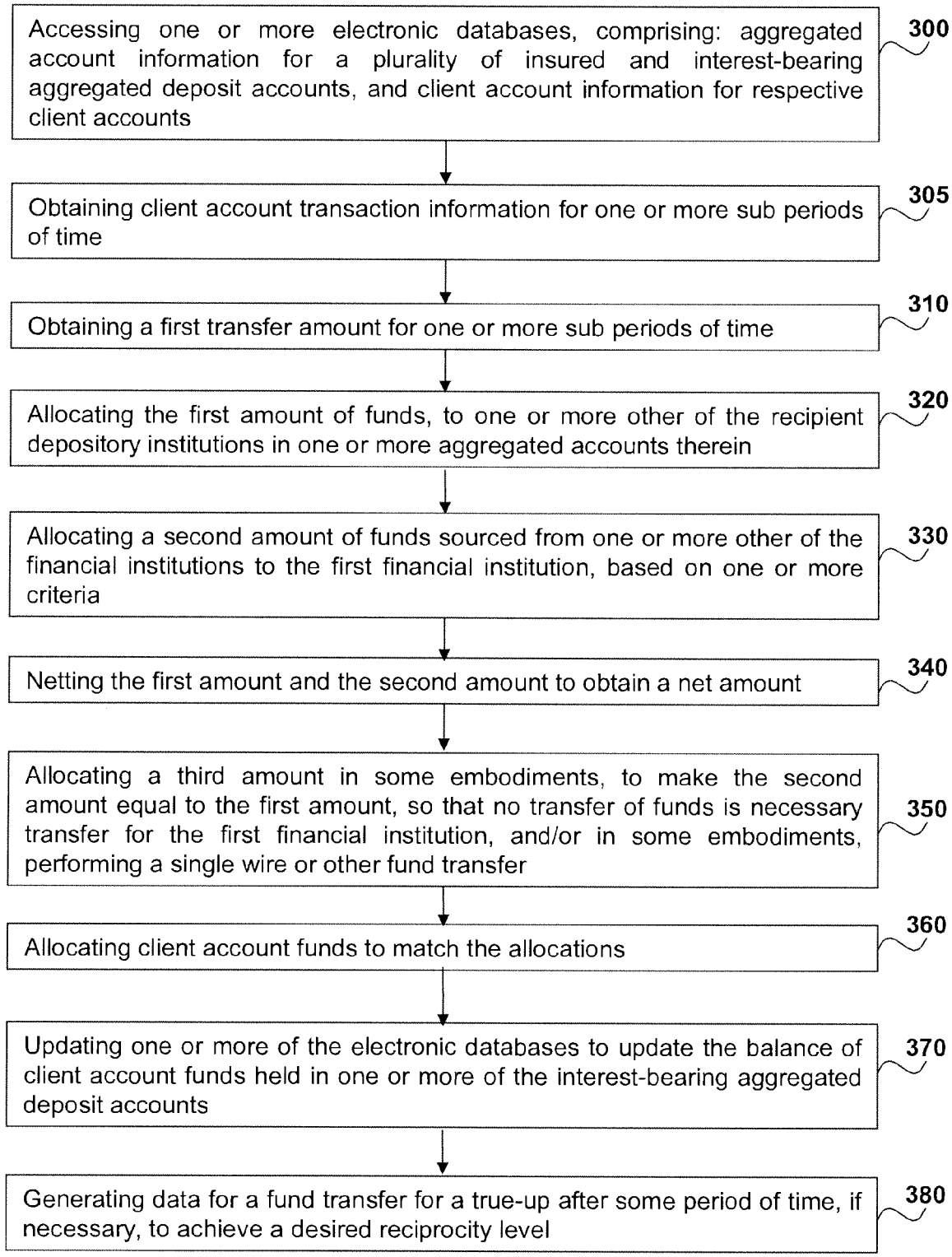
FIG. 3 is a schematic flow chart of an exemplary method in accordance with embodiments of the invention.

FIG. 3 illustrates methods of implementing the deposit management system in accordance with the invention.

In embodiments of the present invention, the deposit management system may obtain a source transaction for a sub-period, e.g., one or more hours, one or more days, one or more weeks, etc., for a given financial institution that operates as both a source institution to send funds out to the deposit management system and a recipient depository institution that receives funds in from the deposit management system. The deposit management system may then allocate a recipient transaction sourced from other of the financial institutions to this financial institution based on one or more parameters. The deposit management system then nets the source transaction amount for the period ("a first amount") with a recipient amount for the period ("a second amount"), to obtain a net amount for the period. In embodiments, the financial institution or the deposit management system may perform in or have performed or facilitate performance of an internal book entry transfer to match the first amount with the second amount to effectuate a process to minimize a number of required fund transfers. In embodiments, the system may also adjust the amount of funds to be transferred to or from the financial institution (the net amount) to avoid wire transfers completely when one or more parameters are met, and/or for a designated sub-period of time, and/or such as when the net amount is less than some predetermined amount (e.g., $100, $1,000, etc.), and/or when the net amount falls within a range, thus avoiding even one wire transfer fee in a given period, e.g., one or more hours, one or more days, one or more weeks, etc.

In embodiments, block 300 comprises accessing, using one or more computers, one or more electronic databases, stored on one or more computer-readable media, as described previously, for assisting in carrying out one or more of the various operations of the system. In embodiments, the one or more databases may comprises (i) aggregated account information for a plurality of government-backed insured and interest-bearing aggregated deposit accounts held in a plurality of recipient depository institutions, comprising a balance of funds held in each of the aggregated deposit accounts, wherein funds from a plurality of client accounts are aggregated with funds of other client accounts in the aggregated deposit accounts; and (ii) client account information for each of a plurality of the respective client accounts comprising at least a respective balance of funds from the respective client account held in each of one or more recipient depository institutions in the interest-bearing aggregated deposit accounts holding funds of the respective client account. Additionally, in embodiments, other information may also be stored, as noted above. Note that in embodiments, while at least one institution operates as both a source institution and a recipient depository institution, every institution in the program need not operate as both a source institution and a recipient depository institution. Similarly more than one institution could play both roles. In embodiments, one or more institution may also play other roles, such as operating as a clearance bank holding a control operating account, and/or an intermediary bank.

In embodiments, block 305 comprises an operation of obtaining, using the one or more computers, client account transaction information of client accounts of a first financial institution that is one of the recipient depository institutions and is also operating as a source institution, for one or more sub-periods of time. The client account transaction information may be received by the deposit management system, or may be generated by the deposit management system. In embodiments, the client account transaction information may comprise data for individual transactions, and/or may comprise one or more nets of data for each of a plurality of client accounts, with the data for a respective client account comprising a net of credit information and/or debit information applied to or against the respective client account for one or more sub-periods of time and/or other transfer information. Note that the client account transaction information may be based at least in part on data from one or from multiple of the financial institutions and/or one or more programs. In embodiments, the obtaining operation comprises receiving electronically a sweep file or data transmission, and/or receiving client account transaction information in person, over the telephone, by fax or other distribution means and entering such information in the one or more databases by keying or scanning, and/or it may be calculated, and/or it may be verified by the deposit management system 160. In embodiments, the client account transaction information may comprise a net of withdrawal/transfer amounts and/or deposit/transfer amounts from an individual client account over a period of time. Other transfer information may comprises transfer information from the management computer of the deposit management system 160 as part of a fund reallocation, or from another entity, for example. Note that in some embodiments, this step may not be performed. In embodiments, a sweep transfer may be set to occur if a balance in an account at the source institution exceeds a threshold amount, such as $1500. Thus, a sweep from that client account may be set to occur only for amounts that exceed this threshold amount in the respective client account at the source institution. In embodiments, transaction processing may process transactions overnight, and then generate a sweep file from multiple source institution client accounts based at least in part on these transactions.

In embodiments, block 310 comprises an operation of obtaining, using the one or more computers, a first amount of funds comprising a respective positive or negative net transfer amount for the one or more sub-periods of time for the first financial institution. The respective net transfer amount for the first financial institution may be comprised of a net of fund withdrawal/transfer amounts and a net of fund deposit/transfer amounts for the first financial institution when operating as a source institution, that may be accumulated and netted. The first amount may be calculated in whole or in part, using the one or more computers of the deposit management system, and/or may be received through one or more electronic communication networks, and/or may be received manually and keyed and/or scanned into the system. The source and manner of obtaining the respective first amount is not limiting on the invention.

In embodiments, block 320 comprises an operation of allocating, using the one or more computers, the first amount of funds, to one or more other of the recipient depository institutions in one or more aggregated accounts held therein.

In embodiments, one or more of the selection rules previously described may be used for selecting the one for more recipient depository institutions for part or all of the allocation. For example, a selection rule may comprise obtaining a partial or a substantially full reciprocity for source contributions of funds to the program, or the reciprocal amount may be more than the amount provided to the system by the source institution. For example, the system may be set to provide a reciprocity of some percentage that is less than 100% or more than 100%. In embodiments, the system may be set to provide a reciprocal amount back to the source institution only up to a level that can be collateralized, and no more.

Another selection rule may comprise maintaining an amount of client account funds in a respective recipient depository institution at or below an insurance limit, or maintaining the client amount relative to a prescribed amount or percentage of client funds to be held in a respective depository institution. Another selection rule may be based at least in part on client account instructions. Another rule may comprise making a selection based on when transfer information is received and/or processed relative to a cutoff time of the recipient depository institutions for fund transfers, and/or relative to one or more threshold times, and/or relative to the cutoff times of one or more other depository institutions or entities involved in the fund transfer chain. Another selection rule may comprise selecting a recipient depository institution for a withdrawal/transfer or a deposit/transfer in order to comply with a respective minimum cap and/or a respective maximum cap associated in the one or more databases with the respective insured and interest-bearing aggregated deposit account or associated with the respective depository institution or associated with another of the recipient depository institutions. Another selection rule may comprise minimizing a number of withdrawals/transfers and/or deposits/transfers in a month period to hold balances in one or more of the insured and interest-bearing aggregated deposit accounts substantially stable for some period of time. Another selection rule may comprise complying with a Federal Banking regulation 6 withdrawal/transfer limit per month for one or more of the respective depository institutions. Another selection rule may comprise a selection or de-selection of one or more of the recipient depository institutions by one or more of the clients and/or the source institution, or by the depository institution, or by another entity. Note that one or more of these rules may be used, or may be used in conjunction with one or more other rules, or may be used with one or more different rules.

In embodiments, block 330 comprises allocating, using the one or more computers, a second amount of funds sourced from one or more other of the financial institutions to the first financial institution, based on one of more criteria. For example, one criterion may be that the second amount of funds sourced from one or more other of the financial institutions is based at least in part on the first amount of the funds and/or based at least in part on an amount held or to be held by the first financial institution sourced from the other financial institutions. Where the same financial entity operates as both a source institution and as a recipient depository institution in more than one program, amounts from these other programs may be allocated as part of the second amount for this source financial institution. Thus, a source institution may be a recipient depository institution for multiple programs, and may be allocated funds from multiple source institutions in those programs, but may accomplish this using no wire or other fund transfer, or with just a minimum number of wire transfers, e.g., one wire transfer. Note that the fund allocation for this second amount is not restricted to the financial institutions to which the first amount was allocated, but may comprise any of the financial institutions in the program.

Block 340 comprises netting, using the one or more computers, the first amount and the second amount to obtain a net amount.

While some examples refer to a 100% reciprocity or some other fixed or variable percentage, or a floating reciprocity percentage, note that the present invention is equally applicable when other means of determining the allocation amounts are used. For example, allocation algorithms may be based on parameters such as target amounts, and/or minimum caps, and/or maximum caps, to name a few. In embodiments, the wire minimization techniques described herein may be used to override these parameters when one or more parameters are met, such as a certain sub-period of time, and/or for certain financial institutions, and/or up to a threshold amount, consistent with the letter and spirit of the invention.

If the net amount from block 340 is different from zero, then in some embodiments of block 350, performing an operation of generating data for a single wire or other fund transfer to or from the first financial institution based at least in part on the net amount, thereby reducing the number of wires or other fund transfers that were performed in the prior art.

In other embodiments, block 350 may comprise an operation of, if the net amount is different from zero, allocating, using the one or more computers, a positive or a negative third amount to make the second amount equal to the first amount, so that no transfer of funds is necessary to or from the first financial institution. In embodiments, this third amount may be obtained from a master account. In some embodiments, the operation of allocating a third amount may be performed, in every case. In some embodiments, this operation of allocating a third amount may be performed only if the net amount exceeds a threshold amount, or alternatively only if the net amount is less than a threshold amount or greater than a threshold amount, or if the net amount is within a range of less than a high range limit and greater than a low range limit. The threshold amount may be a predetermined amount, or may float based on one or more parameters, such as a sub-period of time, and/or float based on an input from the respective financial institution and/or the system.

In embodiments, block 350 comprises taking no action for some period of time.

In embodiments, a financial institution may participate in multiple programs, e.g., programs 1, 2, 3, and 4, and the transfer amounts determined in each of these programs may be netted for the respective financial institution to obtain one wire transfer. In embodiments, an internal book transfer can be performed on the books of the financial institution and/or the system to facilitate this operation.

Figure 4:
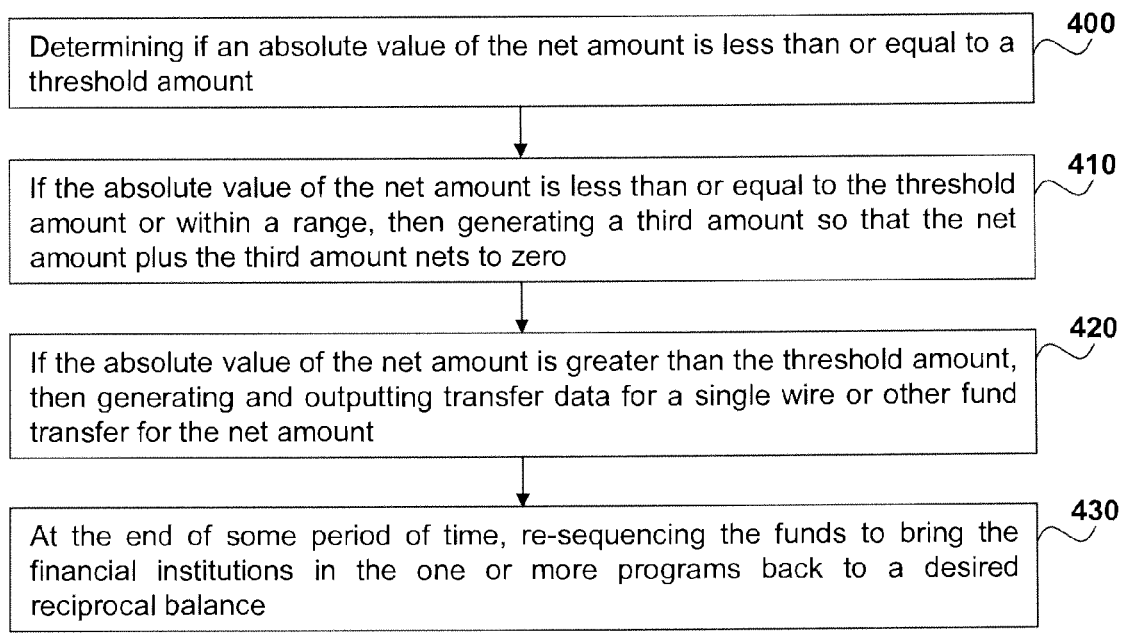
FIG. 4 is a schematic flow chart of an exemplary method in accordance with embodiments of the invention.

One implementation of this embodiment is set forth in FIG. 4. Block 400 in FIG. 4 comprises determining if an absolute value of the net amount is less than or equal to a threshold amount. Block 410 comprises an operation of, if the absolute value of the net amount is less than or equal to the threshold amount or within a range, then generating a third amount so that the net amount plus the third amount nets to zero for the first financial institution. Block 420 comprises an operation of, if the absolute value of the net amount is greater than the threshold amount, then generating and outputting transfer data, using the one or more computers, for a single wire or other fund transfer to or from the first financial institution for the net amount. Effectively, when a third amount is used to net out the transfer amount to zero, the reciprocal match for the first financial institution and the recipient depository institution lose reciprocity, e.g., one goes above 100% and one goes below 100%, or one goes above or below some other fixed or variable percentage. At the end of some predetermined period of time, e.g., one or more hours, one or more days, one or more weeks, etc., the funds may be re-sequenced using book entry transfers and/or wire or other fund transfers to bring these institutions back to their desired reciprocal balance, e.g., to obtain a true-up. This re-sequencing operation is represented by block 430. In embodiments, one or more of these operation may be performed using the one or more computers, or may be performed by hand, or the information may be received.

In embodiments, the foregoing operation of block 350 may be applied for all financial institutions that operate as both a source institution and a recipient depository institution. Alternatively, in some embodiments, the system may perform this operation for only selected financial institutions that operate as both a source institution and a recipient depository institution. For example, a selection of financial institutions for this operation may be based on a predetermined affiliation, and/or may be based on a level of funds or other measure of participation in the system, or may be based on an amount sourced to the deposit management system, to name a few. Alternatively, this operation of block 350 may be performed only for certain periods of the day. In embodiments, note that the financial institution may be a recipient for multiple programs.

Block 360 represents an operation of allocating, using the one or more computers, amounts of funds from multiple of the client accounts among multiple of the recipient depository institutions, so that so that for multiple of the aggregated deposit accounts, a sum of the respective balances of funds from the multiple of the respective client accounts allocated to the respective aggregated deposit account will substantially match the respective balance of funds in the respective aggregated deposit account, after taking into consideration the fund transfer amounts for the one or more sub-periods of time. This operation may be considered, in embodiments, a re-shuffling of client account amounts to substantially match the one or more transfers to the aggregated deposit accounts.

Block 370 comprises updating, using the one or more computers, one or more of the electronic databases to update the respective balances of client account funds held in one or more of the recipient depository institutions in one or more aggregated deposit accounts therein based on the allocations.

Separately, an optional operation may be performed of making a book entry transfer of ownership interests of funds held in the first financial institution in accordance with the account reshuffling of block 360. This book entry transfer may be prepared and/or performed by the deposit management system 160, and/or by the source institution, and/or another entity on their respective sets of books. In embodiments, the book entry transfer may be performed by the source institution on the source institution books. In embodiments, the book entry transfer may be performed by the system on the system books.

The end result of this process is that wire transfers of funds and other transfers of funds to and from a given financial institution may be minimized.

After one or more sub-periods of time, the first financial institution is not at a desired reciprocity level, e.g., 100% or some other designated percentage, then obtaining an amount to be transferred to achieve the desired reciprocity level and generating data for a wire or other fund transfer to or from the first financial institution to achieve this reciprocity level. This operation is represented by block 380. As an example, the reciprocity level for the first financial institution may go out of balance for 5 days, and then on the sixth day, this operation is performed to achieve a true-up to reach a specified reciprocity level. In essence, this operation permits the reciprocity level for a given financial institution to float for some period of time, and with a true-up operation at the end of that period of time. Note that this operation may be applied to all financial institutions, or to only selected institutions, or may be applied only for certain periods of the month, or may be applied based on one or more criteria. Additionally, limits may be imposed on the percentage of reciprocity float or amount float. For example, the system may not permit a reciprocal level that exceeds some threshold level, e.g., the reciprocity level may not be permitted to vary by more than 20% or by more than some amount from a desired reciprocity level. This threshold for the variance from the desired reciprocity level may be set by the system, and/or by the financial institution, or by another entity. When the variance from the desired reciprocity level exceeds this threshold, then data may be generated for a fund transfer to obtain a partial or full true-up to bring the reciprocity level back to approach or equal the desired reciprocity level.

In embodiments, a source institution may maintain a fund, e.g., a source institution master account, to cover account overages.

As an example, for a redemption of some amount for client accounts of the first financial institution, e.g., $100, from the first financial institution, if the first financial institution is designated for 100% reciprocity or some other fixed or variable percentage, then normally a redemption of that amount, e.g., $100, from one or more of the recipient depository institutions is required. In some prior art operations, this redemption would require sending at least one messenger to one of the recipient depository institutions, and then sending a wire with the $100 to the first financial institution. In contrast, in some embodiments of the present invention, if the first financial institution redemption amount is de minimis, e.g., below a threshold amount, then not moving the $100 out of the recipient depository institution, so effectively the reciprocal match for the recipient depository institution goes above 100% or some other fixed or variable percentage. At the end of some predetermined period of time, e.g., one or more days, one or more week, etc., the funds may be re-sequenced using book entry transfers and/or wire or other fund transfers to bring these institutions back to their desired reciprocal balance.

Note that the embodiments above may be implemented with any combination or all of the following features.

In embodiments, as noted above, an operation may be performed of determining a respective one or more withdrawal/transfer amounts to one or more respective recipient depository institutions based, at least in part, on maintaining a target reciprocity for one or more of the recipient depository institutions in the deposit management program based at least in part on the fact of, or on an amount of source funds contributed to the program by the respective recipient depository institutions (when operating as source institutions), and held in interest-bearing aggregated deposit accounts, and in some embodiments, in other investment accounts (which may be uninsured, e.g., money funds, etc.) in the program, and/or in other of the recipient depository institutions in the program. In embodiments, this target reciprocity may be complete reciprocity. In embodiments, the target reciprocity may be determined based at least in part on one of more parameters, such as a total amount of source funds in the program from the respective recipient depository institution as compared to other recipient depository institutions, and/or as compared to one or more threshold amounts, and/or reciprocity based at least in part on a total amount of source funds of a particular type contributed to the program from the respective recipient depository institutions (when operating as source institutions), e.g., municipal and/or state and/or Federal or other governmental funds, and/or reciprocity based at least in part on a relationship parameter, and/or reciprocity based on some other parameter, such as location of collateral, and/or a location of a source institution or a recipient institution. For example, in certain states, it may be required or allowed to transfer deposits between banks within the state.

In embodiments, an operation may be performed of determining at least one first withdrawal/transfer amount based, at least in part, on a net of deposit/transfer data and withdrawal/transfer data from one or more client accounts of one or more of the source institutions participating in the program and/or from the deposit management system 160 for fund reallocations. As noted, in embodiments, the transfer amount may comprises amounts from multiple different programs.

In embodiments, the client account transaction information comprises information for at least funds of one or more client accounts. In embodiments, the client account transaction information may comprise information for at least bank funds, or only for bank funds. In embodiments, the client account transaction information may comprise information for at least municipal or other governmental funds, or for only municipal or other governmental funds.

In embodiments, the one or more computers 210 may be configured by programming code to process clients' deposits/transfers to and/or withdrawals/transfers from client accounts associated with one or more of the source institutions. In embodiments, this processing transaction data may comprise transaction data for one or more deposits/transfers for one or more client accounts and/or transaction data for one or more withdrawals/transfers from one or more of said client accounts, with the transaction data comprising a respective amount for each respective deposit/transfer and/or each respective withdrawal/transfer, and/or a net of such amounts over a period of time. In embodiments, as noted a sweep amount from a respective client account may be determined, based at least in part, on whether the balance in the respective client account exceeds some threshold amount. The transactions may include sweeps, checks, transfers to cover, e.g., securities transactions or margin accounts, debit card transactions, credit card transactions, on-line bill paying transactions, touch tone bill paying data, ACH transactions, wire transactions, other transfers, and/or nets thereof, to name a few. In such embodiments, the one or more computers may then be used to calculate a respective net amount for each of the client accounts and/or for the one or more of the respective source institutions.

In embodiments, where there may be a reciprocity target for at least one of the recipient depository institutions, and where one of the one or more selection rules comprises determining whether a prospective withdrawal/transfer or a deposit/transfer will comply with a respective maximum cap and/or a respective minimum cap associated with the prospective recipient depository institution, the one or more computers 210 may be configured with programming code for performing a pseudo allocation of a proposed transfer to determine whether the reciprocity target for the at least one recipient depository institution will be met by the proposed transfer. If it is determined that the reciprocity target will not be met by the pseudo allocation and the resulting pseudo end balances that would be held in the respective recipient depository institutions, then changing one or more of the respective maximum caps and/or the respective minimum caps applied to the one or more aggregated deposit accounts and/or to the one or more depository institutions. In embodiments, this operation may be performed manually. This operation may be advantageous for the embodiments where transfer to the interest-bearing aggregated deposit accounts held in the respective recipient depository institutions is controlled at least in part by maximum caps and/or minimum caps.

In embodiments, the one or more computers 210 may be configured with programming code for generating and sending one or more instructions to a source institution to withdraw/transfer funds from the control operating account 125 held by the clearance bank 120 and to transfer those funds to one or more of the program source institutions and/or to one or more of the recipient depository institutions and/or to one or more payment entities. In embodiments, a communication to the clearance bank by telephone, or by Fax, or in person, or other non-automated communication, may be performed. In embodiments, the information may be uploaded to the control operating using the wire transfer system In embodiments, the one or more computers may be configured by programming code for making direct electronic communication with the control operating account 125 held by the clearance bank 120 to provide instructions to withdraw/transfer funds from the control operating account 125, and to send/transfer funds to one or more of the source institutions and/or to one or more of the recipient depository institutions and/or to one or more payment entities. In embodiments, a communication to the clearance bank by telephone, or by Fax, or in person, or other non-automated communication, may be performed.

In embodiments, the allocation engine 230 may be configured by programming code for selecting recipient depository institutions and/or determining amount(s) of the respective deposits/transfers to and/or withdrawals/transfers from the selected recipient depository institutions, based at least in part, on respective fund transfer cutoff times for respective recipient depository institutions and/or source institutions, and/or based at least in part on processing cutoff times for other entities involved in the fund transfer. In embodiments, this operation may be performed manually.

In embodiments, the transfer data generator 240 may be configured with programming code for sending the transfer data to a source institution for subsequent transfer to one or more recipient depository institutions. In embodiments, this operation may be performed manually.

In embodiments, a program may use a plurality of control operating accounts at one or more clearance banks, to manage timing of deposit/transfers and withdrawals/transfer among the recipient depository institutions, the source institutions, and the payment entities.

The present invention can be used in various kinds of deposit management programs and deposit sweep programs, as well as programs hereinafter developed. The present invention can also be used in the demand deposit marketplace, with insured deposit bank sweep products.

Embodiments within the scope of the present invention include program products comprising machine-readable media with machine-executable instructions or data structures stored thereon. Such machine-readable media can be any available storage media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machines to perform a certain function or group of functions. Note that the machine-executable instructions/programming code may comprise algorithms embedded in Excel or other spreadsheets.

Embodiments of the invention have been described in the general context of method steps which may be implemented in embodiments by a program product including machine-executable instructions, such as program code, for example in the form of program modules executed by machines in networked environments. Generally, program modules include routines, programs, objects, components, data structures, etc., that perform particular tasks or implement particular data types. Multi-threaded applications may be used, for example, based on Java or C++. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present invention may be practiced with one or multiple computers in a networked environment using logical connections to one or more remote computers (including mobile devices) having processors. Logical connections may include a local area network (LAN) and a wide area network (WAN) that are presented here by way of example and not limitation. Such networked environments are commonplace in office-wide or enterprise-wide computer networks, and include intranets and the Internet, and may use a wide variety of different communication protocols. Those skilled in the art will appreciate that such network computing environments will typically encompass many types of computer system configurations, including personal computers, hand-held devices such as mobile phones and other PDA appliances, multi-processor systems, microprocessor-based or programmable consumer electronics, network PCs, minicomputers, mainframe computers, and the like. Embodiments of the invention may also be practiced in distributed computing environments where tasks are performed by local and remote processing devices that are linked (either by hardwired links, wireless links, or by a combination of hardwired and wireless links) through a communications network. In a distributed computing environment, program modules may be located in both local and remote memory storage devices.

It should be noted that although the flow charts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software and web implementations of the present invention could be accomplished with programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations. It should also be noted that the phrase "a plurality" is intended to mean more than one, and is not intended to refer to any previous recitation of the word "plurality," unless preceded by the word "the."

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

We claim:
1. A method, comprising:
   accessing, using one or more computers, one or more electronic databases, stored on one or more computer-readable media, for assisting in carrying out one or more of the following operations, the one or more databases comprising
   (i) aggregated account information for a plurality of government-backed insured and interest-bearing aggregated deposit accounts held in a plurality of recipient depository institutions, comprising a balance of funds held in each of the aggregated deposit accounts, wherein funds from a plurality of client accounts are aggregated with funds of other client accounts in the aggregated deposit accounts; and
   (ii) client account information for each of a plurality of the respective client accounts comprising at least a respective balance of funds from the respective client account held in each of one or more recipient depository institutions in the interest-bearing aggregated deposit accounts holding funds of the respective client account;
   obtaining, using the one or more computers, client account transaction information of client accounts of a first financial institution that is one of the recipient depository institutions and is also operating as a source institution, for one or more sub-periods of time;
   obtaining, using the one or more computers, a first amount of funds comprising a respective positive net transfer amount or negative net transfer amount for the one or more sub-periods of time for the first financial institution;

allocating, using the one or more computers, the first amount of funds, to one or more other of the recipient depository institutions in one or more aggregated accounts held therein;

allocating, using the one or more computers, a second amount of funds sourced from one or more other of the financial institutions to the first financial institution, based at least in part on the first amount of the funds and/or based at least in part on an amount held or to be held by the first financial institution sourced from the other financial institutions;

netting, using the one or more computers, the first amount and the second amount to obtain a net amount;

if the net amount is different from zero, allocating a positive or a negative third amount, using the one or more computers, to make the second amount equal to the first amount, so that no transfer of funds is necessary to or from the first financial institution, or taking no action for one or more sub-periods of time, or generating data for a single wire or other fund transfer to or from the first financial institution based at least in part on the net amount;

allocating, using the one or more computers, amounts of funds from multiple of the client accounts among multiple of the recipient depository institutions, so that for multiple of the aggregated deposit accounts, a sum of the respective balances of funds from the multiple of the respective client accounts allocated to the respective aggregated deposit account will substantially match the respective balance of funds in the respective aggregated deposit account, after taking into consideration the fund transfer amounts for the one or more sub-periods of time;

updating, using the one or more computers, one or more of the electronic databases to update the respective balances of client account funds held in one or more of the recipient depository institutions in one or more aggregated deposit accounts therein based on the allocations; and after one or more sub-periods of time, if the first financial institution is not at a desired reciprocity level, then obtaining an amount to be transferred to achieve the desired reciprocity level, and generating data, using the one or more computers, for a wire or other fund transfer to or from the first financial institution to achieve this desired reciprocity level.

2. The method as defined in claim 1, wherein the allocating the second amount to the first financial institution is based at least in part on obtaining a reciprocity of a predetermined percentage.

3. The method as defined in claim 1, wherein the allocating the second amount to the first financial institution is based at least in part on obtaining a desired reciprocity value that varies from sub-period to sub-period.

4. The method as defined in claim 1, comprising performing the allocating of a positive or negative third amount, using the one or more computers, to make the second amount equal to the first amount.

5. The method as defined in claim 1, comprising performing the allocating of a positive or negative third amount, using the one or more computers, to make the second amount equal to the first amount, with this operation comprising:
  determining if an absolute value of the net amount is less than or equal to a threshold amount;
  if the absolute value of the net amount is less than or equal to the threshold amount, then allocating the third amount so that the net amount plus the third amount nets to zero for the first financial institution; and
  if the absolute value of the net amount is greater than the threshold amount, then generating and outputting transfer data, by the one or more computers, for a single wire or other fund transfer to or from the first financial institution for the net amount.

6. The method as defined in claim 1, wherein if the net amount is different from zero, then taking no action for one or more sub-periods of time, and
  after the one or more sub-periods of time, then performing the step of obtaining the amount to be transferred to achieve the desired reciprocity level, and generating the data for a wire or other fund transfer to or from the first financial institution to achieve the desired reciprocity level.

7. The method as defined in claim 1, wherein if the net amount is different from zero, generating data for a single wire or other fund transfer to or from the first financial institution based at least in part on the net amount.

8. The method as defined in claim 1, wherein after one or more sub-periods of time, the first financial institution is not at a desired reciprocity level, and obtaining an amount to be transferred to achieve the desired reciprocity level, and generating data, using the one or more computers, for a wire or other fund transfer to or from the first financial institution to achieve this desired reciprocity level.

* * * * *